US009623284B2

(12) United States Patent
Lafortune et al.

(10) Patent No.: US 9,623,284 B2
(45) Date of Patent: Apr. 18, 2017

(54) SYSTEMS AND METHODS FOR STORING AND ANALYZING GOLF DATA, INCLUDING COMMUNITY AND INDIVIDUAL GOLF DATA COLLECTION AND STORAGE AT A CENTRAL HUB

(75) Inventors: Mario A. Lafortune, Tigard, OR (US); James A. Niegowski, Portland, OR (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 13/080,011

(22) Filed: Apr. 5, 2011

(65) Prior Publication Data

US 2011/0230274 A1    Sep. 22, 2011

Related U.S. Application Data

(63) Continuation-in-part of application No. 12/034,626, filed on Feb. 20, 2008, now Pat. No. 9,393,478.

(51) Int. Cl.
*A63B 59/00* (2015.01)
*A63B 24/00* (2006.01)
(Continued)

(52) U.S. Cl.
CPC ........ *A63B 24/0003* (2013.01); *A43B 3/0005* (2013.01); *A43B 5/001* (2013.01);
(Continued)

(58) Field of Classification Search
USPC ............................ 473/217, 407, 269; 463/30
See application file for complete search history.

(56) References Cited

U.S. PATENT DOCUMENTS

| 3,589,731 A | 6/1971 | Chancellor, Jr. |
| 3,753,564 A | 8/1973 | Brandell |

(Continued)

FOREIGN PATENT DOCUMENTS

| CN | 2487416 Y | 4/2002 |
| CN | 2688331 Y | 3/2005 |

(Continued)

OTHER PUBLICATIONS

United States Patent and Trademark Office, "Non-Final Office Action," issued in connection with U.S. Appl. No. 13/079,959, issued Aug. 9, 2013, 14 pages.

(Continued)

*Primary Examiner* — Dmitry Suhol
*Assistant Examiner* — Brandon Gray
(74) *Attorney, Agent, or Firm* — Banner & Witcoff, Ltd.

(57) ABSTRACT

Systems and methods are described for providing coaching, training, or equipment specification information to individual golfers based on data generated during their individual golf swings. Additionally, data hubs are described that provide information and services to individuals based on data collected for a community of multiple golfers. Such community data hub systems and methods may provide one or more of the following: (a) storage of scoring data, swing data, ball flight data, and/or equipment data for multiple golfers; (b) at least some level of individual access to the stored data for the community; and/or (c) electronic interaction between golfers within the community.

28 Claims, 26 Drawing Sheets

(51) Int. Cl.

| | |
|---|---|
| *A43B 3/00* | (2006.01) |
| *A43B 5/00* | (2006.01) |
| *A43B 5/16* | (2006.01) |
| *A63B 15/00* | (2006.01) |
| *A63B 37/00* | (2006.01) |
| *A63B 69/36* | (2006.01) |
| *A63B 71/14* | (2006.01) |
| *G09B 19/00* | (2006.01) |
| *A63B 55/00* | (2015.01) |
| *A63B 71/06* | (2006.01) |
| *A63B 102/32* | (2015.01) |

(52) U.S. Cl.
CPC ............... *A43B 5/16* (2013.01); *A63B 15/00* (2013.01); *A63B 24/00* (2013.01); *A63B 24/0021* (2013.01); *A63B 37/0003* (2013.01); *A63B 69/36* (2013.01); *A63B 69/3632* (2013.01); *A63B 71/0622* (2013.01); *A63B 71/0669* (2013.01); *A63B 71/146* (2013.01); *G09B 19/0038* (2013.01); *A63B 55/00* (2013.01); *A63B 71/0616* (2013.01); *A63B 2024/0025* (2013.01); *A63B 2024/0056* (2013.01); *A63B 2069/362* (2013.01); *A63B 2071/0647* (2013.01); *A63B 2071/0691* (2013.01); *A63B 2102/32* (2015.10); *A63B 2220/12* (2013.01); *A63B 2220/13* (2013.01); *A63B 2220/14* (2013.01); *A63B 2220/16* (2013.01); *A63B 2220/20* (2013.01); *A63B 2220/30* (2013.01); *A63B 2220/40* (2013.01); *A63B 2220/51* (2013.01); *A63B 2220/53* (2013.01); *A63B 2220/80* (2013.01); *A63B 2220/801* (2013.01); *A63B 2220/803* (2013.01); *A63B 2220/833* (2013.01); *A63B 2220/836* (2013.01); *A63B 2225/15* (2013.01); *A63B 2225/20* (2013.01); *A63B 2225/50* (2013.01); *A63B 2225/54* (2013.01)

(56) References Cited

U.S. PATENT DOCUMENTS

| | | | |
|---|---|---|---|
| 3,829,102 A | 8/1974 | Harrison | |
| 3,931,363 A | 1/1976 | Giolito et al. | |
| 3,931,969 A | 1/1976 | Townhill | |
| 3,979,125 A | 9/1976 | Lancellotti | |
| 4,291,883 A | 9/1981 | Smart et al. | |
| 4,898,389 A | 2/1990 | Plutt | |
| 4,940,236 A | 7/1990 | Allen | |
| 5,160,142 A | 11/1992 | Marshall | |
| 5,230,512 A | 7/1993 | Tattershall | |
| 5,245,537 A | 9/1993 | Barber | |
| 5,354,063 A * | 10/1994 | Curchod | 473/156 |
| 5,364,093 A | 11/1994 | Huston et al. | |
| 5,372,365 A | 12/1994 | McTeigue et al. | |
| 5,413,345 A | 5/1995 | Nauck | |
| 5,441,269 A | 8/1995 | Henwood | |
| 5,524,081 A | 6/1996 | Paul | |
| 5,634,855 A | 6/1997 | King | |
| 5,718,301 A | 2/1998 | Williams | |
| 5,779,555 A | 7/1998 | Nomura et al. | |
| 5,792,001 A | 8/1998 | Henwood | |
| 5,803,829 A | 9/1998 | Hayashi | |
| 5,973,596 A | 10/1999 | French et al. | |
| 6,248,021 B1 | 6/2001 | Ognjanovic | |
| 6,386,987 B1 | 5/2002 | Lejeune, Jr. | |
| 6,456,938 B1 | 9/2002 | Barnard | |
| 6,558,268 B2 | 5/2003 | Tindale | |
| 6,575,854 B1 | 6/2003 | Yang et al. | |
| 6,579,190 B2 | 6/2003 | Yamamoto | |
| 6,697,820 B1 | 2/2004 | Tarlie | |
| 6,757,572 B1 | 6/2004 | Forest | |
| 6,802,772 B1 | 10/2004 | Kunzle et al. | |
| 6,900,759 B1 | 5/2005 | Katayama | |
| 6,923,729 B2 | 8/2005 | McGinty et al. | |
| 7,004,848 B2 | 2/2006 | Konow | |
| 7,021,140 B2 | 4/2006 | Perkins | |
| 7,037,198 B2 | 5/2006 | Hameen-Anttila | |
| 7,077,757 B1 | 7/2006 | Payne et al. | |
| 7,118,498 B2 | 10/2006 | Meadows et al. | |
| 7,121,962 B2 | 10/2006 | Reeves | |
| 7,160,200 B2 | 1/2007 | Grober | |
| 7,166,041 B2 | 1/2007 | Evans | |
| 7,175,177 B2 | 2/2007 | Meifu et al. | |
| 7,214,138 B1 | 5/2007 | Stivers et al. | |
| 7,234,351 B2 | 6/2007 | Perkins | |
| 7,235,020 B1 | 6/2007 | Christensen | |
| 7,310,895 B2 * | 12/2007 | Whittlesey et al. | 36/137 |
| 7,335,112 B1 | 2/2008 | Bitondo | |
| 7,371,184 B2 | 5/2008 | Tao | |
| 7,881,499 B2 | 2/2011 | Bissonnette et al. | |
| 8,210,961 B2 | 7/2012 | Finn et al. | |
| 8,342,978 B2 | 1/2013 | Tamura | |
| 2001/0035880 A1 | 11/2001 | Musatov et al. | |
| 2002/0004723 A1 | 1/2002 | Meifu et al. | |
| 2002/0019677 A1 | 2/2002 | Lee | |
| 2002/0049507 A1 | 4/2002 | Hameen-Anttila | |
| 2002/0052750 A1 | 5/2002 | Hirooka | |
| 2002/0072815 A1 | 6/2002 | McDonough et al. | |
| 2002/0082775 A1 | 6/2002 | Meadows et al. | |
| 2002/0151994 A1 | 10/2002 | Sisco | |
| 2002/0173364 A1 | 11/2002 | Boscha | |
| 2003/0008722 A1 | 1/2003 | Konow | |
| 2003/0014134 A1* | 1/2003 | Morgan | 700/91 |
| 2003/0054900 A1 | 3/2003 | Tindale | |
| 2003/0132844 A1 | 7/2003 | Walker | |
| 2003/0191547 A1 | 10/2003 | Morse | |
| 2004/0067797 A1 | 4/2004 | Knecht | |
| 2004/0229707 A1 | 11/2004 | Lin | |
| 2005/0043109 A1* | 2/2005 | Buckley et al. | 473/150 |
| 2005/0054457 A1 | 3/2005 | Eyestone et al. | |
| 2005/0096761 A1 | 5/2005 | Hanover, Jr. et al. | |
| 2005/0188566 A1 | 9/2005 | Whittlesey et al. | |
| 2005/0215340 A1 | 9/2005 | Stites et al. | |
| 2005/0282650 A1 | 12/2005 | Miettinen et al. | |
| 2006/0040757 A1 | 2/2006 | Rosselli | |
| 2006/0063600 A1 | 3/2006 | Grober | |
| 2006/0089845 A1 | 4/2006 | Marcell et al. | |
| 2006/0105853 A1 | 5/2006 | Glass | |
| 2006/0109116 A1 | 5/2006 | Keays | |
| 2006/0122002 A1 | 6/2006 | Konow | |
| 2006/0194178 A1 | 8/2006 | Goldstein | |
| 2006/0199659 A1 | 9/2006 | Caldwell | |
| 2006/0240908 A1 | 10/2006 | Adams et al. | |
| 2006/0276256 A1 | 12/2006 | Storek | |
| 2007/0006489 A1* | 1/2007 | Case, Jr. | A43B 3/0005 36/132 |
| 2007/0087866 A1 | 4/2007 | Meadows et al. | |
| 2007/0111811 A1 | 5/2007 | Grober | |
| 2007/0129178 A1 | 6/2007 | Reeves | |
| 2007/0135225 A1 | 6/2007 | Nieminen et al. | |
| 2007/0135237 A1 | 6/2007 | Reeves | |
| 2007/0191126 A1 | 8/2007 | Mandracken | |
| 2007/0270214 A1* | 11/2007 | Bentley | 463/30 |
| 2008/0039222 A1 | 2/2008 | Kiraly | |
| 2008/0085778 A1 | 4/2008 | Dugan | |
| 2008/0085788 A1 | 4/2008 | Rainer et al. | |
| 2008/0318703 A1* | 12/2008 | Mooney | 473/269 |
| 2009/0111602 A1 | 4/2009 | Savarese et al. | |
| 2009/0118035 A1 | 5/2009 | Roenick | |
| 2009/0203462 A1 | 8/2009 | Stites et al. | |
| 2009/0209368 A1 | 8/2009 | Niegowski | |
| 2009/0260426 A1* | 10/2009 | Lieberman et al. | 73/65.01 |
| 2010/0063778 A1 | 3/2010 | Schrock et al. | |
| 2010/0063779 A1 | 3/2010 | Schrock et al. | |
| 2010/0099509 A1 | 4/2010 | Ahern | |
| 2010/0144456 A1 | 6/2010 | Ahern | |
| 2010/0154255 A1 | 6/2010 | Robinson et al. | |
| 2011/0207552 A1 | 8/2011 | Finn et al. | |

(56) References Cited

U.S. PATENT DOCUMENTS

2011/0230273 A1 9/2011 Niegowski et al.
2011/0306435 A1 12/2011 Seo

FOREIGN PATENT DOCUMENTS

| | | |
|---|---|---|
| CN | 101918090 A | 12/2010 |
| JP | S63-109174 A | 5/1988 |
| JP | H03-55077 A | 3/1991 |
| JP | H03-60680 A | 3/1991 |
| JP | H08173586 | 7/1996 |
| JP | 2001264016 A | 9/2001 |
| JP | 20060090501 A | 8/2006 |
| JP | 2006247023 A | 9/2006 |
| JP | 2007530151 A | 11/2007 |
| JP | 2011-524207 A | 9/2011 |
| KR | 20070095407 A | 9/2007 |
| KR | 20100020131 A | 2/2010 |
| KR | 20100051153 A | 5/2010 |
| KR | 10-2010-0095917 A | 9/2010 |
| WO | 9965574 A2 | 12/1999 |
| WO | 2004071594 A1 | 8/2004 |
| WO | 2006/014459 A2 | 2/2006 |
| WO | 2008154684 A1 | 12/2008 |
| WO | 2009/152456 A2 | 12/2009 |
| WO | 2012/138543 A2 | 10/2012 |

OTHER PUBLICATIONS

Office Action issued Apr. 15, 2013 in related U.S. Appl. No. 13/079,959.
United States Patent and Trademark Office, "Non-Final Office Action," issued in connection with U.S. Appl. No. 12/034,626, mailed Oct. 7, 2013, 16 pages.
International Bureau, "International Preliminary Report on Patentability," issued in connection with international application serial No. PCT/US2012/031101, mailed Oct. 17, 2013, 12 pages.
International Bureau, "International Preliminary Report on Patentability," issued in connection with international application serial No. PCT/US2012/031131, mailed Oct. 17, 2013, 6 pages.
International Bureau, "International Preliminary Report on Patentability," issued in connection with international application serial No. PCT/US2012/031233, mailed Oct. 17, 2013, 12 pages.
Office Action issued Oct. 24, 2012 in related U.S. Appl. No. 13/079,959.
Office Action issued Oct. 12, 2012 in related U.S. Appl. No. 13/079,984.
Office Action issued Oct. 24, 2012 in related U.S. Appl. No. 13/079,949.
Office Action issued Feb. 14, 2011 in related U.S. Appl. No. 12/034,626.
Office Action issued Oct. 11, 2011 in related U.S. Appl. No. 12/034,626.
ISR and WO from PCT Application No. PCT/US2012/031131 mailed Sep. 5, 2012.
http://www.sureshotgps.com/sureshotgps.php, Feb. 7, 2007.
http://www.sureshotgps.com/faq.php, Feb. 7, 2007.
Sureshot GPS advertisement (date unknown).
ISR and WO from PCT/US2012/031101 mailed Jan. 2, 2013.
Partial ISR from PCT/US2012/031844 mailed Aug. 2, 2012.
ISR from PCT/US2012/031233 mailed Aug. 2, 2012.
International Search Report and Written Opinion from PCT/US2012/031233 mailed Jan. 30, 2013.
International Search Report and Written Opinion from PCT/US2012/031844 mailed Jan. 30, 2013.
U.S. Office Action issued on Mar. 17, 2015 in U.S. Appl. No. 12/034,626.
Office Action issued on Apr. 10, 2015 in U.S. Appl. No. 13/079,984.
Office Action in U.S. Appl. No. 13/079,949 issued on Jan. 16, 2015.
Chinese Office Action issued Feb. 2, 2015 in Chinese Application No. 201280016760.0.
Chinese Office Action issued Jan. 13, 2015 in Chinese Application No. 201280027722.5.
Korean Office Action issued Nov. 22, 2014 in Korean Application No. 10-2013-7029271.
International Search Report and Written Opinion received in PCT Application No. PCT/US2012/031233 issued on Jan. 30, 2013.
International Search Report and Written Opinion received in PCT Application No. PCT/US2012/031101 issued on Jan. 2, 2013.

\* cited by examiner

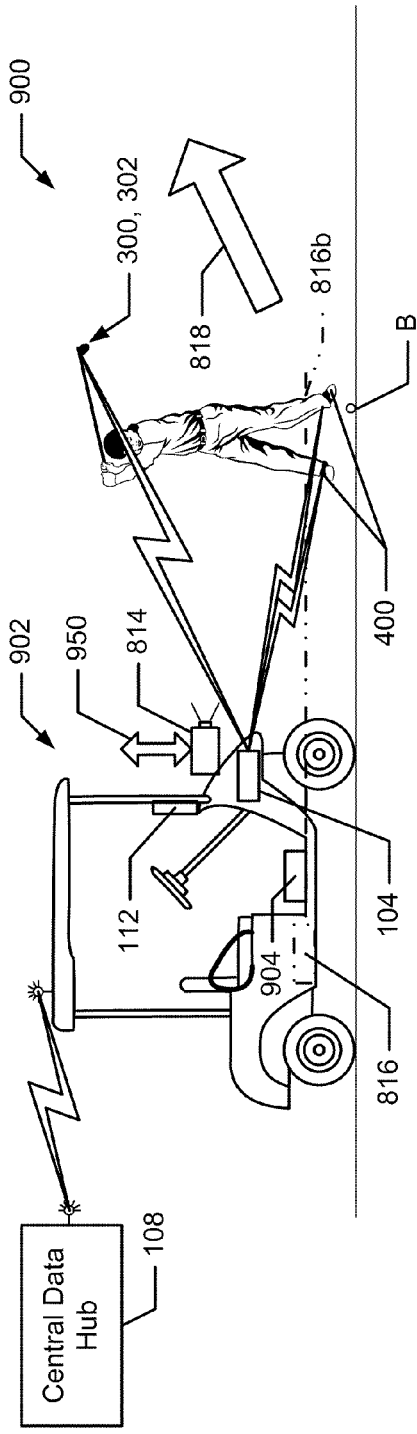
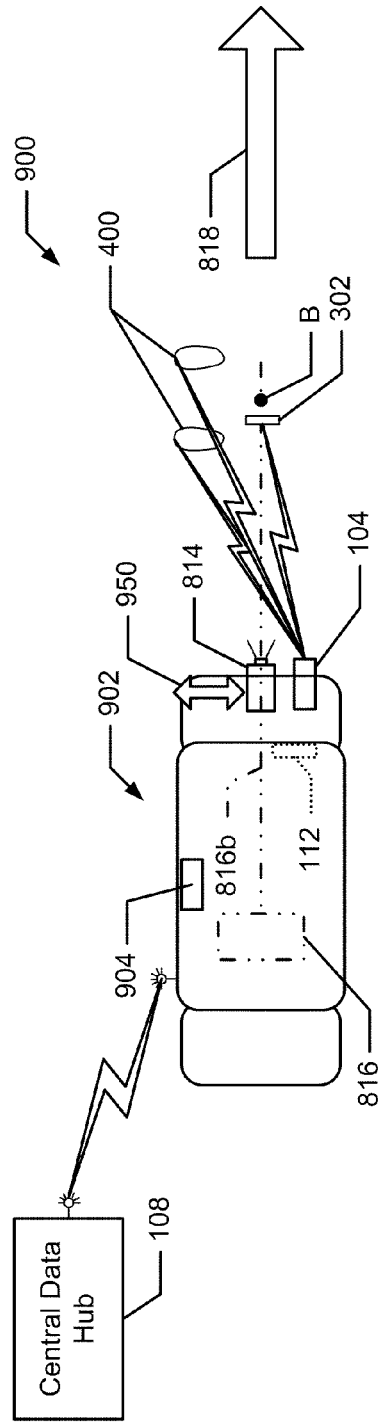
FIG. 9A
FIG. 9B

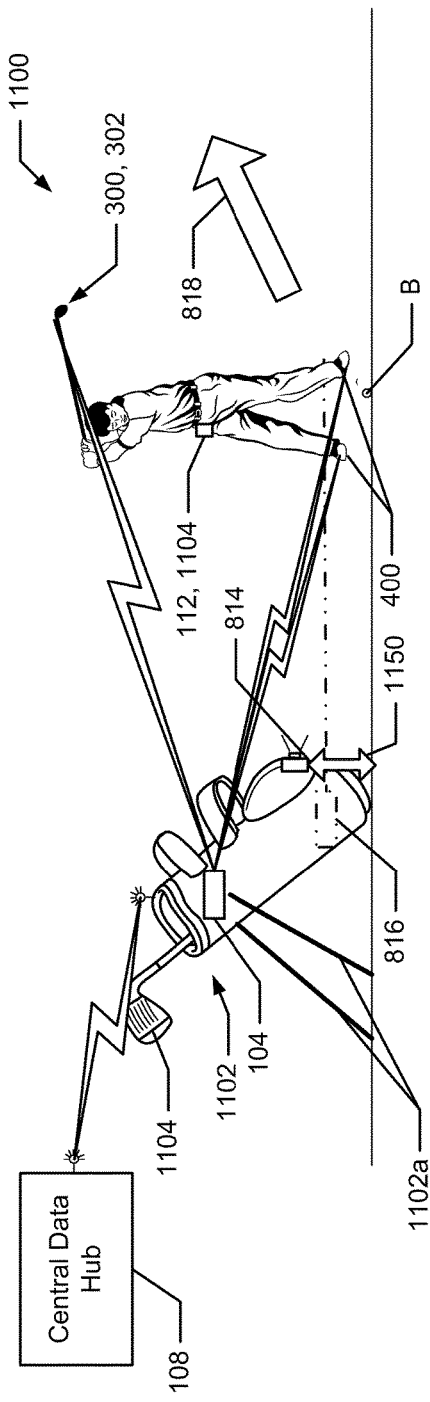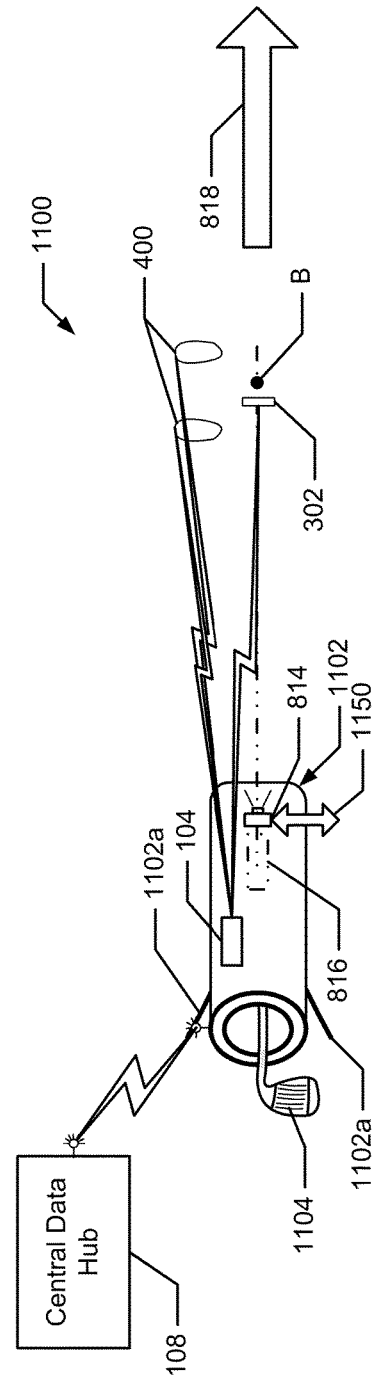
FIG. 11A
FIG. 11B

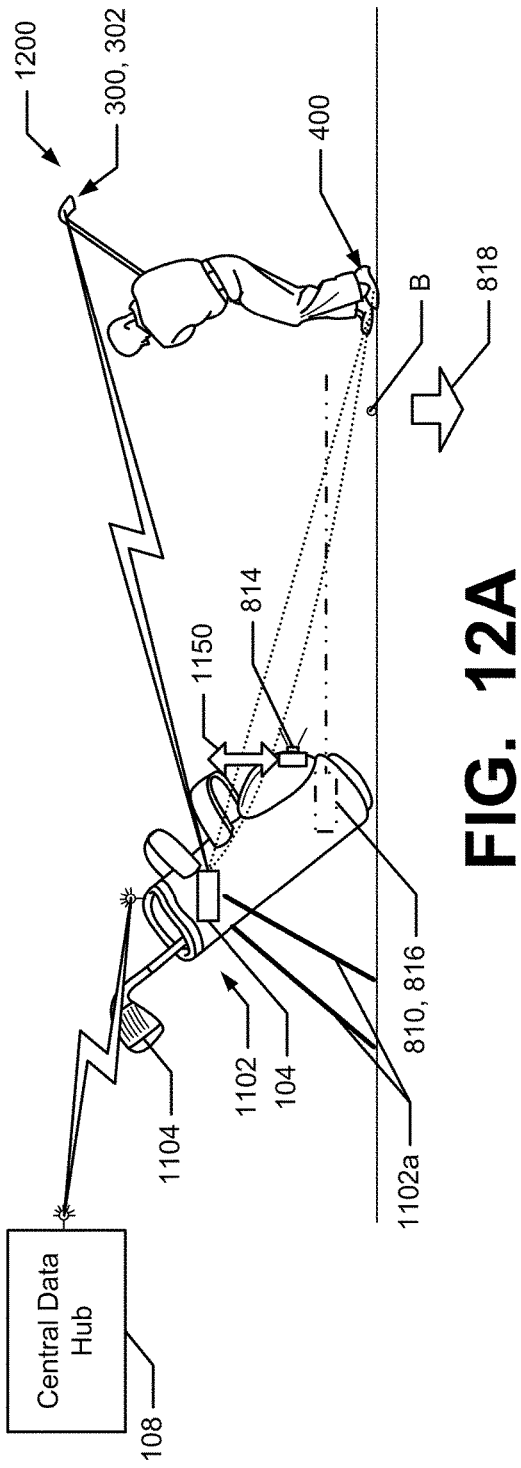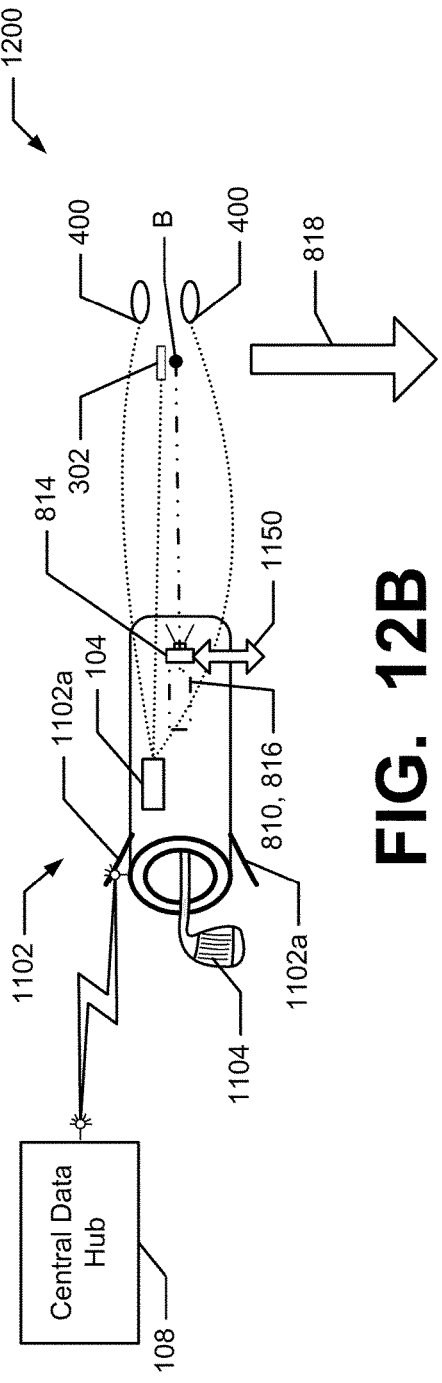

| Golf Community | | | | | | | | | | | | | | | | | | | | | |
|---|---|---|---|---|---|---|---|---|---|---|---|---|---|---|---|---|---|---|---|---|---|

User: Golfer A
Handicap: 12.1

Golf Course A  Date: 01/01/10

| Hole No.: | 1 | 2 | 3 | 4 | 5 | 6 | 7 | 8 | 9 | Out | 10 | 11 | 12 | 13 | 14 | 15 | 16 | 17 | 18 | In | Total |
|---|---|---|---|---|---|---|---|---|---|---|---|---|---|---|---|---|---|---|---|---|---|
| Par: | 4 | 4 | 4 | 4 | 4 | 4 | 5 | 3 | 4 | 36 | 4 | 3 | 5 | 4 | 3 | 4 | 5 | 4 | 4 | 36 | 72 |
| Handicap: | 3 | 11 | 5 | 13 | 17 | 1 | 9 | 15 | 7 | | 2 | 10 | 18 | 6 | 16 | 4 | 12 | 8 | 14 | | |
| Player A: | 6 | 5 | 5 | 4 | 4 | 6 | 6 | 2 | 5 | 43 | 5 | 5 | 6 | 4 | 4 | 6 | 5 | 5 | 4 | 44 | 87 |
| Fairways: | Y | ↓ | ↓ | ↓ | ↓ | Y | ↑ | | ↑ | 28.5% | Y | | ↑ | Y | | ↑ | ↑ | Y | Y | 57.4% | 50% |
| Greens: | N | Y | Y | Y | N | N | N | Y | N | 44.4% | Y | N | Y | Y | N | N | Y | N | Y | 44.4% | 44.4% |
| No. Putts: | 3 | 2 | 2 | 2 | 1 | 2 | 2 | 1 | 2 | 17 | 2 | 2 | 2 | 2 | 1 | 1 | 2 | 2 | 2 | 16 | 33 |
| Penalty: | | | | | 1 | | | | | 1 | | | | | | 1 | | | | 1 | 2 |
| Bunker: | 1 | | | | | 1 | | | | 2 | | | | | | | | | 1 | 1 | 3 |
| Friend B: | 5 | 5 | 4 | 5 | 4 | 5 | 4 | 3 | 5 | 40 | 6 | 5 | 5 | 5 | 5 | 5 | 6 | 5 | 4 | 44 | 84 |
| Fairways: | Y | ↓ | ↓ | ↓ | ↓ | Y | ↑ | | ↑ | 28.5% | Y | | ↑ | Y | | ↑ | ↑ | Y | Y | 57.4% | 50% |
| Greens: | N | Y | Y | Y | N | N | N | Y | N | 55.6% | N | N | Y | Y | N | N | Y | N | Y | 44.4% | 50% |
| No. Putts: | 2 | 2 | 1 | 2 | 1 | 2 | 1 | 2 | 2 | 15 | 2 | 2 | 2 | 1 | 3 | 1 | 2 | 2 | 2 | 17 | 32 |
| Penalty: | | | | | | | | | | 0 | | | | | | | | | | 0 | 0 |
| Bunker: | 1 | | | | | | | | | 0 | | | | | | | | | | 0 | 1 |

FIG. 15B

SYSTEMS AND METHODS FOR STORING AND ANALYZING GOLF DATA, INCLUDING COMMUNITY AND INDIVIDUAL GOLF DATA COLLECTION AND STORAGE AT A CENTRAL HUB

RELATED APPLICATION DATA

This application is a continuation-in-part of U.S. patent application Ser. No. 12/034,626 entitled "System and Method for Tracking One or More Rounds of Golf" filed Feb. 20, 2008 (U.S. Published Patent Appln. No. 2009/0209358), which application is entirely incorporated herein by reference.

FIELD OF THE INVENTION

The invention relates generally to systems and methods for storing and analyzing golf data, such as golf swing data and/or golf scoring data for individual players, as well as to systems and methods for providing feedback to the golfer. Additional aspects of this invention relate to systems and methods for forming electronic golf "communities" that collect, store, and allow community member access to golf data for multiple players.

BACKGROUND

Golf is enjoyed by a wide variety of players—players of different genders and players of dramatically different ages and skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with increased availability of golf programming on television (e.g., golf tournaments, golf news, golf history, and/or other golf programming) and the rise of well known golf superstars, at least in part, have increased golf's popularity in recent years.

While golf is currently enjoyed by many, the enjoyment of the sport could be further enhanced by providing golfers with easy access to information that would allow them to improve their golf game and/or to incentives that will increase their enjoyment of the game.

Glossary of Terms:

The following terms are used in this specification, and these terms have the meanings described below, unless another meaning is specified or is clear from the context.

"Standard" information, such as "standard golf swing," "standard golf swing profile," or "standard golf swing foot force profile," means any data or information against which a given user's data or information is compared or contrasted. In many instances, the "standard" data or information will be generated or obtained from an elite player, optionally, an elite player that has one or more characteristics in common with the user for whom the comparison is being performed (e.g., similar golf club head speed, similar body type, similar golf swing signature or composite golf swing signature (as defined below), etc.). In many instances, the user (or his/her trainer or coach) will compare himself or herself against the "standard" and/or attempt to mimic some data or information of the "standard" in an effort to improve and/or realize the same or similar results to those obtained by the standard. In many instances, the action, data, information, and/or results of the "standard" may be considered as a target or goal of the user with whom the comparison is being made.

"Golf swing dynamics data" or "golf swing dynamics information" (which may be used synonymously herein) mean data or information generated and/or measured during one or more golf swings. Such data and information may relate to any one or more of: foot force exertion or foot pressure by one foot (at one or multiple locations of the foot, optionally throughout the course of a golf swing); foot force exertion or foot pressure by both feet (at one or multiple locations of each foot, optionally throughout the golf swing); an individual's weight shift or center of gravity location information (optionally throughout the course of a golf swing); center of pressure information on one or both feet (optionally throughout the course of a golf swing, e.g., a ratio of weight on the two feet throughout the course of a swing, etc.); golf club position information; golf club face orientation information; golf club speed or velocity information (optionally, at least at and around ball impact), including angular velocities; golf club acceleration information, including angular accelerations; golf club movement path direction information (optionally, at least at and around ball impact); golfer hand position, speed, acceleration, or movement path information; grip pressure and/or pressure change information (e.g., due to hand grip, optionally, for one or both hands); golfer shoulder or torso position, speed, acceleration, or movement path information; swing video from one or more angles; any of the golf swing dynamics and/or kinematics information identified in the definition of "golf swing signature" below; etc.

"Ball flight data" or "ball flight information" (which may be used synonymously herein) mean any data or information generated and/or measured as the ball launches and flies, e.g., as a result of contact with any golf club. Such data and information may relate to any one or more of: initial ball launch angle, initial ball launch speed, initial ball launch spin (e.g., backspin (e.g., in absolute spin in RPMs) and/or spin direction (e.g., side spin and direction)), initial ball launch direction, projected or actual ball carry distance, projected or actual ball roll distance, projected or actual ball travel distance, projected or actual ball apex height, projected or actual ball apex location distance, projected or actual ball to ground impact angle, golf club head speed at a ball contact time, smash factor (e.g., a ratio of initial ball launch speed to club head speed at ball contact), golf club head movement path direction at a ball contact time, projected or actual ball flight deviation from center (or from a predefined path), golf ball flight curvature information, etc. Any data measured by conventional and/or commercially available golf ball launch monitoring systems also may constitute "ball flight data" or "ball flight information."

A "golf swing signature" includes a data set including data relating to: (A) golf swing dynamics and/or kinematics information (such as dynamic foot force data generated during a golf swing; dynamic club position data (e.g., X, Y, and Z positions) generated during a golf swing; dynamic body position data generated during a golf swing; golf club path information at ball contact; golf club swing speed (optionally at least at ball contact); golf club angular velocity and/or acceleration data (including angular velocities and/or accelerations of one or more specific golf club components, such as the face, shaft, or grip); golf club yaw and/or attitude data; golf club face and/or shaft orientation data (e.g., over the course of a swing); an individual's weight shift and/or center of gravity location data or information; changes in any of the above parameters over the course of a single golf swing; etc.), and (B) at least one of: (i) player identification information, (ii) golf club identification information, (iii) golf club specification information, (iv) golf ball identification information, (v) golf ball specification information, (vi) player physical attribute information (e.g., height, inseam length, height from fingertip to ground, weight, waist size, etc.), and (vii) ball launch data (such as ball launch speed, direction, spin, carry distance, roll distance deviation from center, or any of the ball flight data or ball flight information as defined above). Each individual golf swing may have its own golf swing "signature."

A "composite golf swing signature" constitutes data or information discernable from one or more golf swing signatures and/or representative of an "average" or "typical" golf swing signature, e.g., for multiple swings by an individual and/or for multiple people. In many instances, groups of swings with common or similar general golf swing dynamics data or information may be grouped together to develop a composite golf swing signature. For example, at least some players that tend to slice the ball may have relatively similar weight transfer, center of gravity positioning, club head positioning, and/or club head or hand (or other body part) motion over the course of a golf swing (e.g., an outside-to-inside swing path, a "casting" club or arm motion, an open club face at ball contact, etc.). Predominantly hookers, faders, or drawers of the golf ball also may have similar golf swing dynamics characteristics within that grouping. Information or data for multiple swings and/or multiple people with similar golf swing dynamics information (optionally along with other data, such as player size parameters, player handicap data, etc.) may be grouped together to provide a more general or "composite" golf swing signature for that grouping. "Composite golf swing signatures" also may include specific club or club type identifier information (e.g., a person's composite golf swing signature for a driver may be different from that same person's composite golf swing signature for a fairway wood, hybrid, long iron, short iron, wedge, etc.). Thus, an individual may have plural composite golf swing signatures (e.g., different for different clubs) and the feedback received via systems and methods according to some example features of this invention (e.g., suggested remedies, including training drills swing tips, etc.) may in this manner be more targeted to specific issues faced by the player for a specific club.

A "composite golf swing signature" may include data or information representative of specific golf swing dynamics information for one person, for a group of people, or for multiple swings (e.g., average or maximum foot force dynamics values during multiple golf swings). This is not a requirement. Alternatively, by looking at multiple individual golf swing signatures, the tendencies of the individual or group can be ascertained and categorized, such as: (a) slicer, low swing speed; (b) slicer, moderate swing speed; (c) slicer, high swing speed; (d) slicer, very high swing speed; (e) fader, low swing speed; (f) fader, moderate swing speed; (g) fader, high swing speed; (h) fader, very high swing speed; (i) drawer, low swing speed; (j) drawer, moderate swing speed; (k) drawer, high swing speed; (l) drawer, very high swing speed; (m) hooker, low swing speed; (n) hooker, moderate swing speed; (o) hooker, high swing speed; (p) hooker, very high swing speed; (q) straight, low swing speed; (r) straight, moderate swing speed; (s) straight, high swing speed; (t) straight, very high swing speed; etc. These (or other) categories may be used as "composite golf swing signatures" in at least some systems and methods according to this invention.

Given these general terms and definitions, aspects of this invention now will be described in more detail.

SUMMARY

The following presents a general summary of some aspects of the invention in order to provide a basic understanding of this invention. This summary is not intended as an extensive overview of the invention. It is not intended to identify key or critical elements of the invention or to delineate the scope of the invention. The following summary merely presents some concepts of the invention in a general form as a prelude to the more detailed description provided below.

In general, some aspects of this invention relate to systems and methods for providing coaching or training information to an individual golfer based on data generated during individual golf swings. Data collection relating to the individual golf swings may take place at a stationary or dedicated training center (e.g., golf range hitting bay) and/or while the individual is actually playing a round of golf Some aspects of this invention relate to the hardware arrangement systems and/or methods that allow collection and/or use of the swing data. Such systems and methods may collect, store, and use golf swing dynamics, golf ball flight, and/or other golf swing data or information.

Additional aspects of this invention relate to the determination, storage, and use of golf swing dynamics data, golf swing signatures, or composite golf swing signatures, e.g., to provide club specification adjustment information, golf equipment selection information, golf club/ball fitting information, training drills, playing tips (e.g., for individual holes), swing tips, advertising information, etc.

Still additional aspects of this invention relate to forming and maintaining a golf community data hub to provide various services and information for golfers. Such community data hub systems and methods may provide one or more of the following: (a) storage of scoring data, swing dynamics data, ball flight data, and/or equipment data for multiple golfers; (b) at least some level of individual access to the stored data (both an individual's own data and the data of others); (c) electronic interaction between golfers within the community; and/or (d) feedback to the individual golfer.

The detection, storage, and/or use of golf swing data (e.g., golf swing signatures and/or composite golf swing signatures) and/or other golf data may be useful to individuals or groups of golfers within a community in various ways in accordance with at least some aspects of this invention. As some more specific examples, golf swing dynamics data, ball flight data, golf swing signature data, and/or composite golf swing signature data may be used to provide information to an individual golfer, e.g., regarding equipment recommendations, equipment specification adjustments, fitting information, coaching information, play advice information, etc.

Still additional aspects of this invention relate to computer-readable media that include data structures stored thereon for providing information to individuals regarding their golf swings and/or providing information to the individuals based on their type of golf swing. Such data structures may be stored and/or accessed by one or more individuals, e.g., using golf community hubs of the types described above. Such data structures may store data relating to an individual player, golf swing dynamics information for that player, golf swing signature (individual or composite) information for that player, equipment data for that player, golf scoring data for that player, equipment change information for that player, scoring or handicap change information correlated to equipment change information, etc. Other data structures in accordance with at least some examples of this invention allow storage of composite golf swing signature information and players associated with that composite golf swing signature. Still additional aspects of this invention relate to systems and methods that use these data structures.

While much of this disclosure is dedicated to describing the invention in terms of use for golf and evaluating golf swings, the invention is not so limited. Rather, training, coaching, feedback, and/or fitting systems for other sports or activities are possible without departing from this invention (e.g., for any event or activity in which specific features of body positioning, motion, form, and the like can benefit performance). As some more specific examples, aspects of this invention may be extended to and used in evaluating and providing feedback for users involved in the following activities: throwing (or pitching) a baseball, softball, cricket ball, lacrosse ball, darts, horseshoes, or the like; passing or pitching a football; shooting a basketball; jumping (including jumping hurdles); launching from sprinter starting blocks or swimmer starting blocks; running (including jogging, sprinting, distance running, etc.); kicking a football, soccer ball, or the like; hitting a baseball, softball, cricket ball, hockey puck, field hockey ball, tennis ball, volley ball, handball, squashball, and the like; catching any type of ball; participating in conventional track field events; performing gymnastics moves; boxing; cycling; figure skating; swimming; diving; dancing; ballet; etc.

These and other additional aspects of this invention will become more evident from the detailed description of the invention provided below.

BRIEF DESCRIPTION OF THE DRAWINGS

A more complete understanding of the present invention and certain advantages thereof may be acquired by referring to the following detailed description in consideration with the accompanying drawings, in which the same reference numbers indicate the same or similar features, and wherein:

FIGS. 9A through 10B illustrate example golf swing analysis data collection and feedback systems, at least some of which are incorporated into a golf cart;

FIGS. 11A through 12B illustrate example golf swing analysis data collection and feedback systems, at least some of which are incorporated into a golf bag;

FIGS. 15A through 15C illustrate examples of scoring data and information in computer generated user interface screens that may be provided in systems and methods according to at least some examples of this invention;

DETAILED DESCRIPTION

Figure 1:
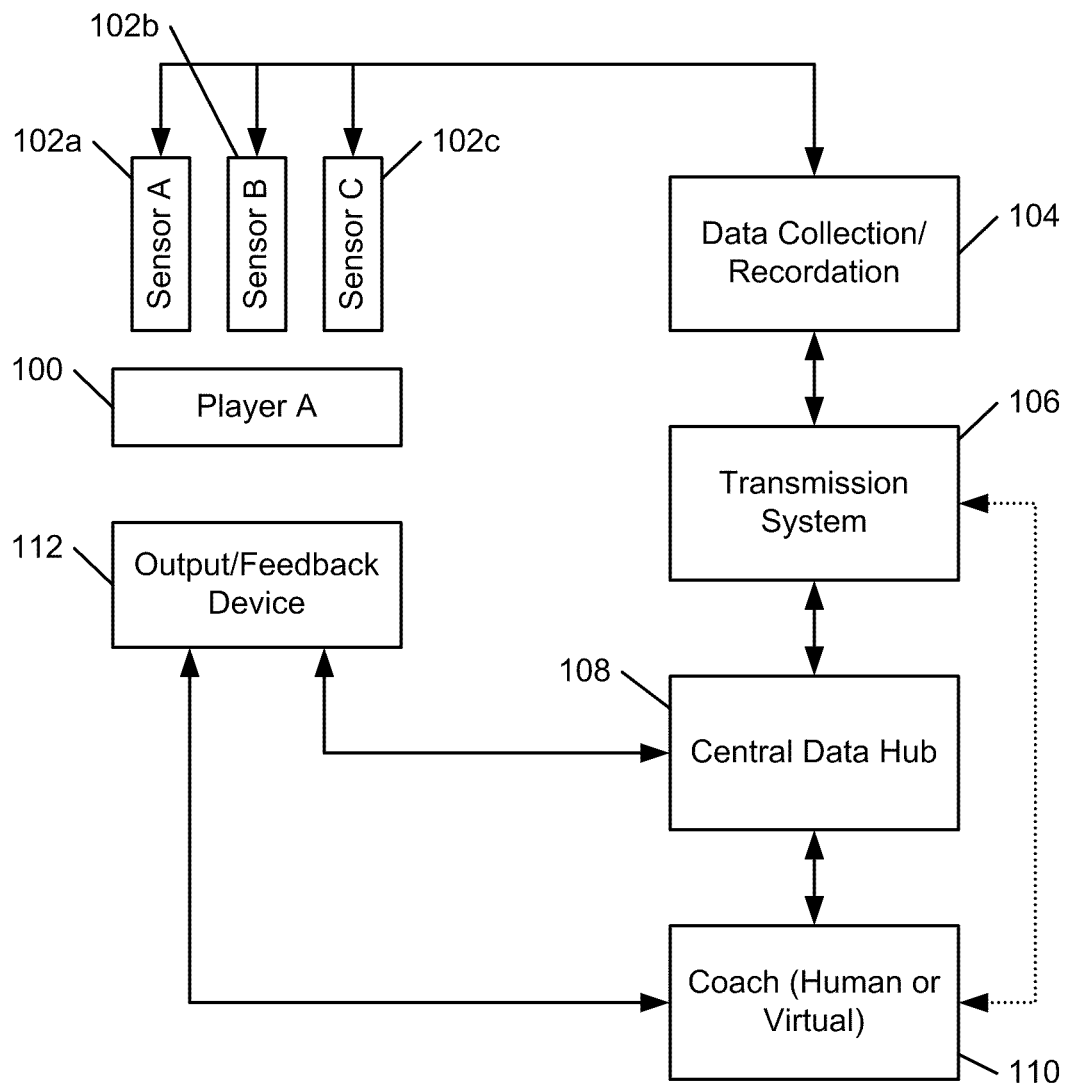
FIG. 1 schematically illustrates equipment involved in community data hub type swing analysis systems and methods according to some examples of this invention.

A general description of aspects of the invention followed by a more detailed description of specific examples of the invention follows.

A. General Description of Various Aspects of the Invention

1. Individual Training, Coaching, and/or Equipment Fitting Aspects and Features

At least some aspects of this invention relate to golf swing evaluation systems and methods for providing individual training, coaching, and/or equipment fitting information to a user. Golf swing evaluation systems and methods according to at least some examples of this invention may include one or more of the following: (a) a first sensor system for detecting golf swing dynamics information generated by a first user during one or more golf swings; (b) a second sensor system for detecting ball flight information when one or more golf balls are hit by the first user; (c) a transmission system for transmitting data to a swing analysis system (optionally at a location remote from the first user), the data transmitted by the transmission system corresponding to or being derived from the information collected by the first and second sensor systems; and (d) an output system for providing coaching, training, and/or equipment fitting information for the first user, wherein at least some of this information provided by the output system is generated by the swing analysis system or derived from data generated by the swing analysis system. Additionally, a memory may be provided for receiving data generated by the first and second sensor systems and storing the data before transmission to the swing analysis system.

Optionally, if desired, a separate swing analysis system may be eliminated and/or at least some of the data processing involved in systems and methods according to examples of this invention may take place on board the equipment used in sensing the golf swing dynamics information and/or the ball flight information (e.g., in data processing systems (e.g., microprocessors) provided with any shoe based sensor(s), club based sensor(s), user carried sensor(s), apparel based sensor(s), glove based sensor(s), ball flight monitor sensor(s), etc.). Thus, at least some local data processing is possible before and/or without sending data to a separate swing analysis system.

Such systems and methods further may include one or more alignment systems, e.g., for providing information to the first user regarding: (a) a preferred or target golf ball flight direction, (b) a golf ball start or tee location with respect to a location at least some portion of the first or second sensor systems, (c) a stance set up location with respect to a ball launch location (which may depend, at least in part, on a golf club being used by the first user for that individual swing, some aspect of the user's size, etc.), and/or (d) proper alignment or positioning of at least one of the first sensor system or the second sensor system with respect to at least one of a first user stance position or a golf ball start location. At least some portions of these alignment systems may be stationary (e.g., fixed in a driving range/golf ball hitting bay) or portable (e.g., carried by the golfer or a caddie, worn by the golfer or a caddie, carried on a golf cart, carried on a golf bag, etc.). The alignment system(s) may include any devices or methods to assist in alignment such as: at least one light generating device that projects light to provide the alignment information (e.g., at the surface on which the user stands); at least one laser generating device that projects a laser beam to provide the alignment information (e.g., at the surface on which the user stands); a series of lights visible at a surface on which the user stands when hitting golf balls; a grid system on a surface on which the user stands when hitting balls; one or more lines visible at a surface on which the user stands when hitting golf balls (e.g., permanently provided on or projected onto the surface on which the user stands); etc.

The sensor system for detecting golf swing dynamics information generated by a user during one or more golf swings may determine any desired parameter(s) without departing from this invention, including one or more of: foot force exertion or foot pressure by one foot (at one or multiple locations of the foot, optionally throughout the golf swing); foot force exertion or foot pressure by both feet (at one or multiple locations of each foot, optionally throughout the golf swing); weight shift or center of gravity location information; center of pressure information on one or both feet (e.g., a ratio of weight on the two feet, etc.); golf club position information; golf club speed or velocity information (optionally, at least at and around ball impact); golf club acceleration information; golf club movement path direction information (optionally, at least at and around ball impact); golfer hand position, speed, acceleration, or movement path information; golfer shoulder or torso position, speed, acceleration, or movement path information; golf grip pressure and/or pressure change information (due to hands gripping the club, optionally for one or both hands); etc. Any types of detectors or sensors may be used without departing from this invention, such as accelerometers, motion detectors, infrared detectors, pressure or force sensors, gyrometers, magnetometers, etc. Also, this sensor system may include one or more video cameras arranged to record the golf swing, e.g., from behind the golfer, from a "face on" location with respect to the golfer, from overhead, etc., and/or to record the club head/ball contact. At least some data generated by the various golf swing dynamics sensor systems (and even all of the generated data) may be time stamped (e.g., to allow comparisons over time and/or to allow correlation with other collected data, such as the ball flight information for that same swing). In particular, in at least some example systems and methods according to this invention, foot force data, club/swing data, and/or body based sensor data will be time stamped and/or otherwise stored so as to allow correlation of the collected data with respect to time.

The sensor system for detecting ball flight information also may determine any desired parameter(s) without departing from this invention. Examples of the detected or determined parameters may include, for example, any one or more parameters determined by golf ball launch monitoring systems, such as initial ball launch angle, initial ball launch speed, initial ball launch spin (e.g., absolute spin (e.g., in RPMs) and/or spin direction), initial ball launch direction, projected or actual ball carry distance, projected or actual ball roll distance, projected or actual ball travel distance, projected or actual ball apex height, projected or actual ball apex location distance, projected or actual ball to ground impact angle, golf club head speed at a ball contact time, "smash factor" (e.g., ratio of ball launch velocity to club head velocity at impact with the ball), golf club head movement path direction at a ball contact time, projected or actual ball flight deviation from center (or from a predefined path), golf ball flight curvature, etc. Golf ball launch monitoring systems that may be used for at least some example aspects of this invention are conventionally known in the art. At least some data generated by the various ball flight sensor systems (and even all of the generated data) may be time stamped (e.g., using a common clock with that used for the golf swing dynamics sensor system(s) mentioned above) to allow time correlation of the collected data.

If desired, at least one of the golf swing dynamics sensor system or the ball flight sensor system may audio record a sound generated when the golf ball is struck. This data may be useful to a human swing analyzer and/or a computer based swing analysis system to provide feedback on the quality of the golf club head/ball contact (e.g., to enable a determination of whether the ball was hit after the ground surface was hit, the squareness of the hit, the face location of the hit on the club head, etc.).

Any desired type of data transmission system and method may be used without departing from this invention, including wired or wireless transmission, optionally over a networked connection (such as the Internet). Data transmission capabilities may be provided in any desired hardware associated with the analysis systems and methods, including, for example: in one or both shoes worn by the user when hitting golf balls; engaged with a surface on which the user stands when hitting golf balls (e.g., in a driving range bay); in a golf club used for hitting golf balls; in an article of apparel worn by the user when hitting golf balls; as part of a golf ball hitting bay; engaged with a golf cart (a self-propelled or user propelled golf cart); engaged with a golf bag; provided with a portable electronic device (such as a cellular telephone, a PDA, a GPS device, etc.); provided with a personal computer; etc.

Systems and methods according to the invention may provide output in any desired manner without departing from this invention. As some more specific examples, the output systems may include a display screen or other output device(s) (such as a television, computer monitor, cellular telephone, portable electronic device, etc.) for displaying audio, video, and/or a textual information; a tactile sensation creating device (such as electrodes, sharpened elements, vibratory elements, etc.), e.g., to change the tactile sensations experienced by the user during the course of a golf swing and/or to cause a reflexive action by the golfer during the course of a golf swing; a tempo providing device (such as a metronome or other patterned audio information); etc. The output may include any desired coaching or training information (made available to the player and/or his/her coach), such as swing tips; swing advice; training drills; swing demonstrations by a third party; comparisons of the user's swing with "standard information" (such as a comparison with swing or club positioning of another player, comparison with the swing tempo of another player, etc.); comparisons of the user's swing against his/her swing at a different time (e.g., before lessons were undertaken, to show improvement, to show reversion to old habits or form, etc.); etc. Additionally or alternatively, the output may include equipment adjustment, equipment recommendation, and/or equipment fitting information.

If desired, at least one set of golf swing data is generated using the golf swing dynamics information and/or the ball flight information generated during a single golf swing by the first user. Also, if desired, at least some portions of the first sensor system, the second sensor system, the transmission system, and/or the output system may be portable so as to allow use during play of a round of golf (e.g., to enable the golfer to receive a "playing lesson" or to record swings during actual play (as opposed to just on the range)).

When used for equipment fitting, systems and methods according to at least some examples of this invention may provide information to the user (e.g., the golfer, an equipment fitting professional, a coach, a trainer, another third party, etc.) via the output system that includes: golf club lie angle information (including recommendations for changes to an existing golf club lie angle); golf club face angle information (including recommendations for changes to an existing golf club face angle); golf club loft angle information (including recommendations for changes to an existing golf club loft angle); golf ball selection information (including recommendations to try a different golf ball model); golf club selection information for woods or irons (including recommendations to try a different club head make, model, or other parameter); golf club shaft information (including recommendations for different shaft models, different shaft characteristics (such as flex, kick point location, materials, etc.)); golf club apparel information (including recommendations to try different shoes, traction element patterns, gloves, clothing, etc.); etc.

Additional features of this aspect of this invention relate to methods of operating and/or using the golf swing evaluation systems described above to provide individual training, coaching, and/or equipment fitting information (e.g., clubs, balls, shoes, apparel, etc.) to a user (e.g., suggested club lie, loft, and/or face angles; shaft recommendations (e.g., flex, kickpoint, materials, etc.); ball specifications (e.g., make, model, type, hardness, etc.); footwear traction element or spike types and/or patterns; etc.). Such methods may include at least some steps performed by a computer (such as receiving input data, transmitting output data, collecting sensor data, storing data, processing data, generating output, displaying output, etc.). Aspects of this invention also may relate to hardware for performing and steps performed by systems and methods of the invention in a client/server based computer arrangement, and features of the invention may be practiced solely at the client side, solely at the server side, or at both the client and server sides. Still additional aspects of this invention may relate to computer readable media that include computer executable instructions stored thereon for operating the hardware systems and/or performing the methods described above (and described in more detail below).

2. Golf Statistical Community and Hub Aspects and Features

At least some aspects of this invention relate to collection of golf data from a plurality of players (a "community" of golfers or players) and providing feedback or other information to individuals within the community based at least in part on the collected information from this community. Such golf community systems and methods may include, for example: (a) an input system for receiving golf statistical data from a community of golfers including a first golfer; (b) a storage system for storing golf statistical data received from the community of golfers; and (c) an output system for transmitting information to the first golfer, wherein the information transmitted to the first golfer via the output system includes: (i) statistical information for the first golfer and (ii) statistical information for at least a first portion of the community of golfers. Such systems and methods also may receive input from and generate output based on information obtained from other sources as well, such as the USGA or other handicap maintenance organizations; one or more golf courses (e.g., scorecard information, daily tee locations, daily pin placements, yardages, hole handicaps, slope, course rating information, etc.); map data; professional (or other player) tips for playing individual holes (e.g., from PGA Tour players or PGA of America instructors); advertisements and other third party information; etc. The golf statistical data obtained from the first golfer via the input system in some example systems and methods allows determination and/or display of one or more of the following: a golf score for an individual hole played during a round of golf; a golf score for a plurality of holes played during a round of golf; a golf score for all holes played during a round of golf; a number of fairways hit from a tee shot during a round of golf; a number of fairways missed left from a tee shot during a round of golf; a number of fairways missed right from a tee shot during a round of golf; a number of fairways missed short from a tee shot during a round of golf; a number of fairways missed long from a tee shot during a round of golf; a number of greens in regulation hit during a round of golf; a number of putts played during a round of golf; an average number of putts played per green hit in regulation during a round of golf; a number of sand saves made during a round of golf; a number of penalty strokes incurred during a round of golf; an overall length of putts made during a round of golf; and a number of times making a score of par or better when missing a green in regulation during a round of golf.

Some of this data may be determined automatically, using GPS and/or map data and/or based on sensor input (e.g., a club sensor detecting contact with a ball). As some more specific examples, the various sensors may be relied upon to determine, at least in part, when a player has gone out of bounds, number of fairways hit (or missed) from the tee, number of fairway misses left, number of fairway misses right, number of fairways misses short, number of fairway misses long, number of greens hit (or missed) in regulation, number of greens missed left, number of greens missed right, number of greens missed short, number of greens missed long, number of bunkers hit, percentage of sand saves, percentage of successful "up and downs," number of putts, number of strokes, number of times using each club, distances of each shot, etc. Optionally, if desired, some of the necessary data or information may be entered into the system manually by the player (e.g., during play) and/or the player may be given an opportunity to override or correct any automatically generated data (e.g., to add penalty strokes, correct erroneously determined data, etc.).

As noted above, output systems according to this example aspect of the invention may provide statistical information to the user for at least a portion of the community of golfers. This "portion" of the community of golfers may include any desired number of members that input data to or use the system up to and including all golfers that utilize the golf community system. As some more specific examples, the "portion" of the community for which statistical information is provided to users may include information for golfers within the community having a handicap within a predetermined range of a handicap of the first golfer (e.g., within ±1 point of the user's current handicap) or information for golfers included in a user defined sub-community (e.g., golfers identified as "friends," golfers that have agreed to share their statistical data with others, golfers participating in a user's group on the course and/or a specified event, etc.). As another example, the "portion" of the community for which statistical information is provided to the user may include another individual golfer.

The golf statistical data obtained from and/or transmitted to the first golfer via the input system in some example systems and methods allows determination and/or display of one or more of the following: an average golf score for the first golfer on an individual hole over a plurality of times playing the individual hole; an average golf score per round for the first golfer over a plurality of rounds of golf; an average number of fairways hit from a tee shot per round by the first golfer over a plurality of rounds of golf; an average number of fairways missed left from a tee shot per round by the first golfer over a plurality of rounds of golf; an average number of fairways missed right from a tee shot per round by the first golfer over a plurality of rounds of golf; an average number of fairways missed short from a tee shot per round by the first golfer over a plurality of rounds of golf; an average number of fairways missed long from a tee shot per round by the first golfer over a plurality of rounds of golf; an average number of greens hit in regulation per round by the first golfer over a plurality of rounds of golf; an average number of putts played per round by the first golfer over a plurality of rounds of golf; an average number of putts played per green hit in regulation by the first golfer over a plurality of rounds of golf; an average number of sand saves made per round by the first golfer over a plurality of rounds of golf; an average number of penalty strokes incurred per round by the first golfer over a plurality of rounds of golf; an average number of times making a score of par or better by the first golfer when missing a green in regulation over a plurality of rounds of golf; an average total length of putts made by the first golfer over a plurality of rounds; an average golf score for the first portion of the community of golfers on an individual hole; an average golf score for the first portion of the community of golfers on an individual golf course; an average number of fairways hit from a tee shot per round by the first portion of the community of golfers on an individual golf course; an average number of fairways missed left from a tee shot per round by the first portion of the community of golfers on an individual golf course; an average number of fairways missed right from a tee shot per round by the first portion of the community of golfers on an individual golf course; an average number of fairways missed short from a tee shot per round by the first portion of the community of golfers on an individual golf course; an average number of fairways missed long from a tee shot per round by the first portion of the community of golfers on an individual golf course; an average number of greens hit in regulation per round by the first portion of the community of golfers on an individual golf course; an average number of putts played per round by the first portion of the community of golfers on an individual golf course; an average number of putts played per green hit in regulation by the first portion of the community of golfers on an individual golf course; an average number of sand saves made per round by the first portion of the community of golfers on an individual golf course; an average number of penalty strokes incurred per round by the first portion of the community of golfers on an individual golf course; an average number of times making a score of par or better when missing a green in regulation by the first portion of the community of golfers on an individual golf course; an average length of putts made by the first portion of the community of golfers on an individual golf course; an average golf score for the first portion of the community of golfers for a round of golf; an average number of fairways hit from a tee shot per round by the first portion of the community of golfers; an average number of fairways missed left from a tee shot per round by the first portion of the community of golfers; an average number of fairways missed right from a tee shot per round by the first portion of the community of golfers; an average number of fairways missed short from a tee shot per round by the first portion of the community of golfers; an average number of fairways missed long from a tee shot per round by the first portion of the community of golfers; an average number of greens hit in regulation per round by the first portion of the community of golfers; an average number of putts played per round by the first portion of the community of golfers; an average number of putts played per green hit in regulation by the first portion of the community of golfers; an average number of sand saves made per round by the first portion of the community of golfers; an average number of penalty strokes incurred per round by the first portion of the community of golfers; an average number of times making a score of par or better when missing a green in regulation by the first portion of the community of golfers; and an average length of putts made per round by the first portion of the community of golfers.

When these example systems and methods provide data for multiple rounds of golf (either for an individual or for some portion of the community), the plurality of rounds of golf may have occurred on a single golf course (optionally from the same set of tees on that golf course) or on multiple golf courses. If desired, when this type of data is compiled for multiple golf courses, the compiled data may be limited to courses having similar lengths (for the tees used by the golfers during the rounds) or other similarities in the degree of difficulty (e.g., similar slope ratings, similar other ratings, etc.). As additional examples, the plurality of rounds used for providing at least some of the displayed information may include all rounds by one or more of the golfers or may be limited to a subset of the rounds, such as: the rounds utilized in determining a handicap of the golfer; a predetermined number of most recently played rounds; all rounds played since completion of some course renovation; all rounds played since a specified date; all rounds played since a specific equipment change, etc.

The hardware or equipment used for operating the above described community systems may be present predominantly or exclusively on a server side of a client/server arrangement. Equipment for a client side of golf analysis systems of this type according to at least some aspects of this invention may include: (a) an input system for receiving from a golf data hub: (i) golf statistical data relating to play by a first golfer and (ii) golf analysis information, wherein the golf analysis information received from the golf data hub includes statistical information for at least a first portion of a community of golfers; (b) an output system for transmitting golf play data from the first golfer to the golf data hub; and (c) a display system for displaying information to the first golfer, wherein the information displayed to the first golfer includes statistical information for the first golfer and statistical information for at least the first portion of the community of golfers. Such systems may allow generation of displays including any of the information and data (and any combination thereof) described above. The information displayed by the display system may include information to allow a comparison of the first golfer's golf statistical data with corresponding data from at least one other member of the community of golfers, including, for example, all golfers in the community, golfers having a handicap within a predetermined range of a handicap of the first golfer, golfers within a user defined sub-community, one or more specific individual golfers, golfers (optionally of a similar skill level or designated individuals) that have played the same course, etc. This golf analysis system may be provided, in at least some examples of this invention, on a portable electronic device or a personal computer device operated by the first user, optionally during the course of a round of golf Optionally, if desired, the input system may receive user input indicating one or more statistics for inclusion in the comparison provided to the output system. As another potential option, the output system may provide comparisons of statistical information for a plurality of different golf statistics (optionally user selectable golf statistics).

Another golf community aspect of this invention relates to the ability of members of the community (or other third parties) to interact with one another, optionally while at least one member is playing golf For example, using the community aspects of systems and methods according to at least some examples of this invention, one player (or other entity) can set up challenges for another player. While any desired type of challenge can be provided, some examples include challenges involving one or more of the following: a longest drive contest; a best 9 hole gross score; a best 18 hole gross score; a best 9 hole net score to handicap; a best 18 hole net score to handicap; a best score on an individual hole; most rounds played within a predetermined time period; lowest handicap by a specified date; greatest improvement in handicap over a prescribed time or number of rounds; a longest drive on a specified golf hole; a best 9 hole net or gross score on a specified golf course; a best 18 hole net or gross score on a specified golf course; a race to a predetermined number of rounds played; a race to a specific statistical level of a golf statistic; and greatest improvement in a specified golf statistic over a prescribed time period or number of rounds. Additionally or alternatively, if desired, one member of the community can provide encouragement, consolation, or other message information for another player, optionally, during the course of a round.

Some more specific examples of golf community systems according to this aspect of the invention may include: an input system for receiving: (a) golf statistical data from a community of golfers including at least a first golfer, and (b) data including golf challenge information (or other communication information) from a third party for receipt by the first golfer; and an output system for transmitting information to the first golfer, wherein the information transmitted to the first golfer via the output system includes data including the golf challenge (or other) information or data derived from the golf challenge (or other) information. Such systems further may include a processing system programmed and adapted to compare golf scoring or statistical data input from the first golfer with data relating to the golf challenge information input by the third party to determine a result of the golf challenge, and the output system may then further transmit information relating to the result of the golf challenge to the first golfer and/or to the third party.

The above described community system may be present predominantly or exclusively on a server side of a client/server arrangement. Equipment for a client side golf analysis system of this type according to at least some aspects of this invention may include: an input system for receiving: (a) golf statistical data from a first golfer and (b) data including golf challenge (or other) information from a third party; an output system for transmitting golf play data from the first golfer to a golf data hub that stores golf statistical data for a community of golfers including the first golfer; and a display system for displaying information to the first golfer, wherein the information displayed to the first golfer includes the golf challenge (or other) information or information derived from the golf challenge (or other) information. This system may further include a processing system programmed and adapted to compare golf play data or golf statistical data from the first golfer with data relating to the golf challenge information received through the input system to determine a result of the golf challenge. This golf analysis system may be provided, in at least some examples of this invention, on a portable electronic device or a personal computer device operated by the first user, optionally during the course of a round of golf If desired, systems and methods according to at least some examples of this aspect of the invention may receive input regarding a location of the first golfer, e.g., using a global positioning satellite system or using golf scoring information added as the round of golf progresses. In such systems, the display system may be triggered to display the golf challenge (or other) information or the information derived from the golf challenge (or other) information based on information regarding the location of the first golfer.

Additional features of this aspect of this invention relate to methods of operating and/or using the golf community and/or analysis systems described above, e.g., to provide challenge or other information to a player from a third party (optionally, from another member of the golf community). Such methods may include at least some steps performed by a computer (such as receiving input data, transmitting output data, collecting sensor data, storing data, processing data, generating output, displaying output, etc.). Aspects of this invention also may relate to hardware and steps performed by systems and methods of the invention in a client/server based computer arrangement, and features of the invention may be practiced solely at the client side, solely at the server side, or at both the client and server sides. Still additional aspects of this invention may relate to computer readable media that include computer executable instructions stored thereon for operating the hardware systems and/or performing the methods described above (and described in more detail below).

3. Golf "Swing Signature" Aspects and Features

Various aspects of this invention relate to aspects and features of storing and using data relating to various features of an individual golf swing, e.g., in terms of a "golf swing signature" and/or a "composite golf swing signature." An individual golf swing signature or composite golf swing signature for a player may be determined, and that determined signature information may be compared against known golf swing signature and composite golf swing signature information in order to provide useful information or feedback to the player. For example, the stored golf swing signatures and/or composite golf swing signatures may be correlated to suggested equipment, equipment parameters, training drills, coaching information, training aids, swing tips, other remedies, and the like. Thus, a new golf swing signature or composite golf swing signature being evaluated may be compared or categorized based on stored golf swing signatures and/or composite golf swing signatures, e.g., for the overall community, and the community systems and methods according to some examples of this invention can then quickly and easily provide this golfer with information (e.g., coaching, training, or fitting information) based on information obtained from the overall community or other sources. Optionally, the information provided to the golfer may come from other sources of information, such as a teacher, coach, the PGA of America, the USGA, the PGA Tour, other professional tours, etc.

Golf swing signatures can be used in golf community systems and methods in various ways in accordance with this invention. For example, as noted above, golf swing signatures can be used to provide coaching or training information, to provide golf club fitting information, to provide golf club parameter adjustment or change information, to provide golf equipment recommendation information (such as golf club model, golf club specification, golf ball model, etc.), etc. Such golf swing analysis systems and methods may include, for example: (A) a storage system for storing data relating to at least one of: (i) golf swing dynamics information for a plurality of individual golfers in a community of golfers, (ii) golf swing signatures for at least some of the plurality of individual golfers in the community of golfers, or (iii) a plurality of composite golf swing signatures for the community, wherein each composite golf swing signature for the community is representative of golf swing signatures of a subset of one or more golfers in the community of golfers; (B) an input system for receiving input data relating to one or more golf swings of a first golfer, wherein the input data includes at least one of: (i) golf swing dynamics information relating to one or more golf swings made by a first golfer, (ii) golf swing signatures for one or more golf swings made by the first golfer, or (iii) a composite golf swing signature for the first golfer, wherein the composite golf swing signature for the first golfer is developed based on one or more golf swings made by the first golfer; and (C) an output system for transmitting information to the first golfer (or others, such as a trainer or coach, club fitter, etc.), wherein the information transmitted to the first golfer via the output system includes at least one of: (i) golf equipment recommendation information, (ii) golf equipment parameter change information, and (iii) golf training or coaching information, wherein the information transmitted to the first golfer is determined, at least in part, from the input data relating to the golf swing(s) of the first golfer.

The input system for this type of golf swing analysis system also may build up a library of golf swing dynamics information and data, e.g., as more and more users join the community. Thus, the input system further may receive input data relating to golf swings of the community including at least one of: (a) the golf swing dynamics information for the plurality of individual golfers in the community of golfers, (b) the golf swing signatures for at least some of the plurality of individual golfers in the community of golfers, or (c) the plurality of composite golf swing signatures for the community. If raw golf swing dynamics information is received at the input, systems and methods according to at least some examples of this invention may include a processing system for converting the golf swing dynamics information or otherwise generating a golf swing signature for each swing and/or a composite golf swing signature for the individual.

Community based systems and methods according to at least some examples of this invention also may store golf equipment information for individual golfers that may be correlated to one or more of: the golfer's swing dynamics information, the golfer's golf swing signature(s), and/or the golfer's composite golf swing signature. In this manner, when users with similar golf swing dynamics and/or golf swing signatures (including composite golf swing signatures) are identified, one player may be able to benefit from knowing the equipment choices of the other player (and/or the community system may suggest equipment for one player based on the equipment used by another player with the same or similar swing dynamics and/or golf swing signatures (including composite golf swing signatures)). Furthermore, changes in golf equipment used by the player may be stored in the community system, as well as changes in golf score or handicap after changes in the golf equipment, and an individual golfer and/or others in the community may benefit from the knowledge of the impact of an equipment change on a player's score or handicap.

Additional features of this aspect of this invention relate to methods of operating and/or using the golf community and/or analysis systems described above, e.g., to provide golf equipment recommendation information, golf equipment parameter change information, and/or golf training or coaching information, wherein the information transmitted to the first golfer is determined, at least in part, based on data collected from others within a golf community. Such methods may include at least some steps performed by a computer (such as receiving input data, transmitting output data, collecting sensor data, storing data, processing data, generating output, displaying output, etc.). Aspects of this invention also may relate to hardware and steps performed by systems and methods of the invention in a client/server based computer arrangement, and features of the invention may be practiced solely at the client side, solely at the server side, or at both the client and server sides. Still additional aspects of this invention may relate to computer readable media that include computer executable instructions stored thereon for operating the hardware systems and/or performing the methods described above (and described in more detail below). Additional features of this invention relate to computer readable media that include data structures stored thereon for storing and/or providing access to one or more of: (i) golf swing dynamics information for an individual golfer and/or an individual golf swing; (ii) golf swing signatures for an individual golfer and/or an individual golf swing; and/or (iii) composite golf swing signatures for an individual golfer and/or plural golfers within a community.

4. Foot Force Detection Aspects and Features

Additional aspects of this invention relate to golf swing evaluation systems and methods that include dynamic foot force sensing capabilities during a golf swing. Such systems and methods may include or utilize one or more of: (a) a first force sensing system (optionally incorporated into an article of footwear that may have data processing capabilities) for determining forces exerted by one or more areas of a first foot of a user with respect to time over a course of a golf swing; (b) a second force sensing system (optionally incorporated into another article of footwear that may have data processing capabilities) for determining forces exerted by one or more areas of a second foot of the user with respect to time over the course of the golf swing; (c) a memory system for storing data collected by the first and second force sensing systems or data derived from the data collected by the first and second force sensing systems; (d) means for displaying at least one of information indicative of the forces exerted by the first foot of the user with respect to time over the course of the golf swing and information indicative of the forces exerted by the second foot of the user with respect to time over the course of the golf swing; (e) means for comparing: (i) at least one of information indicative of the forces exerted by the first foot of the user with respect to time over the course of the golf swing or information indicative of the forces exerted by the second foot of the user with respect to time over the course of the golf swing with (ii) a standard golf swing foot force profile (which may include preferred weight shift information, preferred center of weight information, etc.); and/or (f) means for determining and/or displaying information indicative of the position of the golf club or a portion of the user's body with respect to time over the course of the golf swing. The foot force sensing systems may determine center of force and/or user weight shift information. When the force sensing system(s) is (are) incorporated into article(s) of footwear, the article(s) of footwear may be of a type that will enable the foot force determinations to be made on a golf course, during actual play of golf (e.g., the article(s) of footwear may have outsoles with golf traction elements integrally formed therein or engaged therewith).

Other example golf swing evaluation systems and methods in accordance with at least some examples of this invention include one or more of the following: (a) a first force sensing system for determining forces exerted by one or more areas of a first foot of a user with respect to time over a course of a golf swing; (b) a golf swing dynamics sensing system for determining golf swing dynamics information (e.g., club position, body position, club head speed, etc.) generated by the user with respect to time over the course of the golf swing; (c) a memory system for storing data collected by the first force sensing system and the golf swing dynamics sensing system or data derived from the data collected by the first force sensing system and the golf swing dynamics sensing system; (d) means for displaying at least one of information indicative of the forces exerted by the first foot of the user with respect to time over the course of the golf swing and information indicative of the golf swing dynamics with respect to time over the course of the golf swing; (e) means for comparing: (i) at least one of information indicative of the forces exerted by the first foot of the user with respect to time over the course of the golf swing or information indicative of the golf swing dynamics with respect to time over the course of the golf swing with (ii) a standard golf swing profile; and/or (f) means for simultaneously displaying: (i) at least one of information indicative of the forces exerted by the first foot of the user with respect to time over the course of the golf swing or information indicative of the golf swing dynamics with respect to time over the course of the golf swing and (ii) a standard golf swing profile. The foot force sensing system may be provided in a shoe, as part of a golf ball driving range platform (on which the user stands to launch balls), etc. Also, such systems could provide foot force data for both feet, if desired.

Additional features of this aspect of this invention relate to methods of operating and/or using the foot force detection systems described above, e.g., to provide golf swing information. Such methods may include at least some steps performed by a computer (such as receiving input data, transmitting output data, collecting sensor data, storing data, processing data, generating output, displaying output, etc.). Aspects of this invention also may relate to hardware and steps performed by systems and methods of the invention in a client/server based computer arrangement, and features of the invention may be practiced solely at the client side, solely at the server side, or at both the client and server sides.

Still additional aspects of this invention may relate to computer readable media that include computer executable instructions stored thereon for operating the hardware systems and/or performing the methods described above (and described in more detail below).

5. Additional Hardware Aspects and Features

Additional aspects and features of this invention relate to the hardware used in collecting the golf data, e.g., for transmission to the data hub and/or other uses. One more specific example of this aspect of the invention includes golf swing evaluation systems that include one or more of: (a) a golfer positioning system for providing information regarding an initial stance location with respect to at least one of an initial ball launch location or a desired ball flight direction; (b) a first sensor system provided at a first location for detecting golf swing dynamics information generated during golf swings (e.g., forces exerted by one or more of the golfer's feet during a golf swing); (c) a second sensor system provided at the first location for detecting ball flight information when golf balls are hit (e.g., a ball launch monitor); (d) a transmission system for transmitting data to a swing analysis system provided at a location remote from the first location (e.g., a central golf data hub), the data transmitted by the transmission system corresponding to or being derived from the information collected by the first and second sensor systems; (e) an output system for providing golf swing feedback or analysis information at the first location, wherein at least some of the golf swing feedback or analysis information provided at the first location is generated by the swing analysis system or derived from data generated by the swing analysis system; and/or (f) an alignment system (e.g., for providing information regarding a preferred golf ball flight direction, for providing information regarding a golf ball start location with respect to a location at least some portion of the second sensor system, for providing information to assure that at least one of the first sensor system or the second sensor system is properly positioned with respect to at least one of a first user stance position or a golf ball start location, etc.). Systems and methods of this type may be provided in or practiced at a golf driving range hitting bay or on the course.

The information provided regarding the initial stance location for an individual swing by the golfer positioning system may depend, at least in part, on various factors, such as: the specific golf club being used for that individual swing, one or more physical size characteristics of a person making that individual swing, etc. The information may be provided in a variety of ways, such as by at least one light generating device that projects light to provide the initial stance location information (onto a surface), by at least one laser generating device that projects a laser beam to provide the initial stance location information (onto a surface), by a series of lights visible at a surface on which the first user stands when hitting golf balls, by grid lines on a surface, by other lines on a surface, etc.

Additional aspects of this invention relate to golf equipment that has data collection and/or storage capabilities that will, optionally, allow swing data to be collected while the user plays an actual round of golf Such golf equipment may include, for example, a golf bag including an open ended container for holding a plurality of golf clubs that includes a data input system engaged therewith for receiving data relating to at least one of: (a) golf swing dynamics information generated during golf swings (e.g., foot force data, video camera data, etc.), and (b) ball flight information (e.g., launch monitor data, etc.) when golf balls are hit. As another example, such golf equipment may include a golf cart for transporting golf equipment on a golf course that includes a data input system of the type described above engaged therewith. The term "golf cart," as that generic term is used herein (and unless otherwise noted) includes both self propelled, motorized golf carts (e.g., gas or electric carts) and user propelled golf carts (e.g., pull carts, push carts, etc.).

Such systems may further include: a transmission system engaged with the golf bag or golf cart for transmitting data to a swing analysis system, the data transmitted by the transmission system corresponding to or being derived from the data received by the data input system; a data receiving system engaged with the golf bag or golf cart for receiving golf swing feedback or analysis information generated by or derived from the swing analysis system; an output system for providing a user perceptible output based on the golf swing feedback or analysis information received at the data receiving system; and/or an alignment system engaged with the golf bag or golf cart (e.g., for providing information regarding a preferred golf ball flight direction with respect to the golf bag or golf cart, for providing information regarding a golf ball start location with respect to the golf bag or golf cart, for providing information regarding a user's stance set up location with respect to the golf bag or golf cart, for providing information to assure that at least some portion of the data input system is properly positioned with respect to at least one of a user stance position, a golf ball start location, or a desired initial golf ball flight direction, etc.).

The data input systems in systems and methods according to at least some examples of this aspect of the invention may receive data from any suitable sources. In some more specific examples, the data input system will receive data transmitted from a shoe, from a golf club, from an article of apparel, or the like. The input data may include, for example, data relating to the golf swing dynamics information generated during golf swings and/or data relating to the ball flight information when golf balls are hit.

Additional potential features of this aspect of this invention relate to methods of operating and/or using the equipment described above, e.g., to provide golf swing information. Such methods may include at least some steps performed by a computer (such as receiving input data, transmitting output data, collecting sensor data, storing data, processing data, generating output, displaying output, etc.). Still additional aspects of this invention may relate to computer readable media that include computer executable instructions stored thereon for operating the hardware systems and/or performing the methods described above (and described in more detail below).

Specific examples of the invention are described in more detail below. The reader should understand that these specific examples are set forth merely to illustrate examples of the invention, and they should not be construed as limiting the invention.

B. Specific Examples of Systems and Methods According to the Invention

The various figures in this application illustrate examples of features of golf swing analysis systems and methods and golf community data hub systems and methods in accordance with examples of this invention. When the same reference number appears in more than one drawing, that reference number is used consistently in this specification and the drawings to refer to the same or similar parts throughout.

1. Example Hardware Useful With Systems and Methods According to Examples of this Invention FIG. 1 schematically illustrates example features of systems and methods according to this invention. As shown in FIG. 1, the golfer (Player A, 100) makes golf swings, and data and/or other information relating to various aspects of the swings are captured by one or more sensors (three sensors 102*a*, 102*b*, and 102*c* are shown in the example of FIG. 1). The sensed data and information is collected and stored using one or more data collection/recordation devices 104, and is optionally processed (e.g., by a computer processing system including one or more microprocessors or other processing resources) before being transmitted to a central data hub 108 by a data transmission system 106. At the central data hub 108, the incoming data may be further processed or evaluated, e.g., by appropriate swing analysis software available at or through the central data hub 108 and/or by a human being (called a "coach" black box 110 in FIG. 1), either or both of which may provide feedback to the golfer 100 (which includes feedback to the golfer and/or his/her trainer or coach) via an output/feedback device 112. The output/feedback information may include various things, such as golf equipment selection or recommendation information, golf equipment parameter adjustment recommendations, golf equipment fitting information, coaching or training drills, swing tips, and the like. All of these example features will be described in more detail below. Optionally, as shown in FIG. 1, the central data hub 108 may be omitted and/or the coach 110 can be in direct communication with the transmission system 106 and/or directly provide data to the output/feedback device 112.

Figure 2A:
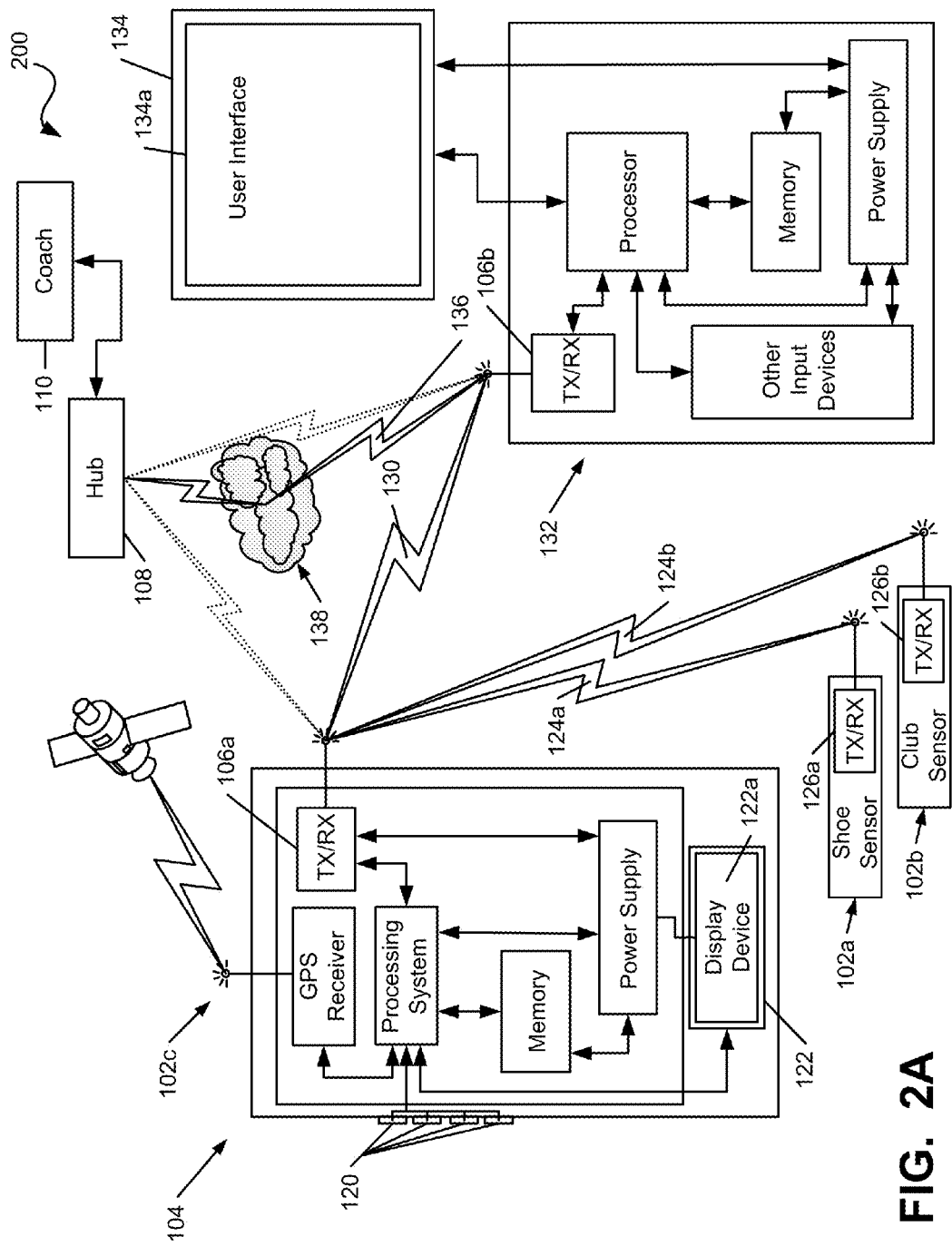
FIGS. 2A and 2B schematically illustrate more details of example equipment and communications involved in collecting and transferring data in community data hub type swing analysis systems and methods according to some examples of this invention.

FIG. 2A illustrates more detailed examples of hardware that may be used in systems and methods according to at least some examples of this invention. In this illustrated example system 200, golf swing data (such as golf swing dynamics data) is detected by at least two sensors, namely, at least one shoe mounted sensor 102*a* (and optionally a shoe mounted sensor 102*a* in each shoe, e.g., to detect foot force and weight shift features of the golf swing) and a golf club mounted sensor 102*b* (e.g., an accelerometer, gyrometer, magnetometer, force or pressure sensor, and/or other sensor(s) to detect golf club position, velocity, acceleration, and/or ball contact features of the golf swing). Other and/or additional data may be collected without departing from this invention. The sensors 102*a* and 102*b* are equipped with transmission equipment (e.g., wireless transceivers 126*a* and 126*b*, respectively) for transmitting data or other information to a data collection and recordation device 104. This data transmission is represented in FIG. 2A by the transmission icons 124*a* and 124*b*. Optionally, if desired, at least some (and potentially all) data processing may take place at the shoe and/or golf club.

The data collection and recordation device 104 may receive input from other sensors, such as a ball launch monitor and/or a GPS or other locational sensor 102*c*, which may be used, for example, to collect data from the golfer and provide information to the golfer on the golf course as a player 100 plays a typical round of golf This GPS sensor system 102*c* may include features and/or functions the same as or similar to those available in golf GPS systems as are conventionally known and used in the art. The data collection and recordation device 104 may include other features, such as a processing system, a memory (e.g., a flash memory to allow comparisons to others), a power supply (e.g., battery), one or more user input devices 120 (e.g., hard buttons, touch screen, keyboard, stylus, etc.), and one or more output devices 122, such as a screen display 122*a*, an audio ouput device, a tactile output device (e.g., vibration device), etc. The data collection and recordation device 104 of this example further includes a transceiver device 106a for receiving and transmitting data (e.g., any data or information input into or stored by the device 104, including the shoe sensor 102a, club sensor 102b, or GPS system 102c data), including transmitting data to another computing system, as shown in FIG. 2A by transmission icon 130.

In the example system 200 illustrated in FIG. 2A, the data collection and recordation device 104 transmits data from the device 104 to another computer device 132. This computer device 132 may be any desired type of computer device, such as a personal computer, laptop, palmtop, cellular telephone, workstation, etc. The device 132 may include other features, including features conventionally known and used on such computing devices 132, such as one or more user input devices or other input devices, a power supply, a memory system, a processing system, an output system (such as a display device 134 having a user interface 134a operating and/or displayed thereon, etc.), etc. The output display device 134 may display video of the user's swing, optionally with swing data, foot force data, ball launch data, swing tip information, other analysis information or data, and the like, superimposed on the swing video (or otherwise simultaneously displayed with the swing video).

Computer device 132 also may include a transmission system 106b for transmitting data, optionally via a network 138 over a networked connection (shown as transmission icon 136 in FIG. 2A), to the central data hub 108, which may be in communication with a virtual or human coach 110 or other swing analysis system or personnel. After analysis of the data generated relating to the golf swing(s) has taken place (e.g., at virtual or human coach 110), feedback information or data can be returned to the player 100 (and/or his/her personal coach or trainer), optionally through the central data hub 108, e.g., for presentation or display on computing system 132 and/or display device 134. Alternatively, if desired, the feedback information may be transmitted from the hub 108 and/or the coach 110 to the computer device 132 and/or the data collection and storage device 104 without the need for the feedback information to pass through the network 138 (e.g., for display on devices 122a and/or 134a or other appropriate output).

Although not necessarily configured in this manner, system 200 is of a type that will allow a user 100 to play golf with a portable electronic device 104 accompanying him or her to collect and record data as a round progresses (alternatively, the device 104 could be provided as part of a golf cart, a golf bag, or other equipment carried by or for the user 100). In this example system 200, golf swing dynamics and/or ball flight data (as well as other data, such as scoring data, GPS locational data, etc.) is recorded on device 104 for later download, e.g., to a personal computer system 132 provided at the golf course clubhouse, the user's home or office, etc. The user 100 can then upload the data from computer system 132 over a conventional network type connection 138 to the central data hub 108, from which further storage, analysis, display, and other options are available (as will be described in more detail below). In this manner, system 200 may operate in a manner generally similar to the data collection, storage, and analysis features available for collecting, storing, and analyzing ambulatory activity data in the NIKE+™ system, commercially available from NIKE, Inc. of Beaverton, Oreg.

Figure 2B:
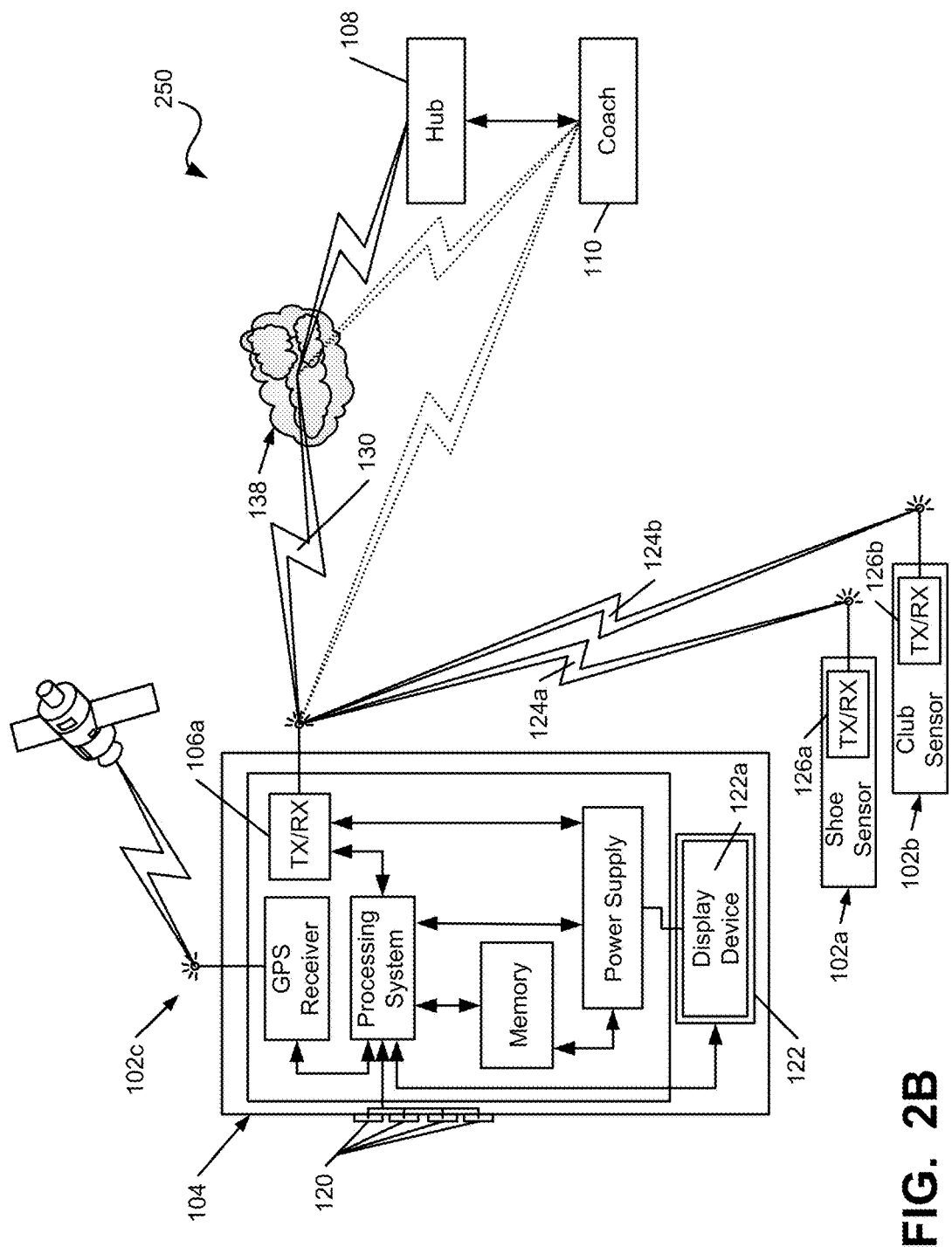

FIG. 2B illustrates another example system 250 and method for collecting, storing, and analyzing golf swing data that may be used in some examples of this invention. In this example system 250, the intermediate transmission to computing device 132 is eliminated, and the data collection and storage device 104 transmits its signals directly to the hub 108 via network 138. The feedback information may be transmitted from the virtual or human coach 110, optionally via the hub 108, directly to the data collection and storage device 104, e.g., for display on output device 122 (or other appropriate action). Alternatively, if desired, the feedback information may be transmitted from the coach 110 to the data collection and storage device 104 (optionally through network 138) without the need for the feedback data to pass through the hub 108. The output device 122 need not physically constitute a portion of the data collection and storage device 104 (e.g., it could be a separate device, such as a separate monitor or display device, a cellular telephone or other communication device, a tactile sensation output device, etc.). This type of system may be more useful and practical to provide real time feedback to the player, e.g., as he or she is playing a round of golf, while at an appropriately equipped driving range bay, etc.

Figure 3:
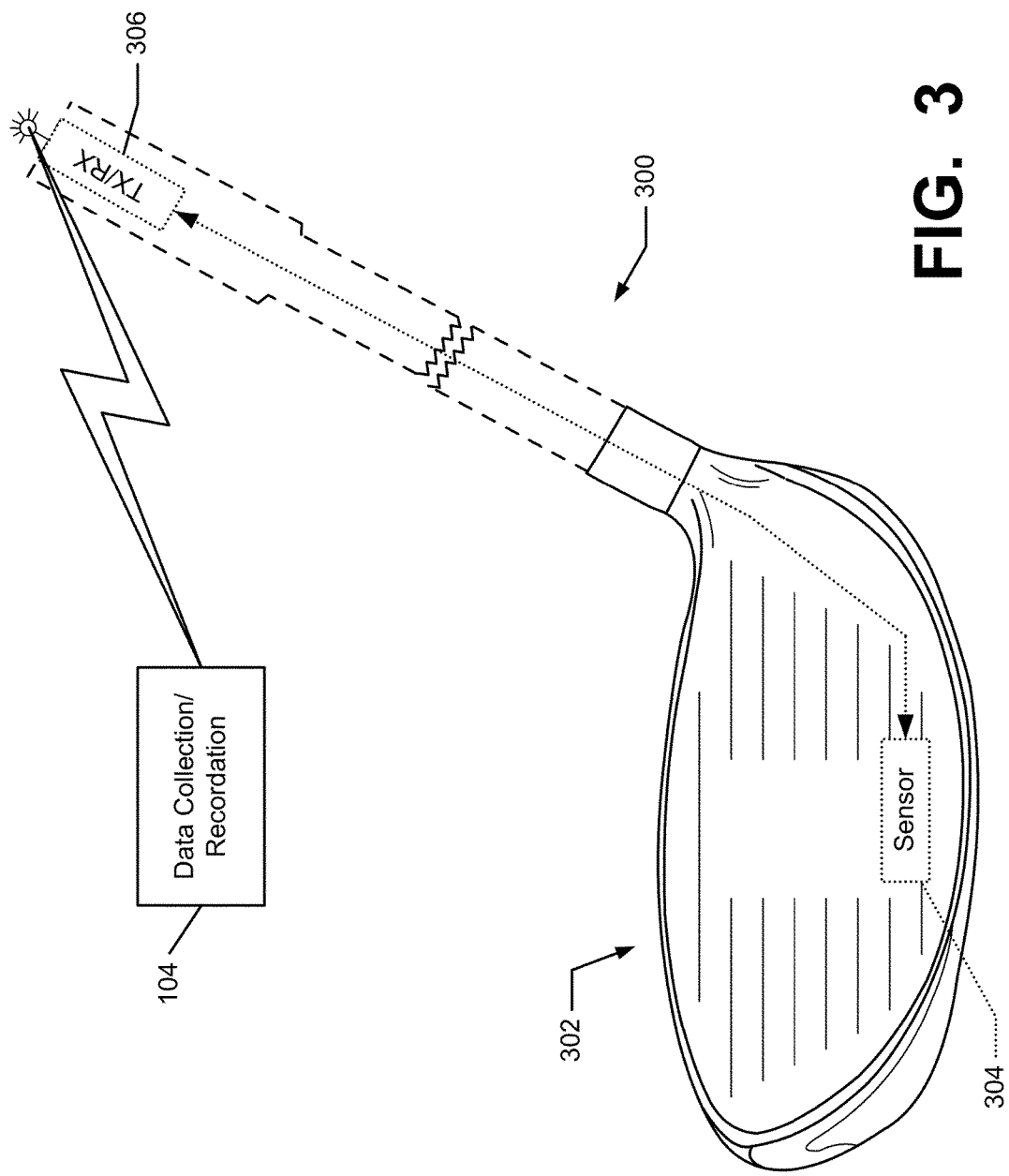
FIG. 3 illustrates an example golf club component that may be used to provide at least some swing data in systems and methods according to some examples of this invention.

As noted above, many different types of data may be collected and used in systems and methods in accordance with examples of this invention. Some useful swing dynamics data may be collected from one or more sensors provided in a golf club. FIG. 3 schematically illustrates an example golf club 300 that includes a club head 302 having one or more sensors 304 provided therein. Golf clubs having electronic sensors located therein are known and have been described, for example, in U.S. Pat. No. 7,004,848 to Konow; U.S. Pat. No. 6,248,021 to Ognjanovic; U.S. Pat. No. 4,898,389 to Plutt; U.S. Pat. Nos. 7,234,351 and 7,021,140 to Perkins; U.S. Patent Publication No. 2005/0215340 A1 to Stites; U.S. Patent Publication No. 2002/0173364 A1 to Boscha; and U.S. Patent Publication No. 2009/0209358 to Niegowski, each of which is entirely incorporated herein by reference. While a wood-type golf club head 302 is shown in FIG. 3, the club head 302 may be an iron, a hybrid club, a driver, a fairway wood, a putter, or other desired club head.

In accordance with at least some examples of this invention, golf club based sensors 304 (e.g., one or more accelerometers, impact sensors, force sensors, gyrometers, magnetometers, etc., optionally at least behind the ball striking face) may determine and provide data relating to one or more of: golf club head position throughout the swing; golf club head velocity throughout the swing (including one or more angular velocities); golf club head acceleration throughout the swing (including one or more angular accelerations); golf club head speed at ball impact; golf club head path around ball impact time; golf club head orientation (e.g., effective loft angle, lie angle, or face angle) at ball impact; ball impact location on the face; ball contact area on face during impact; ball contact force; face flex amount during impact; amount of shaft flex; location of shaft flex; gripping force (e.g., from a grip based sensor); other grip features (e.g., finger positioning, etc.); etc. Multiple sensors and/or sensor systems may be provided in a single club without departing from this invention.

Golf clubs 300 and/or golf club heads 302 that may be used in accordance with at least some examples of this invention may include an output device 306, e.g., for transmitting the collected data from the golf club 300 or club head 302 to a data collection and recordation device 104 (e.g., an RFID system). This transmission may be a wired or wireless connection (e.g., using a wireless transceiver, as illustrated in FIG. 3, an RFID tag, etc.), and the transmitted data may send any desired content (e.g., swing data, club identifier, impact force, impact location, etc.). As one alternative, if desired, data from the club 300 or club head 302 may be transmitted directly to the golf data hub 108 (or to the user's computer 132), rather than to an intermediate data collection and recordation device 104. As yet another alternative, if desired, the club 300 and/or club head 302 may include a computer processing system (e.g., one or more microprocessors) to allow at least some processing of collected sensor data prior to transmission to another portion of the overall system. As still another example, if desired, the club 300 and/or club head 302 may include a data storage system (e.g., computer memory) that will allow the data to be collected for later upload to another portion of the swing analysis system. Other arrangements and data collection, storage, and/or transmission options are possible without departing from this invention.

Also, if desired, golf clubs 300 and/or golf club heads 302 in accordance with at least some examples of this invention may receive input (e.g., via transceiver device 306 shown in FIG. 3 or another input device). This input may be used, for example, to change data collection parameters of the sensor(s) 304 on the device. As additional examples, if desired, the golf club 300 and/or golf club head 302 may function as at least a portion of the output/feedback device 112 of the general system shown in FIG. 1. As some more specific examples, in at least some example systems and methods according to this invention, golf clubs 300 or golf club heads 302 may receive input from the virtual or human coach 110 (e.g., via hub 108) with instructions to change one or more physical parameters of the club (e.g., changing the loft angle, lie angle, face angle, face stiffness, face flex characteristics, shaft stiffness, shaft flex location, shaft kick point location, etc.). As still additional examples, in at least some example systems and methods according to this invention, golf clubs 300 or golf club heads 302 may receive input from the virtual or human coach 110 (e.g., via hub 108) that induces a sensory response to the user during the course of a golf swing, e.g., in an effort to alter a feature of the user's swing (e.g., to help the club function as a swing training device, to better ingrain new swing features in the user's muscle memory, etc.). For example, the club 300 or club head 302 could be configured to vibrate or make an audible sound if the user's swing or if club head positioning is incorrect (e.g., off plane, over the top, excessively outside-to-inside, casted, etc.). The sensory (e.g., vibration) response also could be provided by a separate device held or worn by the player, such as by the footwear, apparel, an electronic device held on the user's belt or in the user's pocket (e.g., a pager, cell phone, etc.), or the like.

Figure 4:
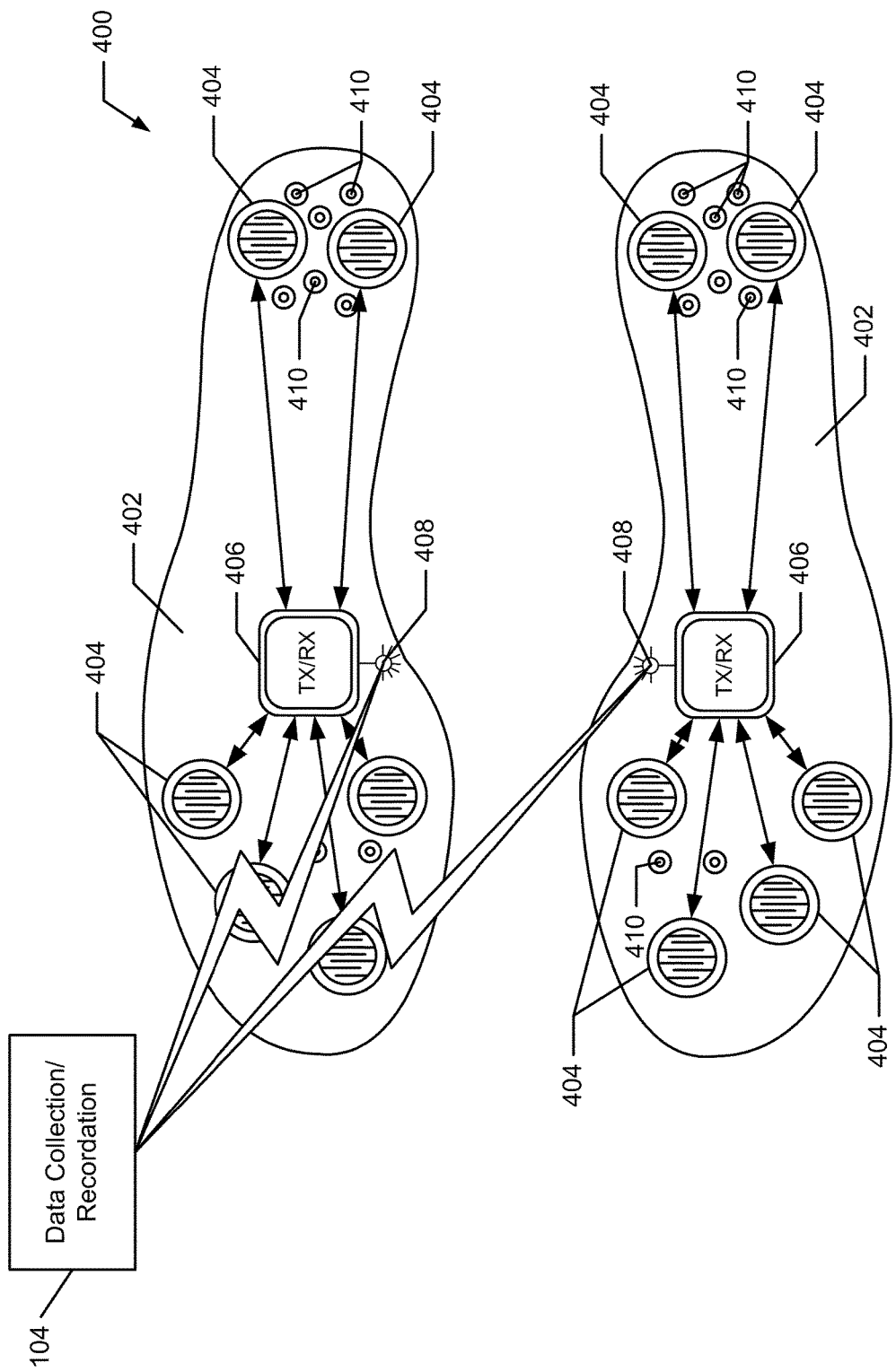
FIG. 4 illustrates portions of example footwear that may be used to provide at least some swing data in systems and methods according to some examples of this invention.

Other or alternative useful swing dynamics data may be collected from one or more sensors provided in one or more articles of footwear worn by the golfer during the swing. FIG. 4 schematically illustrates footbed portions 402 of an example pair of golf shoes 400 that include one or more sensors 404 therein. The sensors 404 may include one or more force sensors that may be used to detect and measure the dynamic force distribution applied by the golfer's feet over the course of a golf swing (e.g., to enable detection of appropriate weight shift, etc.), such as using optical fiber bending ("OFB") technology, variable electrical resistance, etc. Footwear having sensors located therein have been described, for example, in U.S. Patent Publication No. 2010/0063778 A1 to Schrock, et al., and U.S. Patent Publication No. 2010/0063779 A1 to Schrock, et al., each of which is entirely incorporated herein by reference.

In this illustrated example, the footbeds 402 of the articles of footwear include a series of forefoot sensors 404 and heel sensors 404 so that the force applied by the user's feet in various different areas during the golf swing can be determined. Although other arrangements are possible without departing from this invention, in this illustrated example, signals from the sensors 404 are transmitted to a central data collection and/or processing device 406 provided in each shoe. This central data collection device 406 may be formed in a chip that is engaged in a housing provided in the footbed 402, e.g., in a manner akin to the manner in which chips are engaged with articles of footwear in NIKE+™ enabled footwear available from NIKE, Inc. of Beaverton, Oreg. A fabric layer, sock liner, or insole element may overlay the footbed 402 in the articles of footwear and directly contact the wearer's foot.

Shoes that may be used in accordance with at least some examples of this invention may include an output device 408 for transmitting the collected data from the shoe to a data collection and recordation device 104. This transmission may be a wired or wireless connection (e.g., using a wireless transceiver, as illustrated in FIG. 4). As one alternative, if desired, data from the shoe(s) 400 may be transmitted directly to the golf data hub 108, rather than to an intermediate data collection and recordation device 104. As yet another alternative, if desired, one or both shoes 400 may include a computer processing system (e.g., one or more microprocessors) to allow at least some processing of collected sensor data prior to transmission to another portion of the overall system. As still another example, if desired, the shoes may include a data storage system (e.g., computer memory) that will allow the data to be collected for later upload to another portion of the swing analysis system. Other arrangements and data collection, storage, and/or transmission options are possible without departing from this invention.

Also, if desired, shoes in accordance with at least some examples of this invention may receive input (e.g., via a transceiver device 408 shown in FIG. 4 or another input device). This input may be used, for example, to change data collection parameters of the sensors 404 on the shoes. As additional examples, if desired, one or both shoes may function as at least a portion of the output/feedback device 112 of the general system shown in FIG. 1. As some more specific examples, in at least some example systems and methods according to this invention, shoes may receive input from the virtual or human coach 110 (e.g., via hub 108) changing one or more physical parameters of the shoe (e.g., changing the midsole stiffness, the footbed flex characteristics, etc., as described, for example, U.S. Published Patent Appln. No. 2007/0006489A1, which document is entirely incorporated herein by reference). As still additional examples, in at least some example systems and methods according to this invention, one or both shoes may receive input from the virtual or human coach 110 (e.g., via hub 108) that induces a sensory response to the user during the course of a golf swing, e.g., in an effort to alter a feature of the user's swing (e.g., to help the user shift his/her weight properly, to get the user off his/her heels at the appropriate time, etc.). For example, the footbed(s) 402 could be configured to vibrate or make an audible sound if the user's weight shift is incorrect and/or if the user's swing tempo is off. In fact, as shown in FIG. 4, the footbed(s) 402 may include one or more elements 410 (in the forefoot and/or heel) that project upward to contact (poke) the user's foot during the golf swing if it is determined by appropriate sensors that the user has not properly shifted his/her weight during the swing (e.g., to get the user off his heels, etc.). As noted above, the sensory (e.g., vibration) response also could be provided by a separate device held or worn by the player, such as by an electronic device held on the user's belt or in the user's pocket (e.g., a pager, cell phone, etc.).

If desired, golf footwear 400 in accordance with at least some examples of this invention may include pedometer based sensors or other sensors, e.g., to provide speed and/or distance information relating to the round of golf (e.g., NIKE+ type pedometer sensors available from NIKE, Inc. of Beaverton, Oreg.). If desired, step count/pedometer data of this type may be provided by one or some of the same sensors 404 used for measuring and determining the foot force information.

Figure 5:
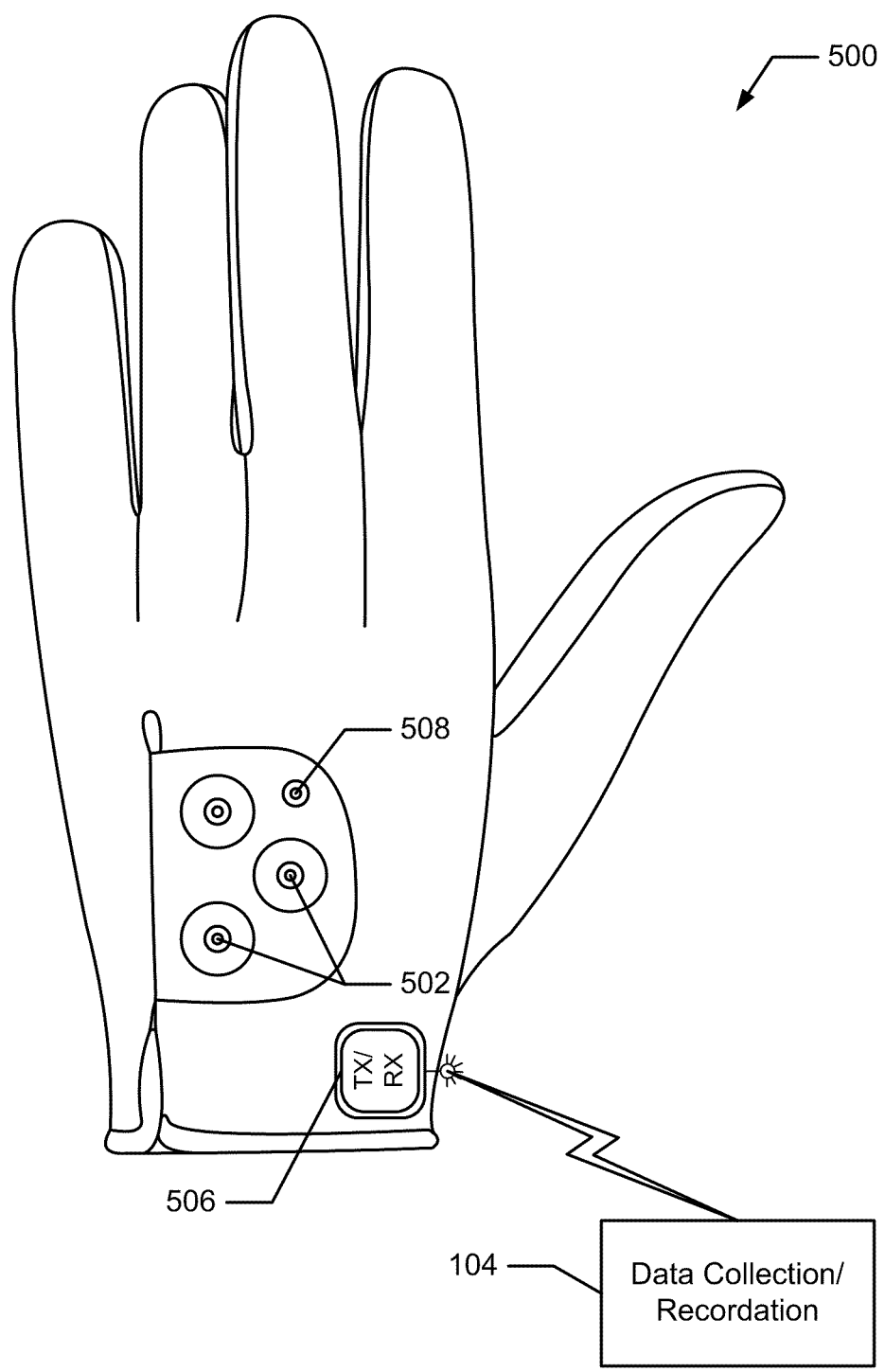
FIG. 5 illustrates an example article of apparel that may be used to provide at least some swing data in systems and methods according to some examples of this invention.

Other items may be equipped to collect golf swing dynamics information without departing from this invention. For example, as illustrated in FIG. 5, appropriate sensors (e.g., accelerometer, force sensors, etc.) 502 may be provided in a golf glove 500 or other article of apparel (such as a shirt, pants, shorts, socks, etc.). This type of sensor 502 may allow the golf glove 500 to provide hand position and/or hand motion information (e.g., velocity, acceleration, etc.), optionally for comparison against a standard or that of an elite golfer (optionally, a golfer that has similar swing or other characteristics). As another option, this golf glove 500 may include appropriate sensors 502 located to measure other features or characteristics of the golf swing, like grip pressure and/or handle location with respect to the golfer's hand(s).

Such articles of apparel 500 also may be equipped with an output device 506 for transmitting the collected data from the article of apparel to a data collection and recordation device 104. This transmission may be a wired or wireless connection, such as using Bluetooth or other transmission protocols (e.g., using a wireless transceiver, as illustrated in FIG. 5). Alternatively, if desired, data from the article of apparel 500 may be transmitted directly to the golf data hub 108 and/or to the coach 110, rather than to an intermediate data collection and recordation device 104. As yet another alternative, if desired, the article of apparel 500 may include a computer processing system (e.g., one or more microprocessors) to allow at least some processing of collected sensor data prior to transmission to another portion of the overall system. As still another example, if desired, the article of apparel 500 may include a data storage system (e.g., computer or flash memory), that will allow the data to be collected for later upload to another portion of the swing analysis system. Other arrangements and data collection, storage, and/or transmission options are possible without departing from this invention.

Also, if desired, articles of apparel 500 in accordance with at least some examples of this invention may receive input (e.g., via transceiver device 506 shown in FIG. 5 or another input device). This input may be used, for example, to change data collection parameters of the sensors 502 on the article of apparel. As additional examples, if desired, the article of apparel 500 may function as at least a portion of the output/feedback device 112 of the general system shown in FIG. 1. As some more specific examples, in at least some example systems and methods according to this invention, articles of apparel 500 may receive input from the virtual or human coach 110 (e.g., via hub 108) changing one or more physical parameters of the article of apparel 500 and/or inducing a sensory response to the user during the course of a golf swing, e.g., in an effort to alter a feature of the user's swing (e.g., to help the article of apparel 500 function as a swing training device, to better ingrain new swing features in the user's muscle memory, etc.). For example, the glove 500 (or other article of apparel) could be configured to vibrate or make an audible sound if the user's hand position (or other body part position) is incorrect at some point during the course of a swing. As one more specific example, as shown in FIG. 5, the rear surface of the glove 500 may include one or more elements 508 that project inward to contact (poke) the user's hand during the golf swing, e.g., if it is determined by appropriate sensors that the user's wrist is too cupped, too flat, or otherwise not properly positioned during the swing. Similar feedback may be applied to other locations on the body, e.g., using other properly equipped articles of apparel.

Figure 6:
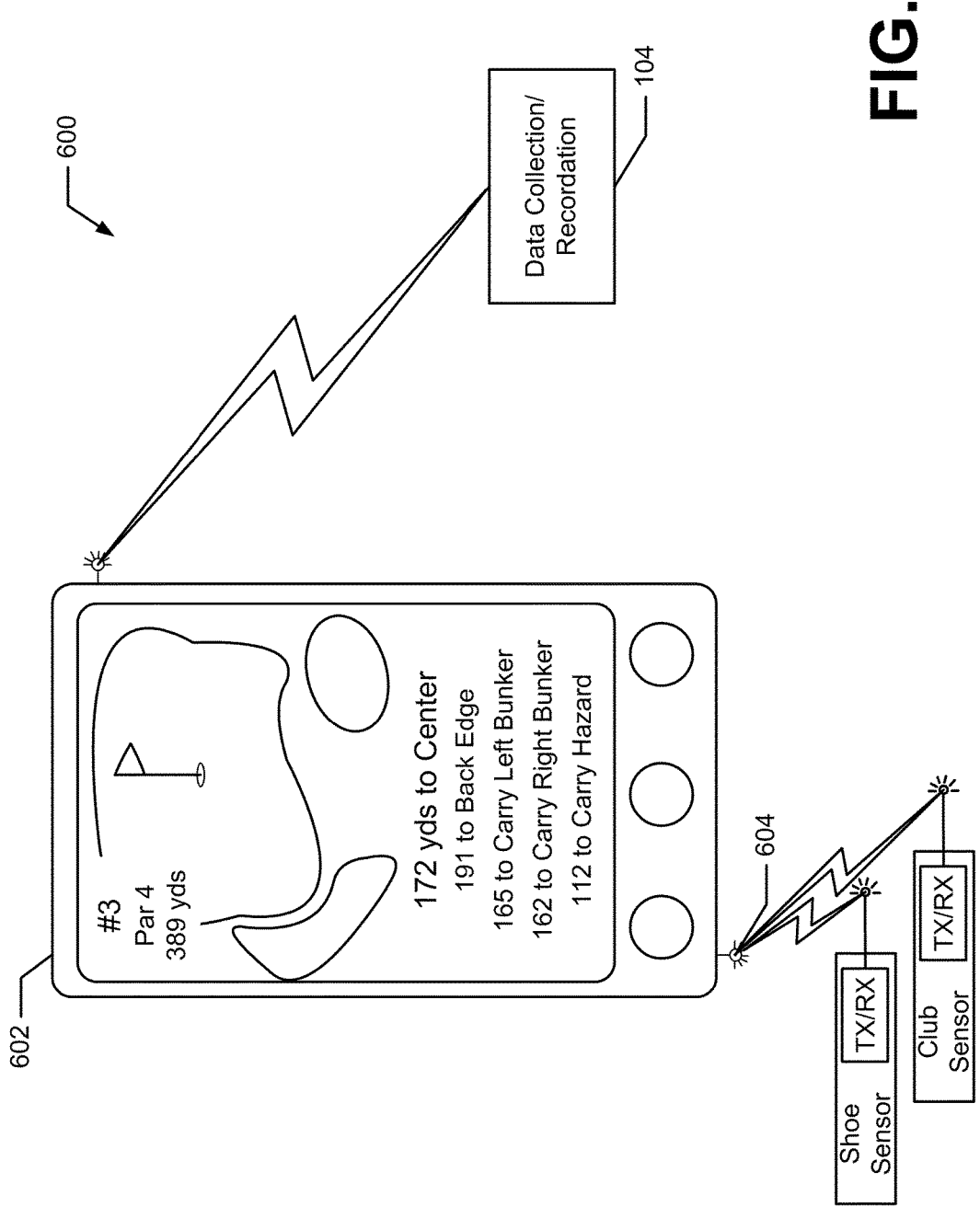
FIGS. 6 and 7 illustrate example electronic devices that may be useful for accepting and/or transmitting data in systems and methods according to some examples of this invention.

FIG. 6 illustrates another example system 600 that may be used for collecting swing dynamics data or other data for swing analysis systems and methods according to this invention. FIG. 6 illustrates a portable electronic device 602 that may be carried by a golfer during a round of golf and provides yardages and/or other information to the golfer relevant to the round of golf (e.g., conventional golf GPS data). This device 602 also may include one or more inputs 604 that receive data from various sensors included with the system, such as the golf club based sensors, footwear or other foot force sensors, and apparel sensors as described above and/or other sensors like those described in more detail below. This device 602 may collect and store data (and optionally further process it) during the course of a round of golf (and optionally provide feedback to the golfer during the round) and send data to another data collection and recordation device 104 (optionally, after the round is over) for transmission to the central data hub 108 (see FIG. 1). Alternatively, as shown in the example system 700 of FIG. 7, the portable device 602 may function as the data collection and recordation device 104 that transmits golf swing dynamics and/or other data directly to the central data hub 108 (e.g., periodically, over the course of a round or after the round is complete). The device 602 may communicate with the data collection and recordation device 104 (FIG. 6) and/or the central data hub 108 (FIG. 7) in any desired manner using any desired communication protocol, including wired or wireless connections, cellular telephone communications (e.g., 3G, 4G, etc.), other networked connections or protocols, etc.

Figure 7:
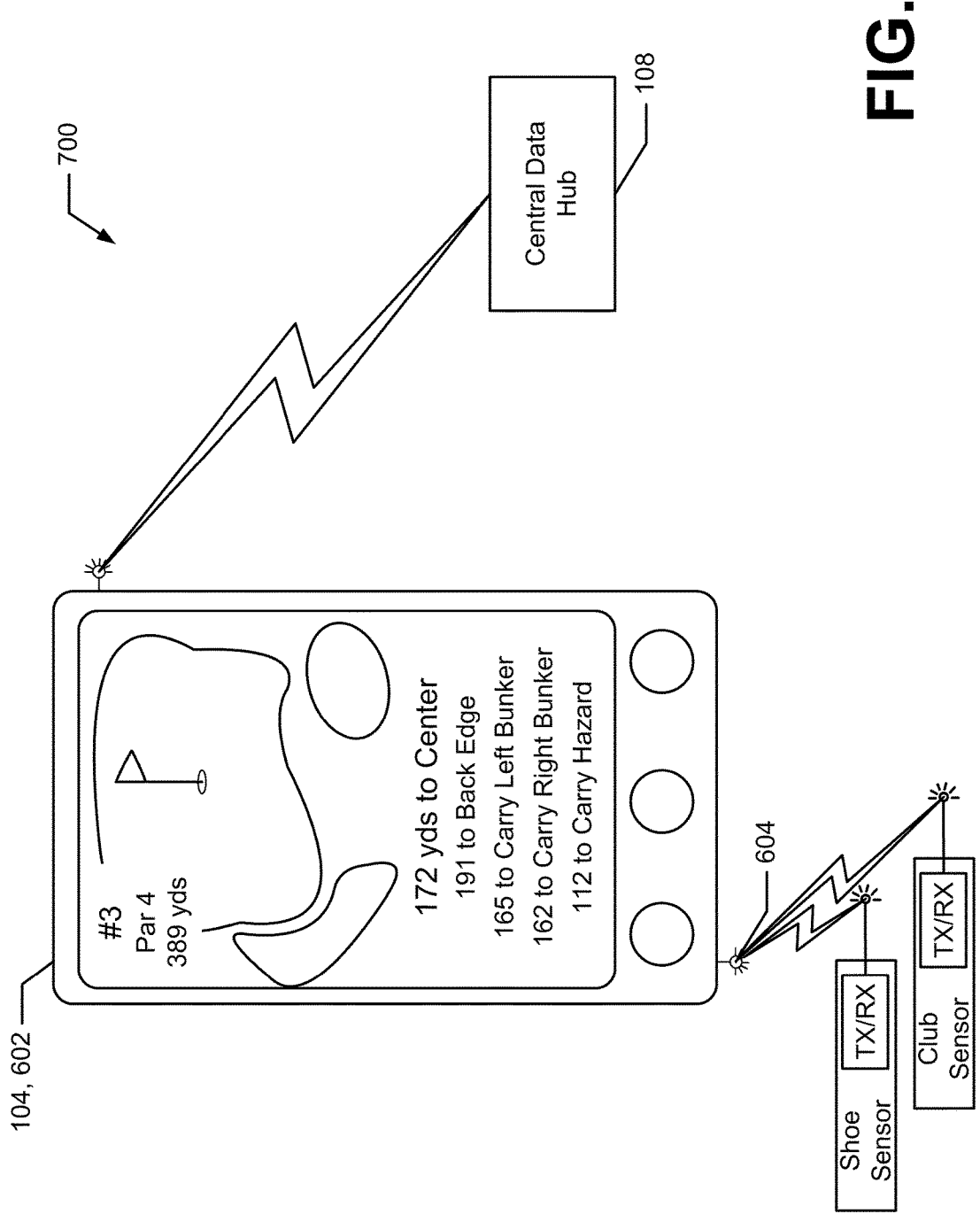

While FIGS. 6 and 7 show the electronic device 602 as a portable device that can be carried by the user, this is not a requirement. Rather, if desired, device 602 may have a more permanent mounting location, such as on a golf cart (self-propelled or user propelled), on a golf bag, in a driving range bay, etc.

Figure 8:
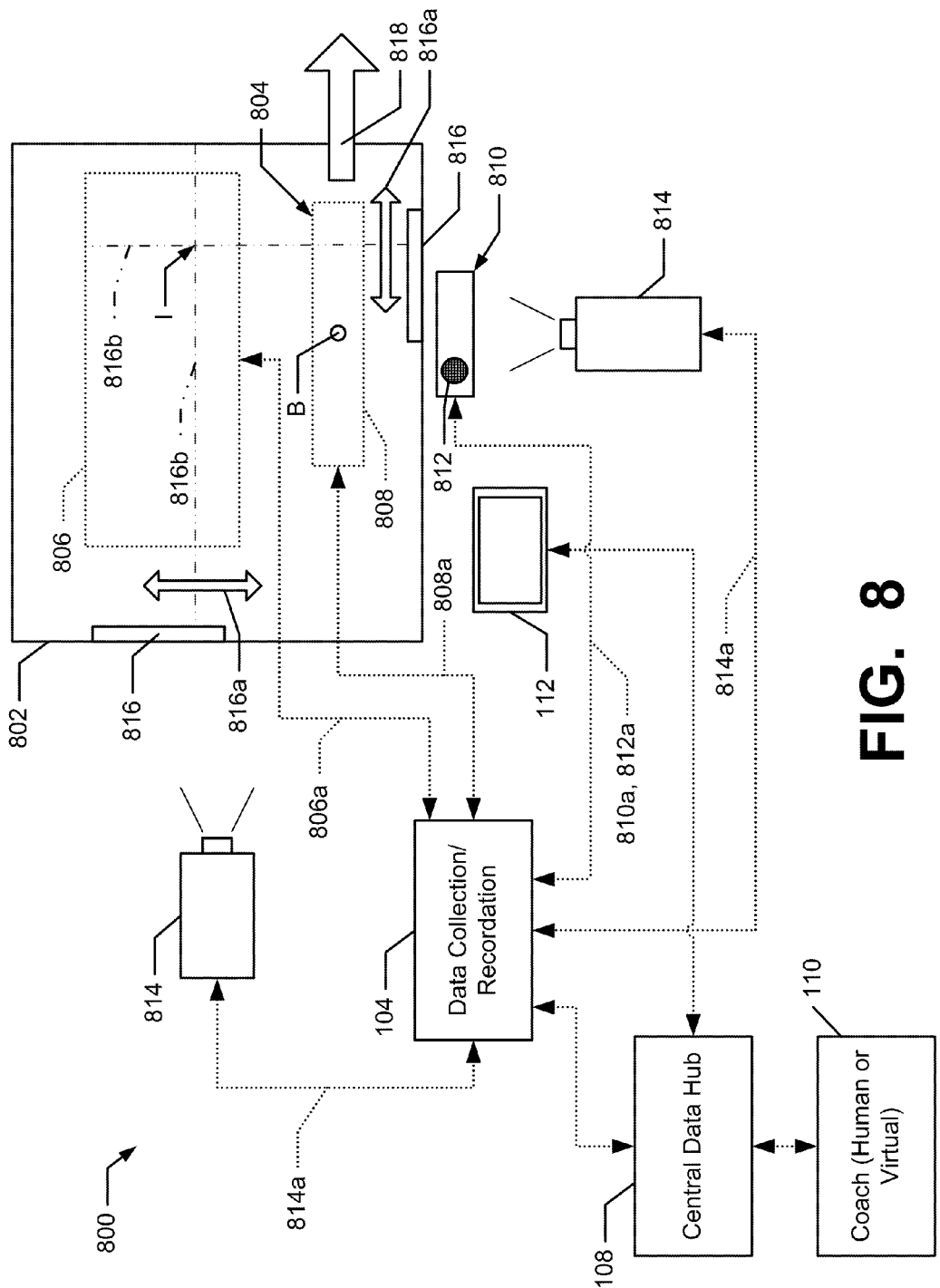
FIG. 8 illustrates an example golf swing analysis data collection and feedback system arranged in a golf ball hitting bay.

FIG. 8 illustrates another example of equipment that may be used in golf swing analysis systems and methods in accordance with some examples of this invention. The example system 800 of FIG. 8 constitutes a more permanently situated arrangement of sensors and devices for collecting golf swing dynamics and/or ball launch data, such as a system that might be found in a golf ball driving range hitting bay or an indoor type driving bay (e.g., for hitting golf balls into a net). This system 800 includes a mat 802 on which a user stands when hitting golf balls B from a ball launch area 804. The mat 802 or supports therefor may include one or more sensors 806 (e.g., sensor arrays) that are capable of determining user weight shift over the course of a golf swing (alternatively, if desired, this type of data may be generated by sensors provided in the user's shoes, as described above). The mat 802 further may include one or more sensors 808 (e.g., sensor arrays) in the ball launch area 804 to detect various features of the swing, such as initial club contact location with respect to the ball location, club head path at or around impact, etc. Swing dynamics data generated by the mat 802 based sensors 806, 808 may be transmitted to a data collection/recordation device 104 (e.g., a conventional computer device), shown by connection lines 806a and 808a in FIG. 8. If desired, the system 800 of FIG. 8 also could accept swing dynamics input and data from one or more other sensors, such as golf club based sensors (e.g., see FIG. 3), footwear based sensors (e.g., see FIG. 4), apparel based sensors (e.g., see FIG. 5), and/or electronic device based sensors (e.g., see FIG. 6).

This example system 800 further includes a golf ball launch monitor 810 that collects ball flight data. Such launch monitor systems 800 are known and used in the art, and they collect data useful to sense or determine various features of a golf ball launch, such as: initial ball launch angle, initial ball launch speed, initial ball launch spin (e.g., absolute spin (e.g., in RPMs) and/or spin direction), initial ball launch direction, projected or actual ball carry distance, projected or actual ball roll distance, projected or actual ball travel distance, projected or actual ball apex height, projected or actual ball apex location distance, projected or actual ball to ground impact angle, golf club head speed at a ball contact time, golf club head movement path direction at a ball contact time, projected or actual ball flight deviation from center (or from a predefined path), ball flight curvature, smash factor (initial ball launch velocity/club head speed at ball contact), etc.

The ball flight sensing system 810 according to this example of the invention further includes an audio recording device 812, such as a digital sound recorder. This audio recording device 812 may be used to provide useful data for the swing analysis system, such as information regarding the quality of the contact between the club head face and the ball (e.g., solid contact v. more of an off-center or glancing blow type contact), club contact with the mat 802 before contact with the ball, etc. Such data or information may be useful to a human or computerized swing analyst to determine the quality of an individual ball strike. Ball launch data generated by the launch monitor 810 and/or the audio recorder 812 may be transmitted to the data collection/recordation device 104, shown by connection line 810a, 812a in FIG. 8.

Swing dynamics and/or ball launch data may be collected by other sensing devices without departing from this invention. For example, this swing analysis system 800 includes one or more video cameras 814 that video record the golfer's swing and/or ball launch. In this illustrated example, one camera 814 captures the swing and/or ball launch data from the rear (behind the golfer) and one captures it from a "face-on" position (directly facing the ball and the golfer during the swing). If desired, the face-on camera 814 may constitute a portion of the ball launch monitor 810 (e.g., to show the club/ball impact, optionally in a close-up or slow-motion view). Additionally or alternatively, if desired, an overhead camera 814 may be included to view the swing from directly above the golfer. Image data generated by the video camera(s) 814 may be transmitted to the data collection/recordation device 104, shown by connection lines 814a in FIG. 8. The swing dynamics and/or ball launch data from the video camera(s) 814 may be analyzed by a human (e.g., a coach) and/or by swing analysis software, e.g., to provide input data to enable generation of swing tips, training drills, etc., for use by the golfer.

FIG. 8 illustrates yet additional features that may be provided in systems and methods according to at least some examples of this invention. Proper alignment of the golfer and/or ball with respect to portions of the various sensor systems can be important in at least some systems to assure that the data is properly captured and is in a form where it can be properly analyzed. To assure proper capture of the ball launch monitor data, the ball B may be set up for launch within a predetermined area on the mat 802 (e.g., on a tee, on a spot provided on the launch area 804 floor, etc.). Additionally or alternatively, systems and methods according to at least some examples of this invention may include one or more alignment aids 816 to help assure one or more of the following: (a) to assure that the user has information indicating a preferred or target golf ball flight direction (shown by arrow 818 in FIG. 8) to assure proper capture of the data; (b) to assure that the user has information indicating a golf ball start location with respect to a location of at least some portion of the sensor systems (e.g., with respect to the ball launch monitor 810, video recording camera(s) 814, etc.); and (c) to assure that the user has information regarding a proper stance set up location (e.g., with respect to the ball launch monitor 810, video recording camera(s) 814, etc.).

Additionally or alternatively, alignment aids that provide information to assure that the user has a proper stance set up location also may be used, at least in part, as a training aid to provide coaching information to the user, and this coaching or training information may be returned to the ball hitting bay after swing and/or ball launch analysis via the central data hub 108. FIG. 8 shows two alignment aids 816 that project light beams 816b (e.g., lasers) or otherwise provide an indication of an appropriate location for the user's front foot to start a golf swing (shown by the intersection I in FIG. 8). The adjustability of the location of the light beams 816b producing the intersection I is shown in FIG. 8 by arrows 816a. Other ways of providing this type of golfer alignment or positioning information are possible without departing from this invention, such as: by providing a series of lights visible at mat 802 surface to show where one or both feet should be positioned, by providing a grid or other markings on the mat 802 surface to show proper foot positioning, by projecting light onto the mat 802 surface or at the golfer's feet to show proper foot positioning (e.g., from above), etc. If desired, in some example systems and methods according to this invention, the indicated location of the proper stance set up position may be controlled, at least in part, based on one or more characteristics of the golf club being used (e.g., the type of club, the overall club or shaft length, etc.), one or more characteristics of the golfer making the swing (e.g., height, weight, inseam length, fingertip to floor dimension, etc.), and/or one or more characteristics of the shot being hit (e.g., drive, full swing, partial swing, chip, putt, etc.).

As further shown in FIG. 8, data from the various sensors optionally may be sent to a data collection/recordation device 104 and from there to a central data hub 108 for analysis, etc. Alternatively, if desired, the data collection device 104 may be omitted (or the central hub 108 may be omitted), and the various sensors may communicate directly with a data analysis location (such as "coach" 110, human or virtual). Data may be returned from data collection/recordation hub 104 and/or the central data hub 108, e.g., to provide feedback to the golfer and/or the golfer's coach or trainer (e.g., via output device 112, such as a video output, textual output, sensory inducing output (e.g., in a golf club, shoes, apparel, etc., as described above), audio output, etc.). As noted above, the type of output provided may vary widely, such as club selection, club fitting or adjustment information; swing tips; training drills; ball selection information; information to adjust the sensors and/or alignment systems; information to operate sensory inducing output devices; etc.

FIG. 8 shows a relatively fixed system 800 for providing swing dynamics and/or ball launch data to a swing analysis system and/or central data hub. Such fixed systems are not required. FIGS. 9A and 9B show face-on and overhead views of example swing dynamics and/or ball launch data collection systems 900, at least some of which are mounted on a golf cart 902. The same reference numbers are used in FIGS. 9A and 9B to show the same or similar parts as in FIG. 8 (and other figures), and a lengthy repetitive description of these same or similar parts is omitted. The system 900 shown in FIGS. 9A and 9B is a rear view system that includes some type of alignment device 816 to help the user align the cart 902 in the best position for the various sensors to capture the motion of the golfer and/or the launch of the golf ball B, as well as the data generated by these actions. Any type of alignment device 816 may be used without departing from this invention, including, for example, a light or laser emitting device, a fixed sight on the cart 902 through which the cart 902 is aligned with ball and/or with the desired target direction (e.g., like a rifle telescope), etc. This type of system 900 and method may be used to obtain data corresponding to one or more golf swings taken during an actual round of golf (which may more reliably show the golfer's true swing and tendencies). This system 900 further may include an incline determining device 904 used to determine the incline on which the ball/cart 902 rests and/or the relative position of the ball B with respect to the player's feet (to detect uphill, downhill, or side hill lies, which may affect the ball flight and proper swing) (this information also may be ascertainable from map data, the video camera 814, GPS, or other sensors).

If necessary or desired, the sensor devices mounted on the cart 902 (e.g., camera 814, ball launch monitor system, etc.) and/or the mounts therefor may include elements that allow for adjustment and/or fine tuning of the alignment, e.g., to allow the sensor devices to be aligned without the need to move the cart itself. Any such local adjustment and/or fine tuning elements may be provided for this purpose, such as levels, sights, or the like, e.g., like those used on a transit device for shooting a grade, slider channels that allow the overall sensor and/or mount therefor to be moved left or right (or up or down) with respect to the cart 902, a shaft for rotating the sensor and/or mount, etc.). These local adjustment and/or fine tuning elements are schematically shown in FIGS. 9A and 9B (and others) by arrows 950.

Additionally, if desired, the system 900 may include one or more feedback devices 112 (e.g., of any of the types described above), e.g., so that the golfer can get swing tips or coaching information (or other desired information) while the round of golf is on-going (e.g., akin to a "playing lesson"). As noted above, the feedback may be from a live person watching the golfer's swing live or automatically/computer generated. The output device 112 may be mounted on the cart 902 or carried by the user (e.g., a cellular telephone, a PDA, a golf GPS, or other device).

While FIGS. 9A and 9B show the cart 902 mounted system equipped to communicate directly with the central data hub 108 (e.g., via a network connection, such as a cellular telephone or other network), this is not a requirement. If desired, the data from the round may be stored, e.g., at collection and recording device 104, for later upload and analysis. Also, while FIGS. 9A and 9B show a self-propelled cart 902, similar hardware and equipment could be provided on a golfer propelled "pull" or "push" type cart (the term "golf cart," when used generically herein, refers to any of these types of carts).

Figure 10A:
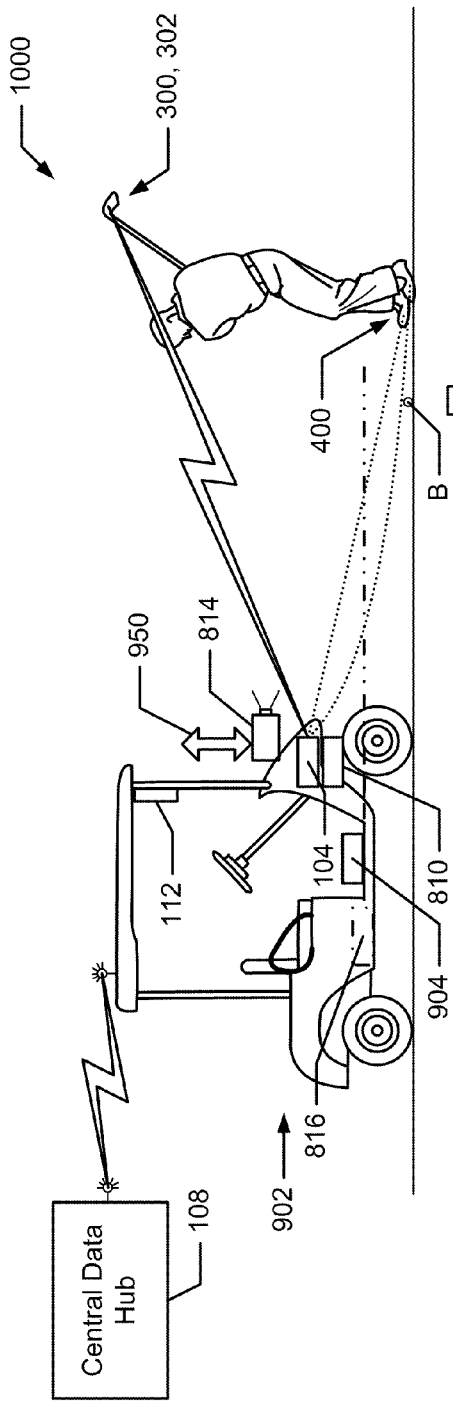
Figure 10B:
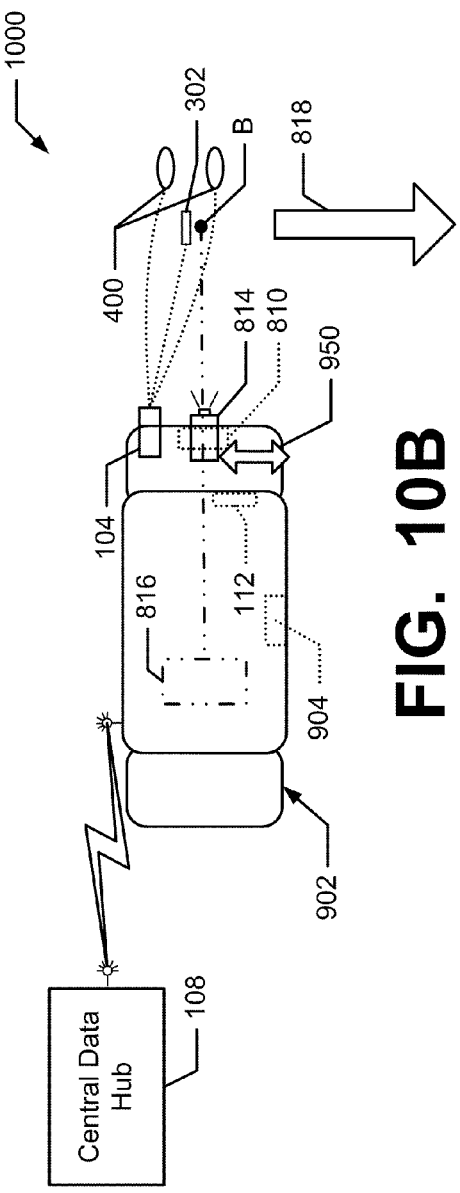

FIGS. 10A and 10B show front and overhead views of example swing dynamics and/or ball launch data collection systems 1000 similar to those described above in conjunction with FIGS. 9A and 9B, but in this example, the cart 902 is positioned to receive data from a "face-on" orientation. The same reference numbers are used in FIGS. 10A and 10B to show the same or similar parts as in FIGS. 8, 9A, and 9B (and other figures), and a lengthy repetitive description of these same or similar parts is omitted. In the face-on type system 1000 of FIGS. 10A and 10B, some type of alignment device 816 is provided to help the user align the cart 902 in the best position for the launch monitor 810 and/or other sensors to capture the motion of the golfer and/or the launch of the golf ball B, as well as the data generated by these actions. In this example system 1000, the alignment device 816 may be particularly useful to assure proper positioning of the launch monitor 810 with respect to the ball B launch location, although other types of alignment information also may be provided (e.g., of the types described above). Systems and methods of the types shown in FIGS. 10A and 10B may operate in the same or similar manners to those described above, e.g., like those described in conjunction with FIGS. 8, 9A, and 9B.

FIGS. 11A and 11B show face-on and overhead views of example swing dynamics and/or ball launch data collection systems 1100 similar to those described above in conjunction with FIGS. 9A and 9B, but in this example, at least some of the equipment for the system 1100 is mounted on a golf bag 1102 (which includes a chamber for containing one or more golf clubs 1104). The same reference numbers are used in FIGS. 11A and 11B to show the same or similar parts as in FIGS. 8, 9A, and 9B (and other figures), and a lengthy repetitive description of these same or similar parts is omitted. Also, in this example system 1100, the feedback device 112 is provided on an electronic device 1104 carried by the player (although a feedback device could be provided with the bag 1102 or with other equipment without departing from this invention). Systems and methods of the types shown in FIGS. 11A and 11B may operate in the same or similar manners to those described above, e.g., like those described in conjunction with FIGS. 8, 9A, and 9B.

If desired, the system 1100 of FIGS. 11A and 11B may be equipped such that when the golf bag 1102 is set down, support legs 1102a extend outward to support the bag 1102. At least some of the sensors (like the video camera 814 and/or the alignment device 816) may be located with respect to the golf bag 1102 such that placing the bag 1102 on its supports 1102a exposes and/or otherwise places those sensors in a proper position for receiving data (and optionally acts to activate these sensors). This feature also can help repeatably and reliably align and position at least some of the sensors with respect to ground level at the time when data is to be taken. If necessary or desired, the sensor devices mounted on the bag 1102 (e.g., camera 814, ball launch monitor system, etc.) and/or the mounts therefor may include elements that allow for adjustment and/or fine tuning of the alignment, e.g., to allow the sensor devices to be aligned without the need to move the bag itself. Any such local adjustment and/or fine tuning elements may be provided for this purpose, such as levels, sights, or the like, e.g., like those used on a transit device for shooting a grade, slider channels that allow the overall sensor and/or mount therefor to be moved left or right (or up or down) with respect to the bag 1102, a shaft for rotating the sensor and/or mount, etc.). These local adjustment and/or fine tuning elements are schematically shown in FIGS. 11A and 11B (and others) by arrows 1150.

FIGS. 12A and 12B show front and overhead views of example swing dynamics and/or ball launch data collection systems 1200 similar to those described above in conjunction with FIGS. 11A and 11B, but in this example, the bag 1102 is positioned to receive data from a "face-on" orientation. The same reference numbers are used in FIGS. 12A and 12B to show the same or similar parts as in FIGS. 8 through 11B (and other figures), and a lengthy repetitive description of these same or similar parts is omitted. In the face-on type system 1200 of FIGS. 12A and 12B, some type of alignment device 816 is provided to help the user align the bag 1102 in the best position for the launch monitor 810 and/or other sensors to capture the motion of the golfer and/or the launch of the golf ball B, as well as the data generated by these actions. Systems and methods of the types shown in FIGS. 12A and 12B may operate in the same or similar manners to those described above, e.g., like those described in conjunction with FIGS. 8 through 11B.

FIGS. 9A through 12B illustrate various systems in which cameras and/or other sensors may be moved on the golf course following the golfer as he/she plays. Alternatively, if desired, the golf course could be equipped with cameras and/or other sensors at various locations around the course (e.g., on poles behind tees, on yardage markers, behind greens, etc.), and at least some of the swing dynamics and/or ball flight information may be provided by such golf course oriented devices. Such a system could allow playback of a round (or portions thereof) to any players, regardless of their relationship to a central golf hub community and/or their desire to obtain swing feedback information. The systems of FIGS. 9A through 12B also may include GPS monitoring capabilities so that the player's location (and optionally shot distance or other information) can be tracked by GPS.

Figure 13A:
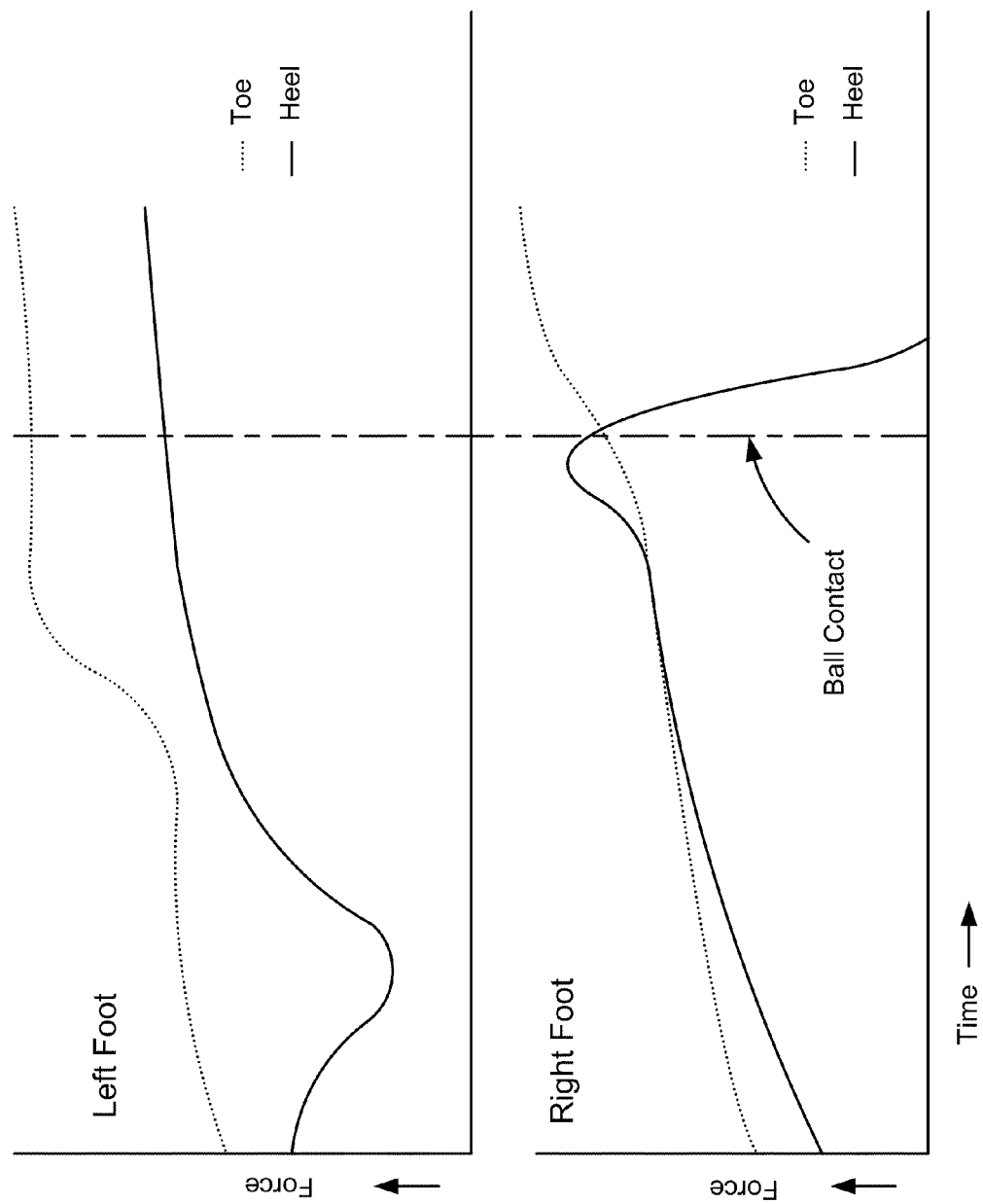
FIGS. 13A, 13B, and 14 illustrate examples of golf swing dynamics data or information that may be generated and used in systems and methods according to at least some examples of this invention.

FIG. 13A schematically illustrates an example of the type of data that may be generated by foot force sensors (e.g., in shoes 400 or in a mat 802) during the course of a golf swing. In this example, the upper graph in FIG. 13A shows example foot forces exerted by the left foot of a right handed golfer during the course of a golf swing, and the bottom graph shows example foot forces exerted by the right foot of a right handed golfer during the course of the same golf swing. The dashed line represents forces measured by a toe oriented sensor and the solid line represents forces generated by a heel oriented sensor. The foot forces also may be correlated to and displayed to show the timing of various portions of the swing, such as the start of the backswing, the top of the backswing, ball contact, and the end of the swing (follow through). Foot force information of this type may be useful in systems and methods according to at least some examples of this invention in ascertaining characteristics of the golfer's typical swing (or in ascertaining a golf swing signature or composite golf swing signature for the golfer) or swing tempo.

Figure 13B:
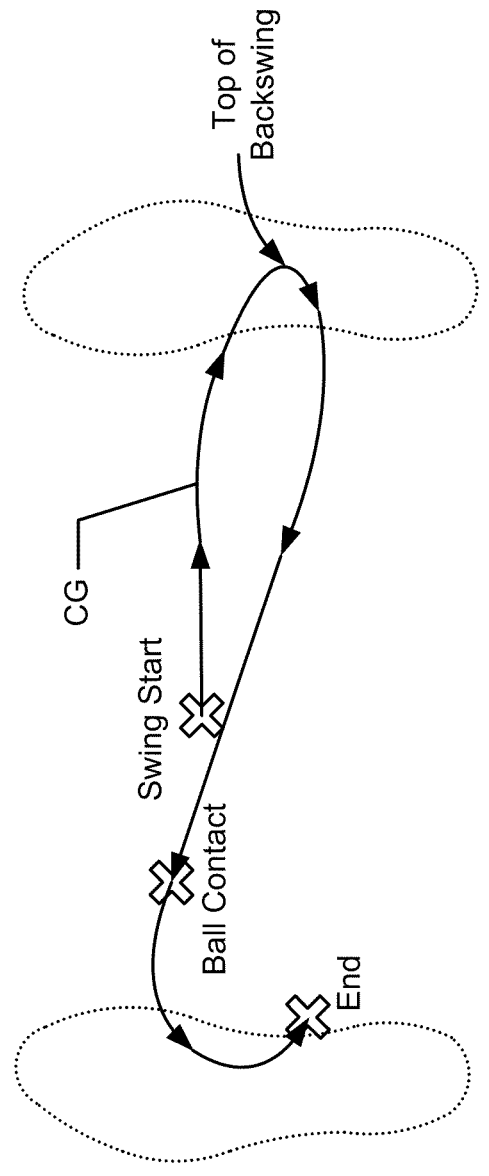

FIG. 13B illustrates another example of the type of data that may be generated and/or stored using foot force sensors and/or other sensors during the course of a golf swing in accordance with at least some examples of this invention. In this example, movement of the golfer's center of gravity is tracked throughout a swing, from the swing start (where the center of gravity may be relatively centered), through the backswing (as the center of gravity and the user's weight may tend to shift rearward, predominantly on the rear foot), through the downswing up to ball contact (as the center of gravity and the user's weight tends to shift frontward), and through the follow through (where most (if not all) of the user's weight is on the user's front foot). Representations of the user's feet are shown in FIG. 13B merely for context (the location of the user's center of gravity during the swing (as shown by the CG line in FIG. 13B) will not necessarily correspond to the specific relative body position shown by the representation of the user's feet in FIG. 13B). Center of gravity information of this type may be useful in systems and methods according to at least some examples of this invention in ascertaining characteristics of the golfer's typical swing (or in ascertaining a golf swing signature or golf composite swing signature for the golfer) or swing tempo, such as to identify improper weight shifts (a reverse "C," a casting motion, etc.).

Figure 14:
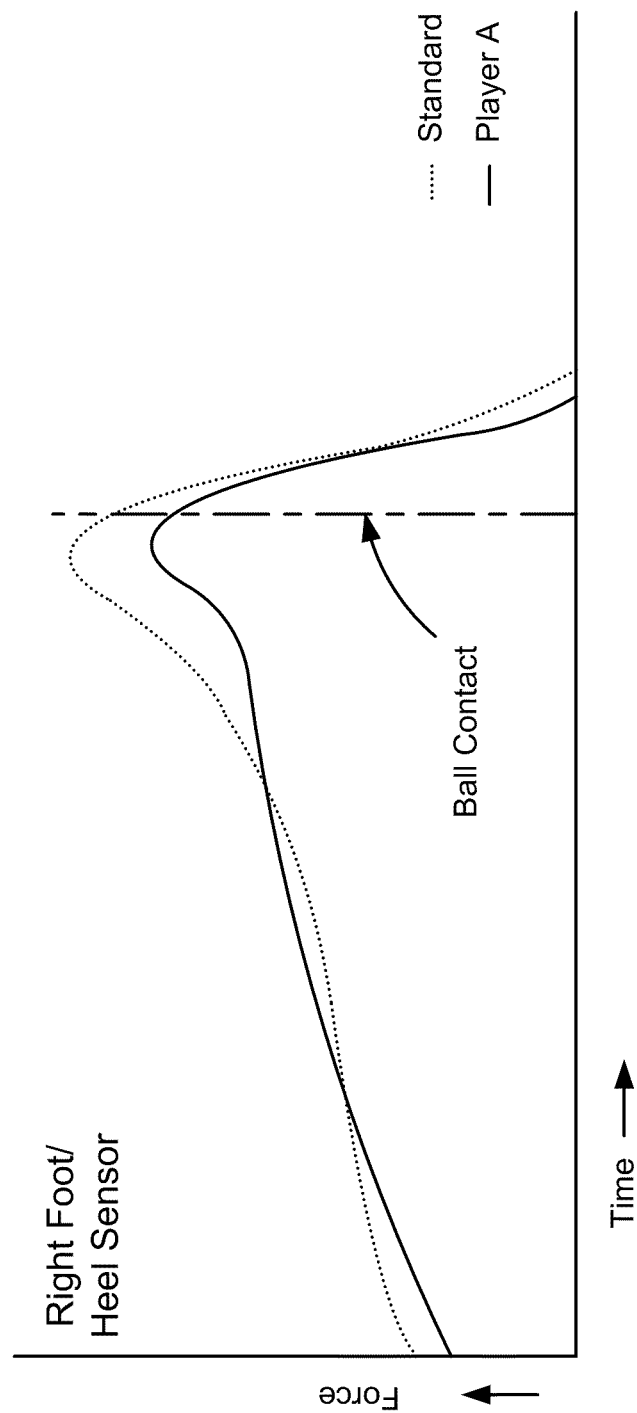

Data of the type shown in FIGS. 13A and 13B also may be useful in systems and methods according to this invention in other ways as well. For example, as shown in FIG. 14, systems and methods according to at least some examples of this invention may provide this type of dynamic foot force information to a golfer (or a golfer's coach) (e.g., weight shift and/or center of pressure on each foot information, center of gravity information, etc.) to allow a comparison of the data generated by that golfer against corresponding foot forces (or other data) generated during a "standard" swing (or target swing), e.g., a swing by a better player. In working with a player, a golf coach might identify one or more other golfers having similar characteristics to the golfer being taught (e.g., using swing data stored in a golf community data hub, as will be described in more detail below). For example, a golf coach may find another player (optionally from stored information in a community hub library) that has similar height, weight, swing tempo, size dimensions (e.g., inseam length, fingertip to ground length, etc.), swing speed, general swing type, etc. If this "other" player has a better swing than the player being taught (e.g., if the other player is a professional, an elite player, a low handicap player, etc.), the player being taught might benefit from making efforts to copy the swing dynamics of this other, better player. Therefore, if an output device 112 provides the player being taught with data comparing his or her foot force data or center of gravity motion data (Player A in FIG. 14) with this better player's foot force data or center of gravity motion data (the "Standard" data shown in FIG. 14), the player being taught can better make efforts to try to mimic the foot force data or center of gravity motion data generated by the better player and/or will better know when they have been successful. Being able to see (through the output device 112) when one better mimics the foot and/or weight shift action of the better player, and being able to mentally correlate this improved movement with the "feel" of the swing, will allow the player being taught to better develop muscle memory of the better or improved swing feel. Such comparative data can help the player improve in one or more areas (e.g., hit it longer or straighter, eliminate a hook or slice, develop better ball flight control, improve swing repeatability, etc.).

While FIGS. 13A and 14 show dynamic foot force data during the golf swing, the same or similar data may be generated for other features of the golf swing, such as hand or arm positioning data (e.g., using a glove or shirt based sensor); shoulder turn or positioning data (e.g., using a shirt based sensor); club or club head positioning, velocity, or acceleration data (using golf club based sensors); grip pressure; center of gravity location data (e.g., as shown in FIG. 13B); etc. Such dynamic data may be used in the same or similar manners to the foot force data described above.

In addition to the various systems and methods described above, additional aspects of this invention relate to computer-readable media, including computer-executable instructions stored thereon, for operating the various systems, performing the various methods, and/or collecting the various types of data described above.

2. Example Community Data Hub Aspects of this Invention

As noted above, various aspects of this invention relate to systems and methods for storing and allowing access to golf data for a community of golfers (also referred to herein as a "central data hub" or simply a "community"). In at least some examples of this invention, the central data hub or golf community allows users (or members) to upload golf data (e.g., data relating to one or more specific rounds of golf, golf swing data, etc.) for storage at a centralized location, and this centralized location may be accessed to provide information back to that golfer, as well as to provide more global information relating to rounds played by plural golfers within the community. The information accessible to others within the community may be filtered or controlled in any desired manner, e.g., to enable access to anyone's data; to enable access to anyone's data but in an anonymous manner; to enable access to designated third party data (e.g., to a sub-group of designated "friends"), optionally, after obtaining both party's consent; to enable access based on skill level; to enable access based on the course(s) played; etc. In some example systems and methods according to this invention, data for an individual and from others may be stored and accessed in a manner similar to the way in which ambulatory activity data is stored and accessible on the NIKE+™ system, commercially available from NIKE, Inc. of Beaverton, Oreg.

Figure 15A:
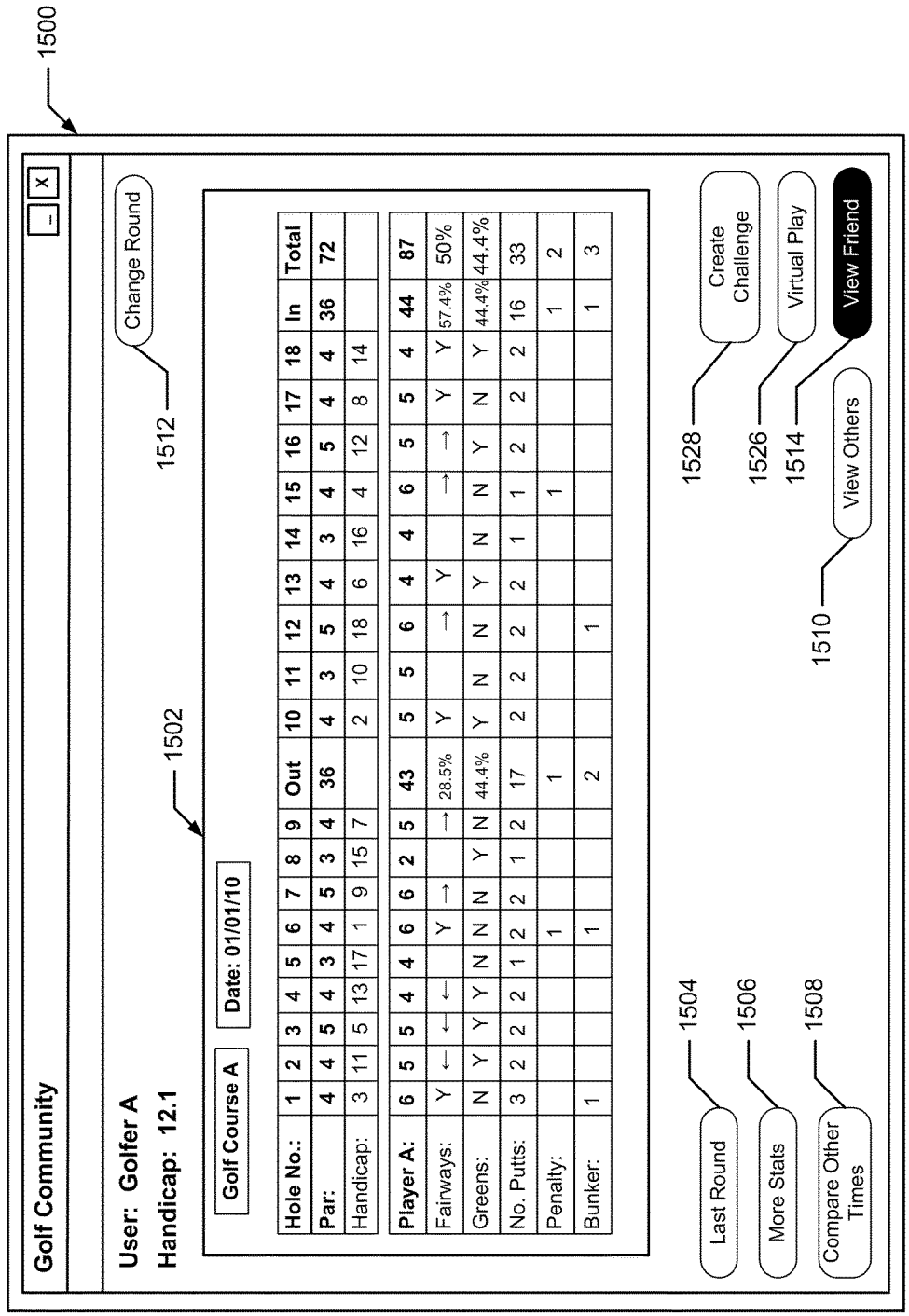

One feature of golf community data hubs in accordance with at least some examples of this invention relates to the ability for users to upload, store, and access golf scoring data for their individual rounds of golf FIG. 15A shows an example user interface screen 1500 that a user might see when looking at his/her golf scoring data for a round of golf on his/her computer (e.g., display device 122*a* and/or 134*a* in FIGS. 2A and 2B). More specifically, as shown in FIG. 15A, the user interface 1500 of this example displays a scorecard 1502 for a specific, individual round of golf The interface 1500 displays various information regarding the specific round, such as the golf course played, the date, hole-by-hole scoring, par information, and hole handicap information. Other data for the course could also be displayed, such as hole yardages (optionally, from the specific tees used for the round), course slope, course rating, etc. This example scorecard 1502 also displays other scoring information and statistics for this individual player in this round, like fairways hit; whether fairways were missed short, long, left, or right; greens hit in regulation; the number of putts taken per hole; penalty shots assessed; bunker shots taken; total length of putts made over the round; distance to the pin on approach shots; length of approach shots; etc. This input data may be collected and ascertained based on data manually input into the system and/or from data automatically recorded during a round of golf, e.g., using the electronic sensors included with one or more of the clubs, GPS data, etc. This base data also may be used to calculate and display other statistics relevant to the golfer, such as: an average golf score for the golfer on an individual hole over a plurality of times playing the individual hole; an average golf score per round for the golfer over a plurality of rounds of golf; an average number of fairways hit from a tee shot per round by the golfer over a plurality of rounds of golf; an average number of fairways missed left from a tee shot per round by the golfer over a plurality of rounds of golf; an average number of fairways missed right from a tee shot per round by the golfer over a plurality of rounds of golf; an average number of fairways missed short from a tee shot per round by the golfer over a plurality of rounds of golf; an average number of fairways missed long from a tee shot per round by the golfer over a plurality of rounds of golf; an average number of greens hit in regulation per round by the golfer over a plurality of rounds of golf; an average number of putts played per round by the golfer over a plurality of rounds of golf; an average number of putts played per green hit in regulation by the golfer over a plurality of rounds of golf; an average number of sand saves made per round by the golfer over a plurality of rounds of golf; an average number of penalty strokes incurred per round by the golfer over a plurality of rounds of golf; an average number of times making a score of par or better by the golfer when missing a green in regulation over a plurality of rounds of golf; an average total length of putts made over a plurality of rounds of golf; average distance to the pin for various length approaches; distances for each club; the number of times each club was used; etc. Additional statistics of this type may be accessed, for example, by user interaction with the "Last Round" icon 1504 (to see data (optionally in a comparative manner) for the golfer's last round), the "More Stats" icon 1506 (to see data (optionally comparative manner) for other rounds by the golfer), and/or "Compare Other Times" icon 1508 (to see data (optionally in a comparative manner) for the golfer's last time(s) playing this specific golf course) on the interface screen 1500.

Optionally, if desired, systems and methods according to at least some examples of this invention may receive user input indicating one or more statistics for inclusion in the comparison provided to the output system and/or displayed on the interface screen 1500 (e.g., by interacting with the "More Stats" icon 1506). As another potential option, the output system and/or interface screen 1500 may provide comparisons of statistical information for a plurality of different golf statistics (optionally user selectable golf statistics). As some more specific examples, any of the various statistics described above (or combination thereof) may be selected by the user and/or displayed on interface screen 1500.

This type of data also may be submitted to the community data pool to enable additional data calculations, including, for example: an average golf score for some portion of the community of golfers on an individual golf hole; an average golf score for some portion of the community of golfers on an individual golf course; an average number of fairways hit from a tee shot per round by some portion of the community of golfers on an individual golf course; an average number of fairways missed left from a tee shot per round by some portion of the community of golfers on an individual golf course; an average number of fairways missed right from a tee shot per round by some portion of the community of golfers on an individual golf course; an average number of fairways missed short from a tee shot per round by some portion of the community of golfers on an individual golf course; an average number of fairways missed long from a tee shot per round by some portion of the community of golfers on an individual golf course; an average number of greens hit in regulation per round by some portion of the community of golfers on an individual golf course; an average number of putts played per round by some portion of the community of golfers on an individual golf course; an average number of putts played per green hit in regulation by some portion of the community of golfers on an individual golf course; an average number of sand saves made per round by some portion of the community of golfers on an individual golf course; an average number of penalty strokes incurred per round by some portion of the community of golfers on an individual golf course; an average number of times making a score of par or better when missing a green in regulation by some portion of the community of golfers on an individual golf course; an average golf score for some portion of the community of golfers for a round of golf; an average number of fairways hit from a tee shot per round by some portion of the community of golfers; an average number of fairways missed left from a tee shot per round by some portion of the community of golfers; an average number of fairways missed right from a tee shot per round by some portion of the community of golfers; an average number of fairways missed short from a tee shot per round by some portion of the community of golfers; an average number of fairways missed long from a tee shot per round by some portion of the community of golfers; an average number of greens hit in regulation per round by some portion of the community of golfers; an average number of putts played per round by some portion of the community of golfers; an average number of putts played per green hit in regulation by some portion of the community of golfers; an average number of sand saves made per round by some portion of the community of golfers; an average number of penalty strokes incurred per round by some portion of the community of golfers; an average number of times making a score of par or better when missing a green in regulation by some portion of the community of golfers; etc. The "portion" of the community for which data may be made available includes, but is not limited to: the entire community (optionally only those giving permission to use their data); a user designated group within the community (e.g., designated "friends"); those with similar handicap or skill levels; those with similar golf swing signatures or composite golf swing signatures (as will be described in more detail below); specified individuals; for rounds on the same course (optionally using the same set of tees); etc. Additional statistics of this type may be accessed, for example, by user interaction with the "View Others" icon 1510 on the interface screen 1500, which may activate a pop-up menu or other interface element to allow the user to further select the type of other data desired, such as data for all players, data for all players on this course, data for all players with a similar handicap, data for all players with a similar handicap on this course, data for a selected group of one or more identified "friends," data for a selected group of one or more identified "friends" on this golf course, etc.

Systems and methods according to examples of this invention may store, track, and maintain data relevant to any desired statistic, like the statistical data tracked for PGA professionals (e.g., like the data or individual statistics compiled by the SHOTLINK® system (SHOTLINK® is a registered trademark owned by the PGA Tour, Inc. of Ponte Verde Beach, Fla.)).

Optionally, systems and methods according to at least some examples of this invention may accept user input, e.g., audio input, video input, picture input, textual input, etc. This input information (e.g., a user's comments) may be linked, for example, to a specific shot, a specific hole, a specific club being used, a specific geographical location (e.g., via the GPS), etc. The user can then access this input at a later time, e.g., when analyzing his/her play, the next time he/she plays the same hole, the next time he/she plays a similar hole, the next time he/she uses that same club, etc. Any desired type of information may be input, such as advice on playing the hole, a reminder of a swing tip for that club, a reminder of an aiming point for the hole, club selection advice, a reminder of previous success on the hole, etc. Optionally, if desired, a player can make his/her comment or other information available to others, e.g., others in the community, other designated "friends," other subscribers to a service, etc.

The interface 1500 also may allow a user to identify and select the specific round scoring data to be displayed, e.g., by interaction with the "Change Round" icon 1512 (which may activate a drop-down menu or other interface item from which the user can select the specific round for display).

From the example interface screen 1500 shown in FIG. 15A, users can also activate a more direct comparison of their play, on this individual course, with that of one or more "friends" through interaction with the "View Friend" icon 1514. Optionally, initial interaction with icon 1514 may launch some steps and/or interface elements that allow the user to more specifically identify the friend and/or round of interest for viewing. While interaction with this icon 1514 may induce many different specific reactions by systems and methods according to this invention, in some examples of this invention a new user interface screen 1520 like that shown in FIG. 15B eventually may be displayed. In this user interface screen 1520, two scorecards 1522 and 1524 are displayed, one scorecard 1522 showing the original user's scoring and other data and the other scorecard 1524 showing the "friend's" scoring and other data on the same course. The scoring data for the two parties may have been for concurrent play of the course or for play at different, separate times. This display screen 1520 allows easy comparison of the two player's rounds, although other ways of displaying the data to allow an easy comparison may be used without departing from this invention.

Figure 15C:
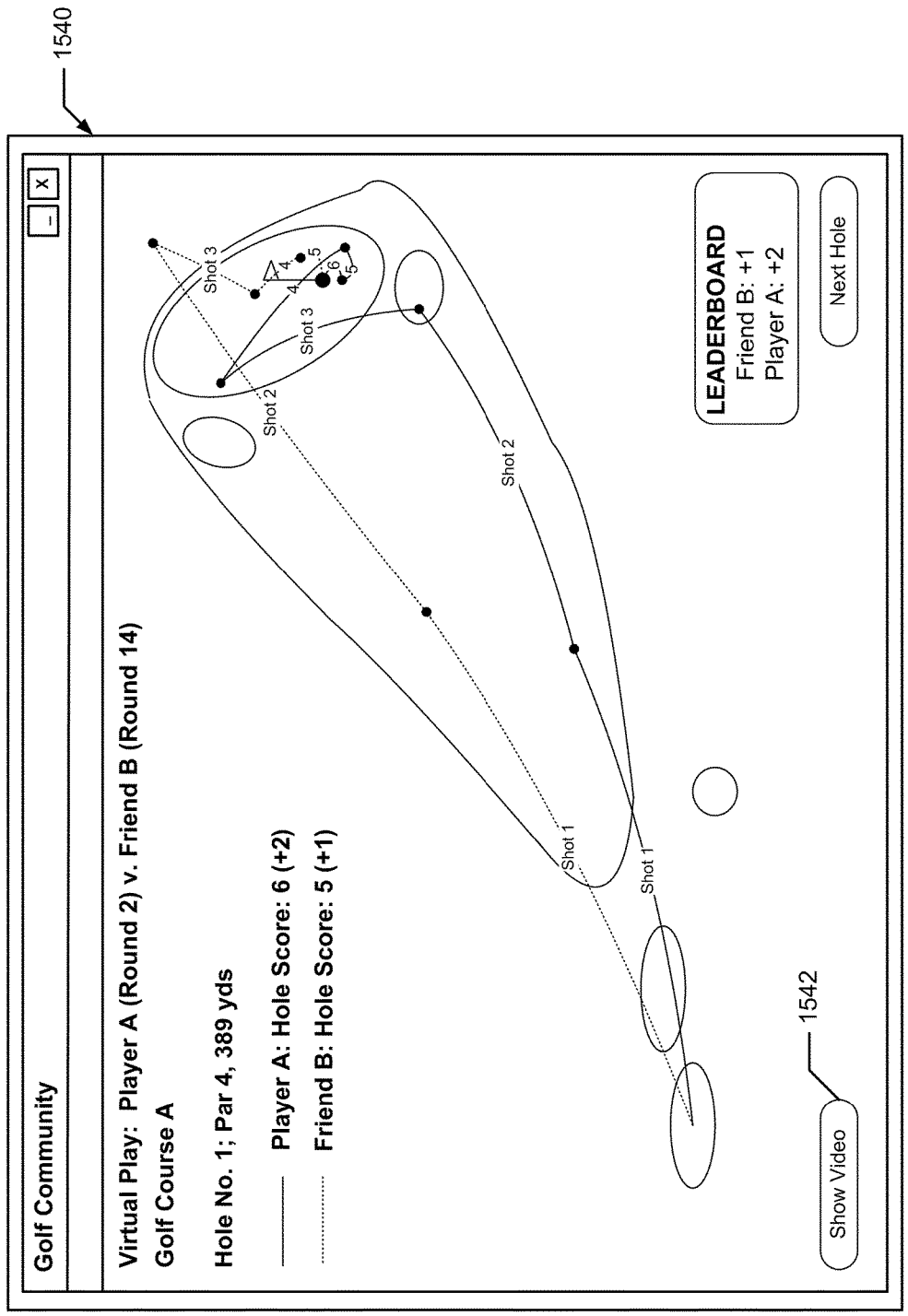

FIGS. 15A and 15B illustrate another example feature that may be included in systems and methods according to at least some examples of this invention, namely, the "Virtual Play" features (through interaction with icon 1526). The Virtual Play icon 1526 may be used to launch an animation of the play of one or more players over a round of golf. FIG. 15C shows an example animation display screen 1540 on which the shots from Player A and Friend B are displayed over a map or animation of the course (or portion thereof). By accepting data from golf clubs, player mounted sensors, GPS or other individual sensors for individual shots in a round (e.g., in a manner as described in U.S. Patent Publication No. 2009/0209358 to Niegowski), systems and methods according to at least some examples of this invention can "play back" the rounds, e.g., on a hole-by-hole manner, as shown in FIG. 15C. If desired, the play back also may display or include other information, such as the distance of each shot, the club used for each shot, long drive contests, closest to the pin contests, other statistical contests, individual hole score per player, running leader board score for the players, challenge information, any desired statistical information for the players (or others), score against handicap, etc. If necessary or desired, the interface launching the virtual play features also may allow user selection of the specific rounds for the virtual play, e.g., it could automatically use the rounds displayed on interface screen 1520 or it may allow user selection of other round(s) as well (e.g., if launched from interface screen 1500).

While the play back may include static or dynamic representations of the various shots that each player took as shown generally in FIG. 15C, if desired, the play back also may include display of the shots in a "video game" like manner. More specifically, if desired, the play back may include an avatar or other graphical representation of each individual player shown taking golf swings (optionally on a facsimile representation of the specific golf course being played), so that the play back appears similar to a video game presentation of golf. Various video game type representations of golf shots and rounds of golf are commonly known and commercially available. This feature may allow users to virtually play golf with one another, optionally in an interactive or collaborative setting (e.g., at discrete separate locations (e.g., using WebEx® conferencing or collaboration software systems and methods (available from Cisco Systems, Inc.) or other similar collaboration software systems and methods). Additionally or alternatively, if desired, an individual could play a virtual animation for one round on a golf course against themselves in an earlier round played on the same course.

As another potential alternative, if desired, systems and methods according to at least some examples of this invention may provide at least some of the virtual play feedback (e.g., like that shown in FIG. 15C) overlaid on satellite images of the golf course (e.g., from a third party source, like Google Earth) and/or using video images of the golfer's actual play on the course (e.g., if the golf course is equipped with video cameras or the player's play is otherwise video recorded, such as by using the video recording systems described above). As another potential option, the virtual playback may use animation for showing much of the golfer's play, but an icon 1542 or other indicator could be provided for golf shots where actual video of the player's shot has been recorded and is available for playback. The ability to "annotate" one's round with their own comments as described above (e.g., on specific shots or specific locations), via audio, video, textual, or pictorial information, may be very useful in this virtual playback or analysis environment.

Figure 16:
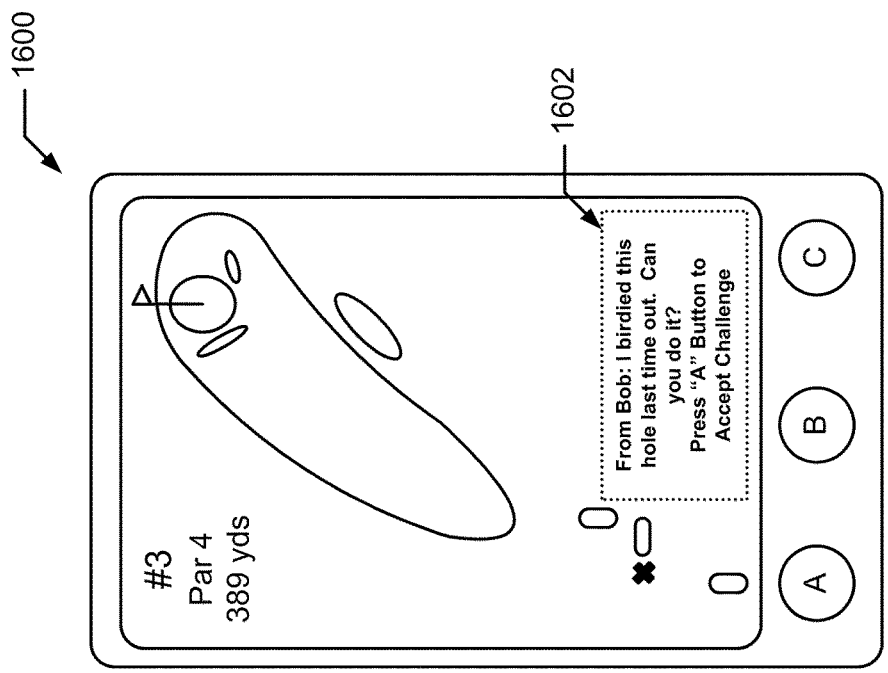

The community aspects of this invention may allow other types of interaction between members of the community, at least in some example systems and methods according to this invention. For example, as shown in FIG. 15A, some example systems and methods may allow users to interact with one another to set up "challenges" for themselves or one another (e.g., via the "Create Challenge" icon 1528). A user may decide to create a challenge for themselves and/or others through the community data hub system, and systems and methods according to at least some examples of this invention may display information relating to this challenge to all involved at appropriate times (e.g., before or during a round, while the user is on-line with the community data hub, when approaching a specific hole, etc.). FIG. 16 shows an example arrangement in which a user is playing golf (e.g., using a golf GPS device or an electronic scorecard device 1600), and as the user approaches a certain hole (e.g., as determined by the GPS device or electronic scorecard 1600), a previously downloaded or newly acquired challenge from a friend is displayed (in challenge display area 1602). The party playing golf may have already been advised of the challenge or its display during the round may be the player's first indication of the challenge's existence. Any desired user interface element(s) may be provided (e.g., in a community data hub generated interface screen) to enable the friend (or other person) to create the challenge. While not necessary, this illustrated example system allows the user to electronically indicate his or her acceptance of the challenge, which may be used, if desired, to trigger systems and methods according to at least some examples of this invention to advise the friend that the challenge has been accepted (optionally, in real time) and/or to advise the friend of the results of the challenge.

Various types of challenges may be made without departing from this invention, and, if desired, users may be allowed to create and develop their own parameters to a challenge. Examples of such challenges include, but are not limited to: one or more of the following: a longest drive contest (overall, on a specific hole, average, etc.); a best 9 hole gross score (optionally, on a specific course); a best 18 hole gross score (optionally, on a specific course); a best 9 hole net score to handicap (optionally, on a specific course); a best 18 hole net score to handicap (optionally, on a specific course); a best score on an individual hole; most rounds played within a predetermined time period; most different golf courses played (optionally within a predetermined time period); lowest handicap by a specified date; greatest improvement in handicap over a prescribed time or number of rounds; a race to a predetermined number of rounds played; a race to a specific statistical level of any desired golf statistic (e.g., longest average drive, fewest number of putts, longest made putt, longest total putt lengths made over a round of golf, etc.); most pars or birdies; and greatest improvement in a specified golf statistic over a prescribed time period or number of rounds.

Figure 17:
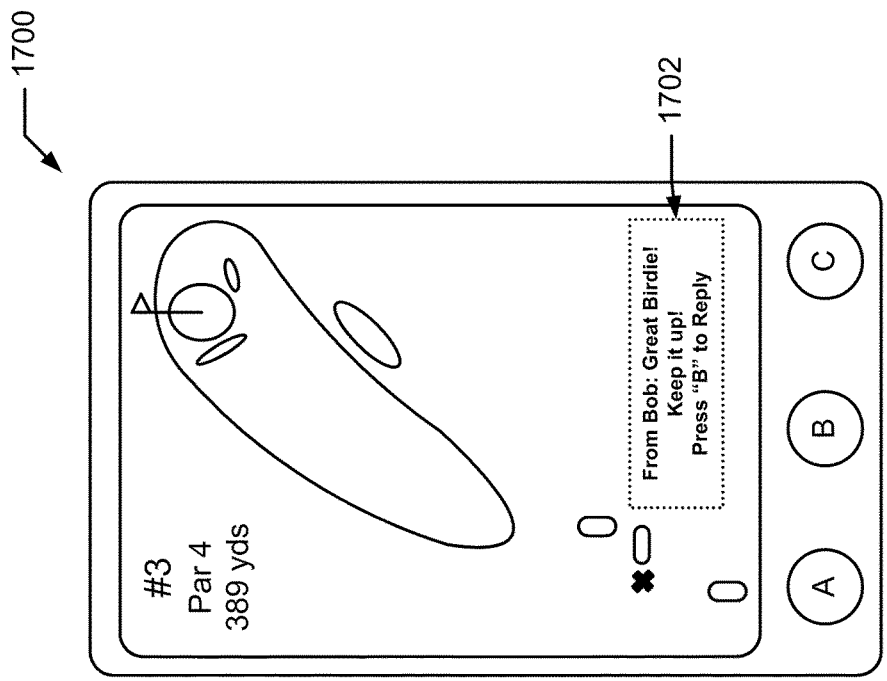
FIGS. 16 through 19 illustrate various examples of the use of a community data hub to provide information to golfers in systems and methods according to at least some examples of this invention.

While the creation of challenges is described above with respect to FIGS. 15A and 16, other types of interactions and messages are possible between community members (or other community users) without departing from this invention. For example, as shown in FIG. 17, in systems 1700 and methods according to at least some examples of this invention, users could arrange to send a congratulatory message to a friend (e.g., see message box 1702) when the friend achieves some predetermined scoring feat, such as making a birdie or eagle, making a hole in one, making a predetermined scoring goal for 9 or 18 holes, making a sand save, making a long putt, making a long drive, hitting a green from more than a predetermined distance, etc. As another potential option, users could send messages to "trash talk" or to otherwise chide a player when achieving a bad outcome (e.g., like making an "8" or more on a hole, hitting the ball out of bounds, three- or four-putting, etc.). Such interactive communications, particularly if taking place in real time, as the round is being played, may make the round feel more like one is playing with his/her friends. Optionally, if desired, such systems and methods may allow a user to send a reply, such as via email, text message, telephone, etc., optionally, while the round is taking place (e.g., via a user interface or other user input devices provided on the electronic device 1700, such as a soft or hard keyboard, etc.).

Figures 18A, 18B:
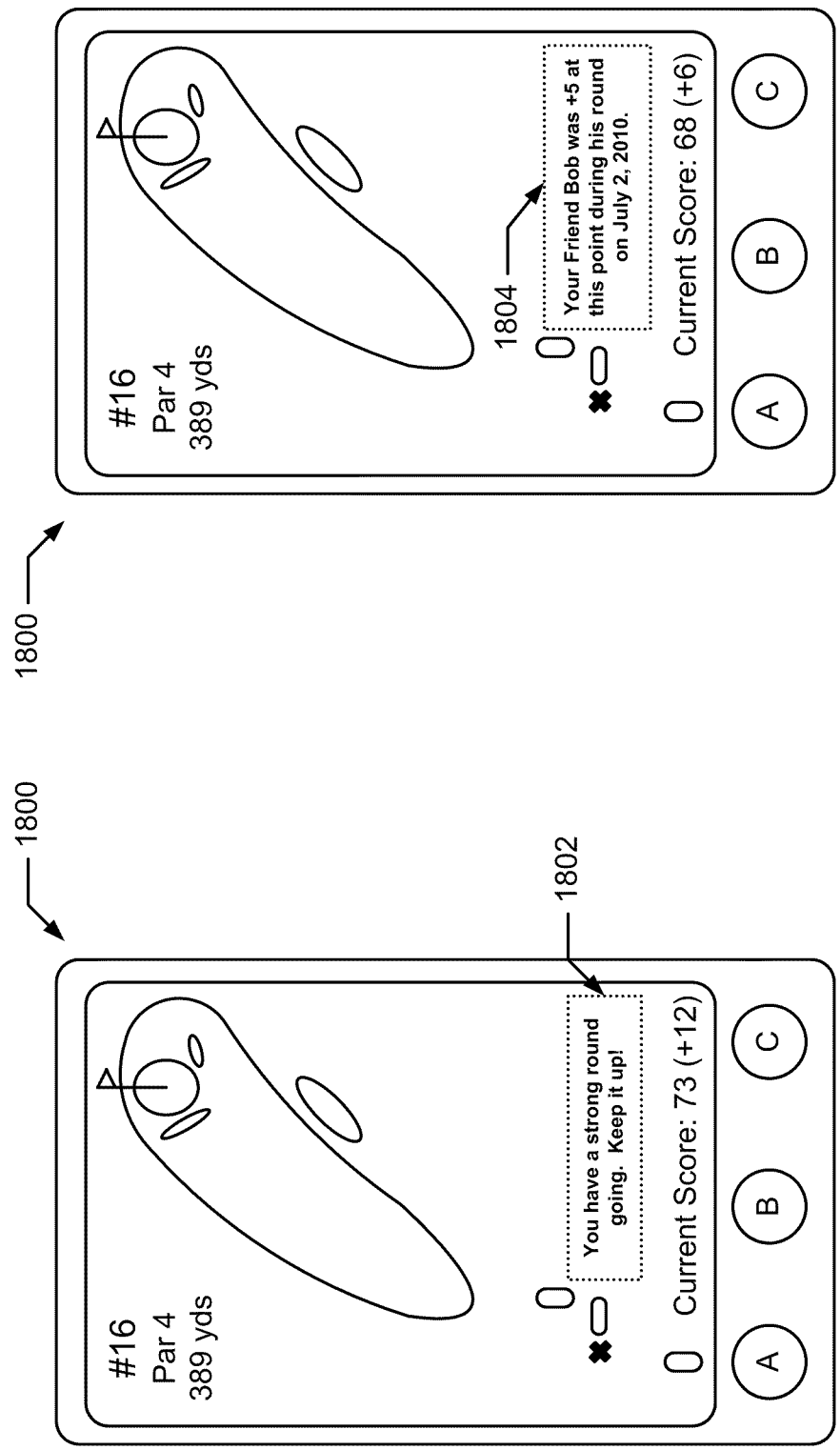

Messages of encouragement or support are not limited to those input by or generated by "friends" within the community. Rather, because the community data hub of systems and methods according to at least some examples of this invention may store data for one or more of the individual player's rounds, it could be programmed and adapted to provide encouragement and support to the golfer as his/her round progresses. For example, as shown in FIG. 18A, if the system 1800 and method determines that a user has a good round going (at least for their typical play or handicap level), it could be programmed and adapted to send a message of encouragement or support at an appropriate time in the round (see dialog box 1802). As another example, as shown in FIG. 18B, the system could automatically compare the user's round against rounds of a friend on the same course and provide information to the user about their friend's round (see dialog box 1804). Challenges and/or congratulatory messages also could be automatically generated, e.g. for any of the various scoring feats described above in conjunction with FIGS. 16 and 17. If desired, users may be given the opportunity to control the type and extent to which messages from a friend and/or automatically generated system messages are presented during a round of golf (e.g., some golfers may prefer not to know where they stand and/or may prefer not to receive this type of information during a round, to avoid putting added pressure on themselves).

Figure 19:
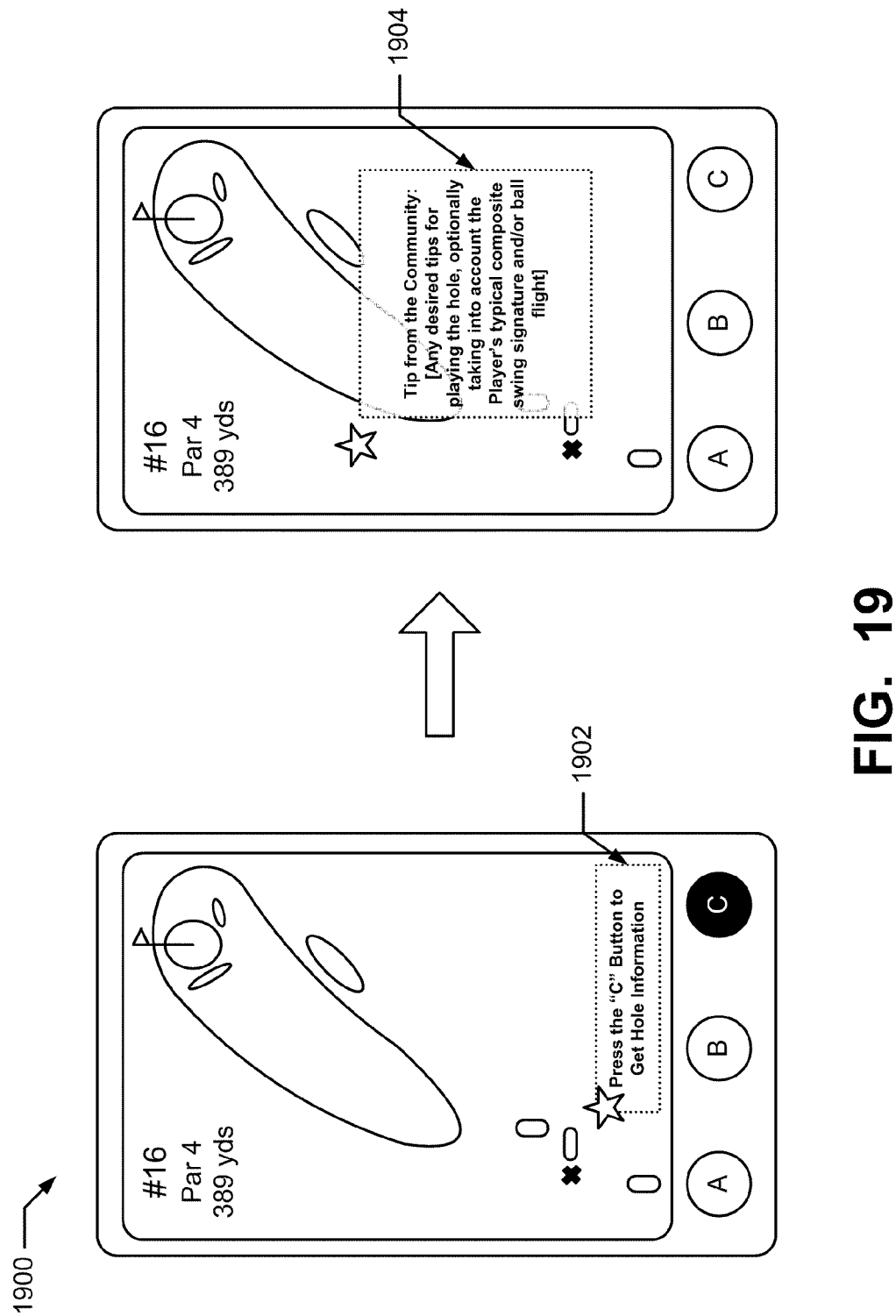

Community data features of this invention may provide or enable additional features in systems and methods according to at least some examples of this invention, an example of which is illustrated in FIG. 19. As will be described in more detail below, systems and methods according to at least some examples of this invention may ascertain and store information regarding a typical ball flight and/or composite golf swing signature information for an individual user, as well as other data, such as typical distances for various clubs, hit quality for various clubs, etc. This type of stored information may be used to provide more golfer specific feedback and data to the golfer as a round is being played. FIG. 19 shows an example system 1900 in which a player is given the option to obtain additional "hole information" before or while a hole is played (see dialog box 1902). A positive response to this inquiry may launch a display (see dialog box 1904) including a "tip" for playing the hole from the community or another. Rather than a generic tip from a professional or the course designer, however, this tip may be derived from stored information in the community hub. Any desired criteria may be used to determine the source for the tip information included in dialog box 1904. For example, the information could originate from: another player of similar skill level (similar handicap) that previously played the course; another lower handicap player that tends to hit his/her ball a similar distance to the player using system 1900; another player having similar swing speed as the player using system 1900; another player having a similar or the same composite golf swing signature as the player using system 1900; another player having a similar typical ball flight as the player using system 1900; the player using the system 1900 (e.g., from information downloaded relating to a previous time playing that hole); etc.

Systems and methods according to at least some examples of this invention may be designed to allow players to insert their own tips or comments that can be replayed at future times when the hole is played. As another example, if desired, any advice provided (from any source) may take into account, at least in part, the player's previous history on this specific hole (or other similar holes). As another potential feature, if desired, when playing a new or relatively unfamiliar course, systems and methods according to the invention could advise the player when a new hole they are playing has similar properties or features (e.g., yardage, dogleg features, bunkers or other hazard features, etc.) to holes they play more regularly on other courses (e.g., on their home course) and/or provide advice based on this similarity (e.g., aiming points or directions, club selection advice, hole strategy, etc.).

If desired, systems and methods according to at least some examples of this invention may provide the user with suggested clubs for use for various shots on the course, taking into consideration the locations of and distances from hazards, pin location, the player's average or typical distance for each club, the player's typical ball flight pattern or composite golf swing signature, the player's typical "miss" or poor shot results with this club and/or from this distance, etc. Aiming points or other suggestions or tips also could be provided.

In addition to the various systems and methods described above, additional aspects of this invention relate to computer-readable media, including computer-executable instructions stored thereon, for operating the various systems, performing the various methods, and/or presenting the various user interface displays described above, including these features in an individual system or a community setting.

3. Collection and Storage of Swing Dynamics, Ball Flight, Golf Swing Signature, and Composite Golf Swing Signature Data Aspects of this Invention As noted above, various aspects of this invention relate to collection and storage of swing dynamics information (e.g., weight shift, club position, body position, club motion, etc.) and/or ball flight information (e.g., launch monitor type data), optionally, at least partially at a community data hub. Additional aspects and features of the collection, storage, and use of this data will be described in more detail below.

Figures 20, 21:
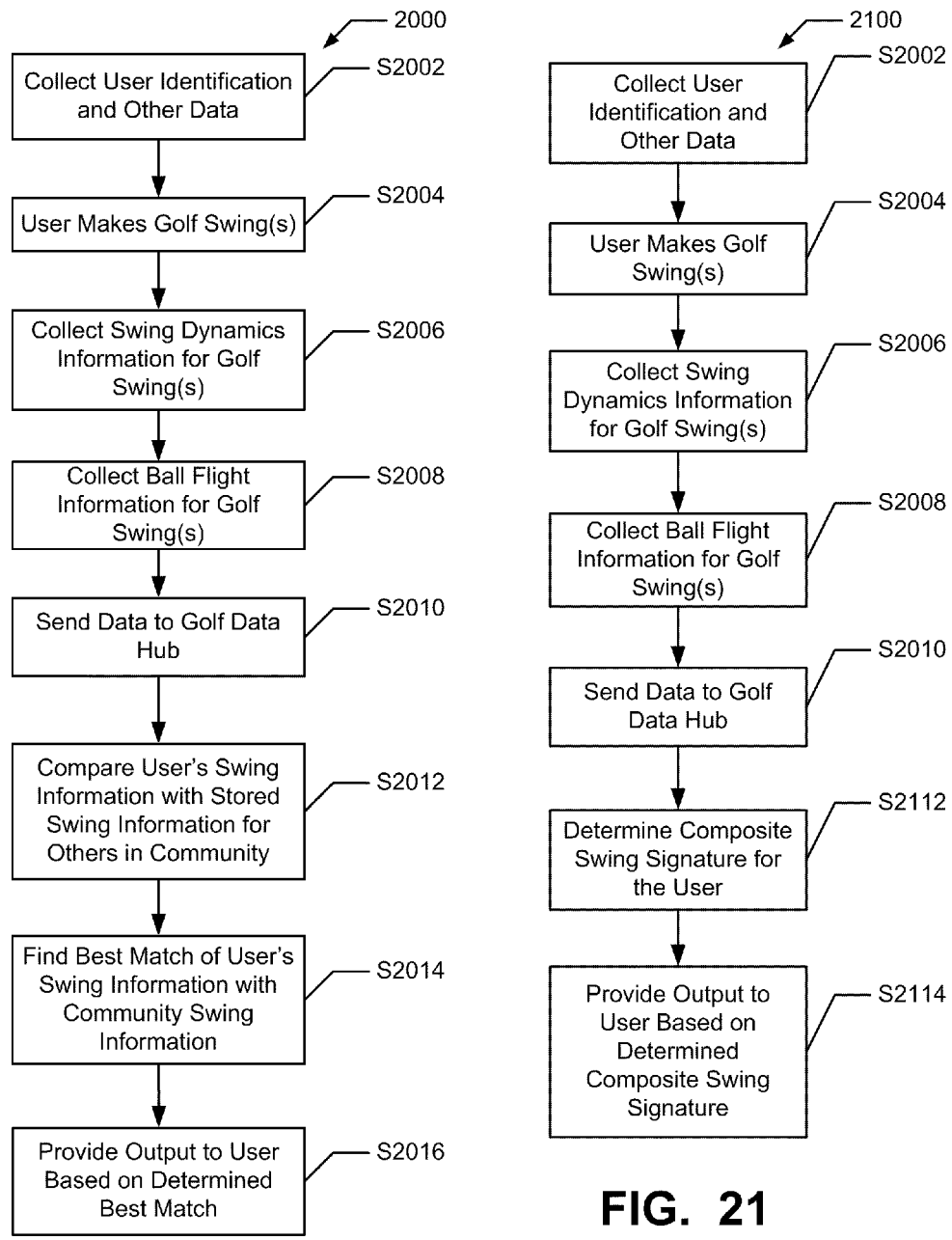
FIGS. 20 and 21 illustrate data collection methods that may be used in systems and methods according to at least some examples of this invention.

To provide individualized feedback information (such as equipment selection recommendations, equipment adjustment recommendations, swing tips, coaching drills, and the like), systems and methods according to at least some examples of this invention will collect, store, and use golf swing dynamics information, ball flight information, and optionally other information for one or more golf swings made by a player. FIG. 20 illustrates example steps involved in one potential data collection method 2000 according to this invention (at least some of the steps identified in FIG. 20 may be performed using a computer system, such as a personal computer system or other systems of the types described above, and the data may be collected at a hitting bay, as golf is being played, at a sales location, or at another appropriate time, as described above). As a first step S2002, user identification and other data is collected (such as user height, weight, inseam length, fingertip-to-floor length, handicap, current club set information, etc.), e.g., input into a computer system using conventional user input devices, such as a keyboard, mouse, data download, etc. Then, the user makes one or more golf swings (S2004) during at least some of which golf swing dynamics information and/or ball flight information is collected (Steps S2006 and S2008, respectively).

At appropriate times (e.g., after each swing, as a larger bulk data upload, etc.), the swing dynamics and ball flight data for at least some of the swings may be uploaded to a central golf data hub (S2010). Optionally, if desired, not all swing data need be uploaded. For example, uploaded data could be limited to that for use of certain clubs, for certain user (or coach) selected shots, etc., e.g., to avoid excessive data transfer (and to allow exclusion of certain clearly "bad" data, such as data relating to clearly mishit shots).

In some systems and methods according to this invention, swing data for one or more individual swings of a golfer (e.g., swing dynamics information, ball launch information, etc.) will be compared against similar swing data for others in the golf community (S2012) in an effort to locate a "match" or "category" for the golfer's swing with respect to one or more other member(s) of the community (S2014). Depending on the type of output to be generated, the "community of golfers" available for this comparison may be limited to golfers having low handicaps, good scoring capability, recent improvements in handicap or average scoring, etc., so that the feedback sent to the golfer (S2016) relates to information derived from a high quality player. Alternatively, the "community" available for the comparisons at Steps S2012 and S2014 may involve all members of the overall community so that this current golfer may be matched with others in the community of similar skills and/or swing types.

As noted above, any desired output may be generated and/or provided to the golfer (or others) at Step S2016, including, for example, audio, video, textual, or other output (e.g., on a display device); sensory change inducing output (e.g., in shoes or other apparel, in the golf club, in sound produced during a swing, etc.); etc. The output also may include any desired content, such as club or ball fitting information; club or ball selection information; club parameter adjustment information (e.g., changes to face angle, lie angle, loft angle, shaft flex characteristics, etc.); swing tips; swing drills or other coaching information; comparative information regarding the user's swing data and one or more other player's swing data (or the user's own swing data); etc.

Collecting and storing a large volume of data for several individual user swings (e.g., complete swing dynamics data and/or ball launch data) may tend to cause data overload, causing some systems and methods to operate slowly or inefficiently. Therefore, systems and methods according to at least some examples of this invention may use data representing a "composite golf swing signature" for one or more of: individual swings (optionally, on an individual club or club type basis), individual players (optionally, on an individual club or club type basis), groups of swings (by one or more players), and/or for groups of players. FIG. 21 shows example steps in a method 2100 of collecting information for determining a composite golf swing signature. The initial steps of this method may be the same as or similar to those described above for the method of FIG. 20, so these method steps are labeled using the same step labels as in FIG. 20.

Once golf swing dynamics, ball launch, and/or other data for one or more golf swings is sent to the central data hub at Step S2010, systems and methods according to this example of the invention may process and analyze the data to develop a "composite golf swing signature" for the input data (Step S2112). Although it will be discussed in more detail below, a composite golf swing signature in accordance with at least some examples of this invention may simply represent or indicate various general characteristics or tendencies of the player's swing and/or the ball flight resulting from the swing. The various composite golf swing signatures may include individual identifications and/or individual swings that fall into one or more of the following categories: (a) slicer, low swing speed; (b) slicer, moderate swing speed; (c) slicer, high swing speed; (d) slicer, very high swing speed; (e) fader, low swing speed; (f) fader, moderate swing speed; (g) fader, high swing speed; (h) fader, very high swing speed; (i) drawer, low swing speed; (j) drawer, moderate swing speed; (k) drawer, high swing speed; (l) drawer, very high swing speed; (m) hooker, low swing speed; (n) hooker, moderate swing speed; (o) hooker, high swing speed; (p) hooker, very high swing speed; (q) straight, low swing speed; (r) straight, moderate swing speed; (s) straight, high swing speed; (t) straight, very high swing speed; (u) club "caster" with low swing speed; (v) club "caster" with moderate swing speed; (w) club "caster" with high swing speed; (x) club "caster" with very high swing speed; etc. These (and/or other) categories may be used as composite golf swing signatures in at least some systems and methods according to this invention.

Once the user's composite golf swing signature has been determined (Step S2112), systems and methods according to at least some examples of this invention will provide output to the user based on the determined composite golf swing signature (Step S2114). This output may be of any of the various types described above for Step S2016, including, for example: audio, video, textual, or other output (e.g., on a display device); sensory change inducing output (e.g., in shoes or other apparel, in the golf club, in sound produced during a swing, etc.); etc. The output also may include any desired content, such as club or ball fitting information; club or ball selection information; club parameter adjustment information; swing tips; swing drills or other coaching information; comparative information regarding the user's swing data and one or more other player's swing data; etc.

In some example systems and methods according to this invention, the central data hub 108 may store appropriate output information for users, e.g., a library of swing tips, drills, club parameters, ball parameters, and the like, correlated to the available composite golf swing signatures. Additionally, any output provided may take into account existing player information, such as existing club parameters of the player's current club set, current club adjustment information or settings, etc. As a more specific example, from the golfer identification data, golf swing signature information, and/or composite golf swing signature information, driver club head parameters (such as loft, lie, and face angles; shaft flex characteristics; etc.) may be known. Because these parameters are known, any recommendations for adjustment of these parameters may take into account the existing settings (e.g., the output may recommend changing the club from the current 1° open face angle to a 2° open face angle (or the like)). In this manner, systems and methods according to the invention can avoid suggesting unrealistic, undesirable, or impossible club settings, like avoiding suggestions to set the club face to an extreme open face position (e.g., greater than 2° or)2.5°. Rather, if the existing club is already at a relatively extreme setting, systems and methods according to the invention may predominantly provide output more in the form of swing tips, drills, or the like in an effort to correct or improve the player's swing path, rather than attempting to make ball flight corrections based on the club head parameter settings. Also, as the user's swing improves (as measured by the golf swing signatures and/or ball flight data), systems and methods could automatically provide suggestions for continuing changes to the club parameter settings. Users could also provide input to the system indicating a preference for obtaining advice in the form of swing tips or drill to improve their swing as opposed to changes in the club characteristics (or vice versa).

As additional potential examples, if desired, systems and methods according to at least some examples of this invention may be consulted by users prior to a round of golf. For example, the user could input information regarding an approaching round or information may be obtained from another source (such as the course to be played, the tee marker set to be played, the yardage(s), the expected temperature range, the expected wind conditions (e.g., strength, direction, etc.), and systems and methods according to at least some examples of this invention could provide club set recommendations for the approaching round. As some more specific examples, if desired, based on the information input for the approaching round, systems and methods according to at least some examples of this invention may provide recommendations for driver settings (e.g., to bias for high or low ball flight, to bias for right-to-left or left-to-right ball flight, etc.), recommendations for specific clubs to carry (e.g., swap out one or more long irons for more hybrids or vice versa, swap out a long iron or hybrid for a higher lofted wedge, etc.), recommendations for a specific ball, recommendations for specific apparel, etc. Such recommendations also may take into account: (a) recent weather at the course location (e.g., extreme dry, wet, wind, wind direction, etc.); (b) weather predictions (available from public sources over the Internet, etc.); (c) hole set up information (e.g., yardages of individual holes, predominant dogleg directions, most preferable ball flight directions for individual holes (e.g., left-to-right or right-to-left)); (d) typical hazard locations, positions, and/or types (e.g., sand, water, out-of-bounds, etc.); (e) number and/or lengths of forced carries; (f) fairway widths at typical drive distance range; (g) severity of rough; (h) presence or absence of large spans of desert or waste bunkers; (i) prevailing (or predicted) wind direction and/or speed on specific holes; etc. The recommendations also may take into account the user's past performance history, such as distances each club is typically hit, composite golf swing signature information, past performances on this course, past performances on similar holes or courses, etc., as well as play data from other users within the community that have played the course (e.g., those of similar handicap, those with the same or similar composite golf swing signatures, etc.). Such pre-round recommendation information may be particularly useful when playing a new or unfamiliar course.

While the above descriptions of FIGS. 20 and 21 involve the use of a central golf hub for data storage and processing, transmission of data to this type of hub is not a requirement in all systems and methods according to this invention. Rather, if desired, the collection, storage, comparisons, and output may be generated by stand-alone computer systems, optionally using golf community or composite golf swing signature data stored locally or downloadable to a client computer or other device.

Figure 22:
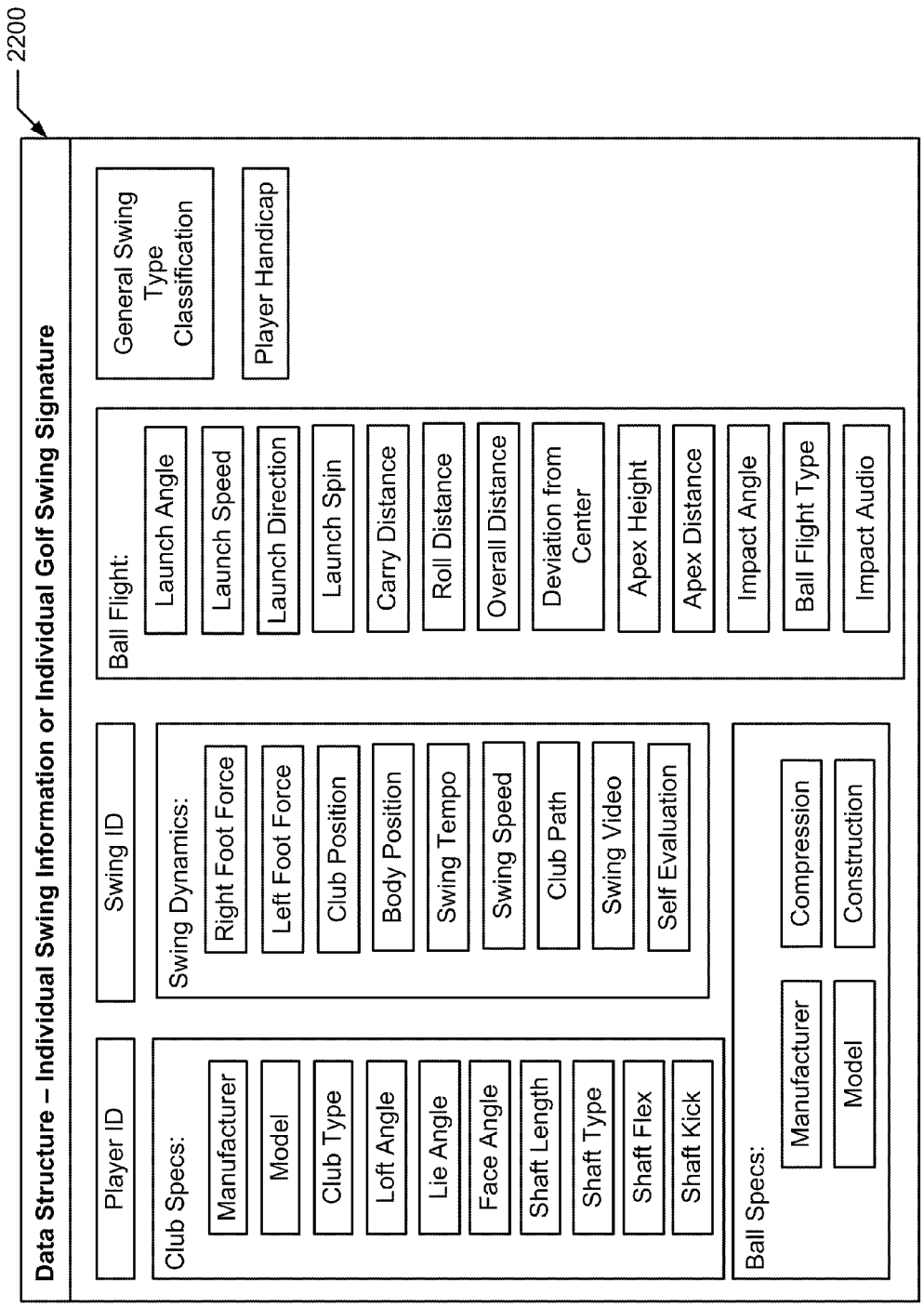
FIGS. 22 through 24 illustrate examples of data that may be stored, accessed, used, and/or determined in systems and methods according to at least some examples of this invention.
Figure 23:
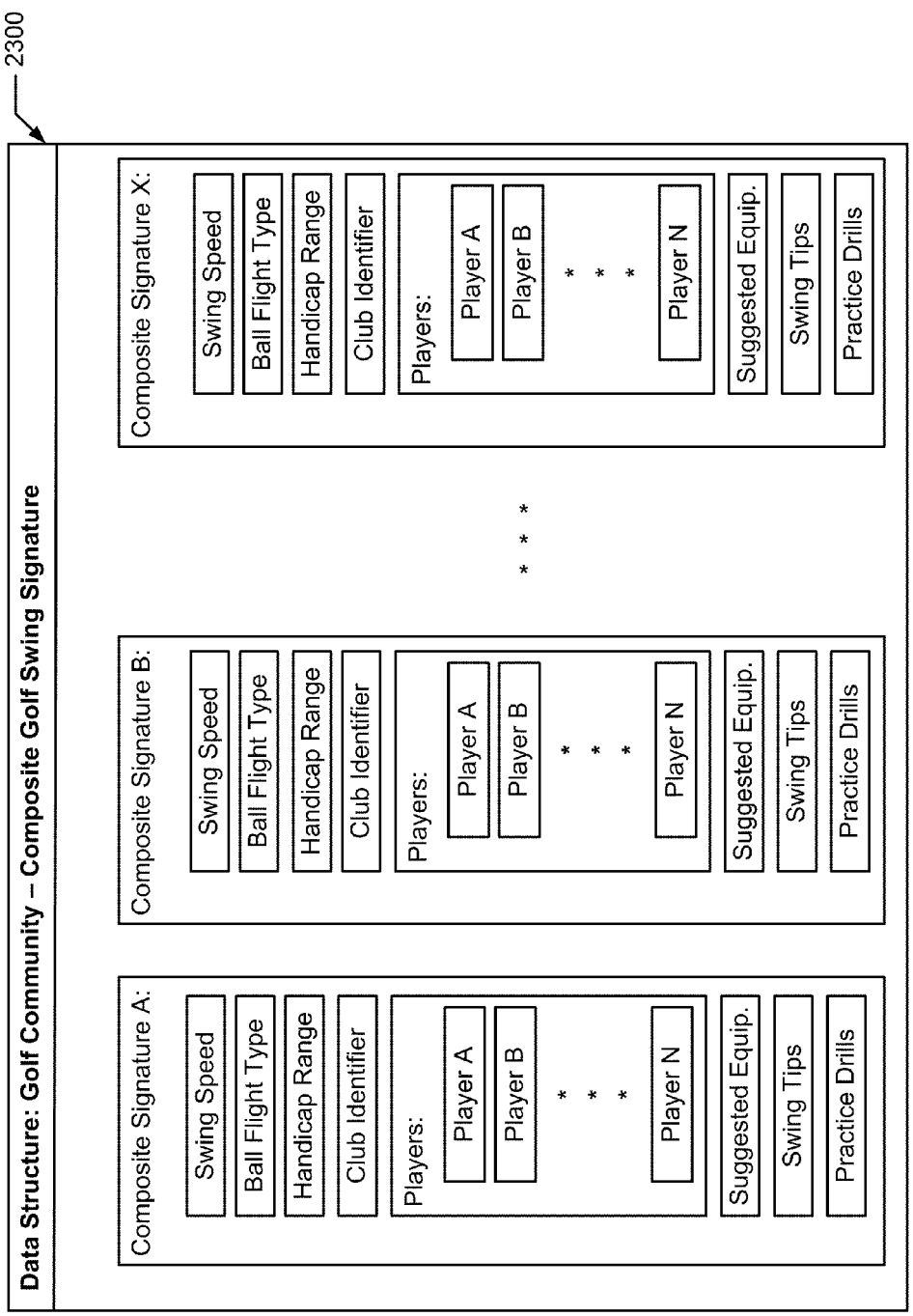
Figure 24:
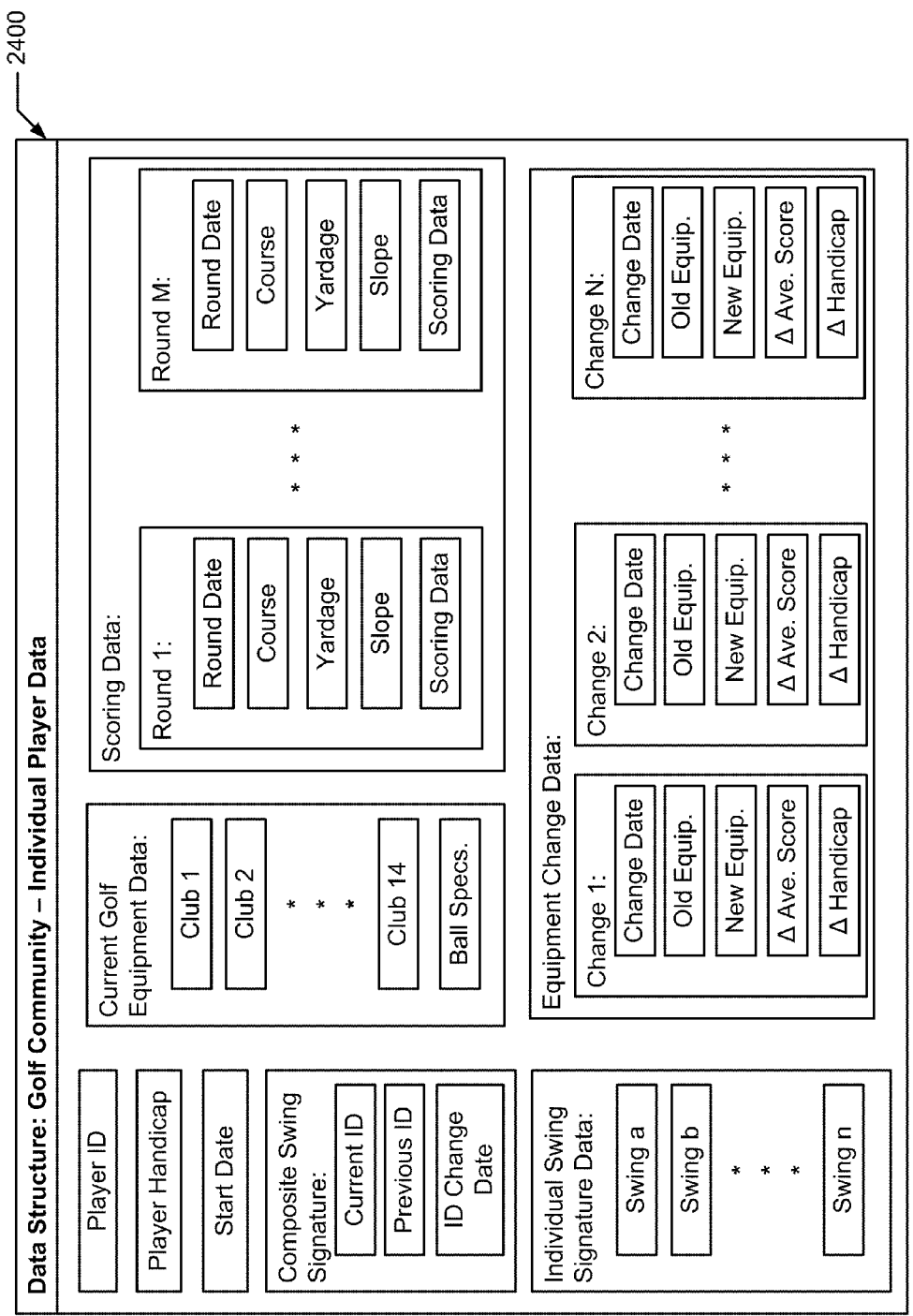

FIGS. 22 through 24 show various types of information and/or data structures that may be used for various features of this invention as described above. While the description below includes various data fields and/or groupings of data, those skilled in the art will recognize that other data field structures and/or groupings of data may be used without departing from this invention.

FIG. 22 shows data and/or information (and an optional data structure 2200) that may be correlated and/or used for storing information relating to an individual golf swing. Optionally, this data or information (or any desired portions thereof) may constitute a "golf swing signature" for an individual golf swing. The data for this individual swing may include one or more of the following categories of data: (a) player identification information; (b) individual swing identification information; (c) club specification information; (d) swing dynamics information; (e) ball specification information; (f) ball flight/launch information; (g) player handicap information; and (h) general swing type classification information.

The above noted general categories of information may include additional data fields (or links to data) that include more detailed information. For example, the "Player ID" data may include one or more of: player's name or other identifier; player's height; player's inseam length; player's fingertip-to-ground dimension; etc. The "club specification" data may include one or more of the following types of information for the club used for this individual swing: club manufacturer, club model, club type (e.g., driver, hybrid, iron, putter, etc.), loft angle, lie angle, face angle, shaft length, shaft type or material, shaft flex, shaft kickpoint location, etc. The "ball specification" data may include one or more of the following types of information for the ball hit during this individual swing: ball manufacturer, ball model, ball compression, and ball construction (e.g., one-piece, two-piece, three-piece, four-piece, five-piece, wound, etc.). The "swing dynamics" information may include any of the golf swing dynamics data mentioned above, such as one or more of the following types of information for the specific swing: right foot dynamic force data, left foot dynamic force data, dynamic club position data (including face orientation data), dynamic club velocity or acceleration data (including angular velocity, yaw, attitude, etc.), body position (hand, torso, shoulder, etc.) data, swing tempo data (e.g., backswing time/down swing time, etc.), swing speed, club path or face angle at ball contact (e.g., square, inside-to-outside, outside-to-inside), swing video data, or a player's self evaluation of the swing or swing contact (e.g., terrible contact=0, best contact=10), etc. The ball flight or launch data may include any of the ball flight data mentioned above, such as one or more of the following types of information for the specific swing (which may be measured, calculated, or estimated): launch angle, launch speed, launch direction, launch spin, carry distance, roll distance, overall distance, deviation from center or desired line, apex height, apex distance, impact/descent angle, ball flight type (e.g., hook, slice, draw, fade, straight, etc.), impact audio, smash factor, etc. The "general swing type classification" information may be determined from the swing data (e.g., by computer or human analysis of the swing dynamics and/or ball flight data or from viewing the ball flight), e.g., by the swing analysis system. Additional data may be included in any of the noted categories and/or any desired amount of data and/or combination of data may be included and stored (and may constitute a golf swing signature for an individual swing).

FIG. 23 shows data structures and categorizations 2300 that may be used for providing and using composite golf swing signature information. As noted above, using data compiled by a golf community system and method, various general categories of golf swings may be ascertained and maintained as "composite golf swing signatures." As examples, these general categories of swings may include: (a) slicer, low swing speed; (b) slicer, moderate swing speed; (c) slicer, high swing speed; (d) slicer, very high swing speed; (e) fader, low swing speed; (f) fader, moderate swing speed; (g) fader, high swing speed; (h) fader, very high swing speed; (i) drawer, low swing speed; (j) drawer, moderate swing speed; (k) drawer, high swing speed; (l) drawer, very high swing speed; (m) hooker, low swing speed; (n) hooker, moderate swing speed; (o) hooker, high swing speed; (p) hooker, very high swing speed; (q) straight, low swing speed; (r) straight, moderate swing speed; (s) straight, high swing speed; (t) straight, very high swing speed; (u) club "caster" with low swing speed; (v) club "caster" with moderate swing speed; (w) club "caster" with high swing speed; (x) club "caster" with very high swing speed; these general categories further broken up by handicap ranges; etc. For each category (e.g., for each noted composite golf swing signature), systems and methods according to at least some examples of this invention may store one or more of the following: (a) swing speed range, (b) ball flight type characterization, (c) handicap range, (d) suggested equipment or equipment setting information, (f) swing tips, (g) practice drills, (h) identification of individual players within the community identified as possessing this golf swing signature, and/or (i) club identifier or club type (e.g., driver, fairway wood, hybrid, long iron, short iron, wedge, etc.) information, etc. Of course, additional, different, or other information also may be associated with composite golf swing signatures without departing from this invention.

The data for features such as "suggested equipment" or "equipment setting" information, "swing tips," and/or "practice drills" may include data that may be accessed by systems and methods according to this invention in order to provide feedback to individual golfers determined as corresponding to that composite golf swing signature. For example, for individuals identified as having a specific composite golf swing signature, certain ball, shaft flex, and/or club head specifications might, on average, produce better results, and systems and methods according to at least some examples of this invention could use this type of data structure or data correlation to associate certain equipment specifications to the composite golf swing signature for the purpose of making recommendations. Also, for a specific composite golf swing signature, certain swing tips or practice drills may be useful to enable the player to improve his or her swing, and systems and methods according to at least some examples of this invention could use this type of data structure or data correlation to associate certain tips or drills to the composite golf swing signature for the purpose of making recommendations. Such systems and methods also could suggest changes in apparel, shoes, clubs, club parameter settings, etc. These arrangements make it easy for systems and methods to provide appropriate output information back to the users (e.g., video of tips or drills and the like; pictures and diagrams of better positioning or posture (e.g., body position, club position, club path, etc.)).

FIG. 24 shows an example data structure (or correlation of data) 2400 that may be used to store information regarding individual golfers within a community in accordance with at least some examples of this invention. As an example, golf swings of each golfer that joins the golf community data hub may be measured and/or the golfer may otherwise provide information of this type to enable his/her interaction with and use of the community systems and methods. As a more specific example, as shown in FIG. 24, the data stored and accessible for each golfer in the community may include one or more of: (a) player identification information; (b) player current handicap information; (c) a start date (e.g., when the user joined the community); (d) one or more composite golf swing signature data sets (e.g., for one or more clubs, determined as described above), which optionally may include information regarding a current composite golf swing signature identification, one or more previous composite golf swing signature identifications, a record of changes to the composite golf swing signature identification, specific club information, etc.; (e) individual golf swing signature data for that user (or links to the data relating thereto, such as links to the data illustrated in FIG. 22); (f) current golf equipment data (optionally including identification of the clubs typically carried by the user (e.g., see the club specification data in FIG. 22), the average distance the user carries or hits that club (optionally limited to full swings and/or swings with acceptable ball contact), ball identification or specifications, etc.); (g) golf equipment change data (optionally including the change date, the old equipment that was changed out, the new equipment brought in, the change in average score (or other relevant statistic, such as driving distance, fairways hit, number of putts, length of putts made per round, etc.) since that change occurred, the change in handicap since the change occurred, etc.); and (h) scoring data per round played (e.g., for use in interfaces like those shown in FIGS. 15A through 15C).

Equipment change data and information may be used in various ways in systems and methods according to examples of this invention. For example, on an individual level, it might be useful for a player (or coach) to know and understand how club or ball changes have affected the player's score (or other relevant statistical data), so they can determine whether an equipment change has had a positive or negative impact. From a more community oriented mindset, this type of equipment change information may be made searchable on systems and methods according to at least some examples of this invention so that one user who is considering a new equipment purchase can determine the practical impact that the same or a similar equipment change has had on other players in the community (optionally, other players with the same composite swing type or other similar swing characteristics, other players at the same general handicap or skill level, etc.). As another option, this type of equipment change data may be automatically accessed by the system, e.g., when providing output information to an individual golfer using the system (e.g., to provide equipment recommendations).

As noted above, systems and methods according to at least some examples of this invention may store current golf equipment data for an individual player, optionally including identification of the clubs typically carried by the user and the actual and/or average distance the user carries or hits that club. If desired, the distance information may be stored in a date stamped manner so that users could obtain information regarding the manner in which their performance with the club has changed over time (e.g., improvement in distance of the driver this year v. last year, improvement over my last 15 rounds, etc.). Any desired statistics of this type (e.g., flight type, etc.) could be time stamped to allow the player to ascertain his or her changes in performance over time. This information may help the player evaluate the effectiveness of lessons, swing changes, equipment changes, and the like.

Collection, storage, access to, and use of this body of swing data, including the swing dynamics, ball flight, golf swing signature, and composite golf swing signature information, may have many potential and apparent benefits for players, coaches, and others that use it. As some examples, the data may help one develop a better swing, select equipment and/or equipment parameters that best suit their swings, evaluate swing and/or equipment changes, and/or better understand where their game needs improvement (or how they could most effectively use their practice time to lower their scores). Benefits of at least some aspects of this invention, however, are not limited to those committed to long term use and analysis of the data. As another potential use, aspects of this invention could be used to provide a "quick" club (or other golf equipment) fitting station, e.g., at golf stores, pro shops, and/or other sellers of golf equipment. For example, some customers (for various reasons) may prefer not to take the time or subject themselves to a complete golf club or equipment fitting session. Nonetheless, by taking a sufficient number of swings to enable creation of a composite golf swing signature for that individual (e.g., one or more swings), the individual can benefit from the stored community data, e.g., by obtaining equipment recommendations based on the determined composite swing type (e.g., using the "suggested equipment" field of FIG. 23) and/or swing tips or coaching information correlated to that composite golf swing signature. Optionally, this feature of the invention may operate with the input of certain other data by the user, like handicap, age, typical ball flight, typical 9 or 18 hole score, etc.

On the other end of the spectrum, the data collection, analysis, community, and/or golf swing signature aspects of systems and methods according to the invention could be used for a very involved "super fitting" or even in a "golf school" type session. If desired, a long (even multi-day) fitting or swing school session could be developed in which swing data for many (or even all) clubs may be collected for an individual, optionally both in a hitting bay, while playing, etc. The player may discuss at least some of the data with a coach or other professional provided to assist the user and evaluate his/her swing. This extensive collection of data may be used to select, fit, adjust, and fine tune the specifications of all the golf equipment used or purchased by a player, to best fit him or her to their equipment, as well as to help the user develop and ingrain the feel for a better swing. Such data collection and processing systems also may be useful in various manufacturer's golf club fitting stations, systems, and methods, including, for example, the NIKE 360° Custom Fitting™ systems (available through NIKE, Inc. of Beaverton, Oreg.).

As noted above, systems and methods according to aspects of this invention rely on data transmissions and communications between various devices. Any desired types of communications are possible without departing from this invention, including infrared transmissions, Bluetooth transmissions, cellular telephone or other radio communications, hard wired connections, networked connections, etc. Appropriate communications and transmission equipment and/or protocols may be provided and used for each portion of the transmission, and such communications and transmission equipment may be readily selected and configured by those skilled in the art.

CONCLUSION

Of course, many modifications to the golf swing analysis systems and/or methods may be made without departing from the invention. For example, the data collected, its use, and/or its presentation to the users may vary widely without departing from this invention. With respect to the methods, additional steps may be added, various described steps may be omitted, the content of the steps may be changed and/or changed in order, and the like, without departing from the invention. Therefore, while the invention has been described with respect to specific examples including presently preferred modes of carrying out the invention, those skilled in the art will appreciate that there are numerous variations and permutations of the above described structures and methods. Thus, the spirit and scope of the invention should be construed broadly as set forth in the appended claims.

We claim:

1. A golf swing evaluation system, comprising:
    a first article of footwear including a first force sensing system for determining forces exerted by a first foot of a user with respect to time over a course of a golf swing;
    a second article of footwear including a second force sensing system for determining forces exerted by a second foot of the user with respect to time over the course of the golf swing;
    a memory system for storing data collected by the first and second force sensing systems or data derived from the data collected by the first and second force sensing systems;
    a processing system for determining, using the data collected by the first and second force sensing systems or the data derived from the data collected by the first and second force sensing systems, at least one of information indicative of a center of force of the user over the course of the golf swing and information indicative of a user weight shift over the course of the golf swing; and
    an output device configured to simultaneously display: (a) at least one of information indicative of the forces exerted by the first foot of the user with respect to time over the course of the golf swing or information indicative of the forces exerted by the second foot of the user with respect to time over the course of the golf swing and (b) a standard golf swing foot force profile.

2. A system according to claim 1, wherein the output device is further configured to display an indication of a time of ball contact during the golf swing with respect to the displayed information indicative of at least one of the forces exerted by the first foot of the user with respect to time over the course of the golf swing and the forces exerted by the second foot of the user with respect to time over the course of the golf swing.

3. A system according to claim 1, wherein the processing system is configured to compare: (a) at least one of information indicative of the forces exerted by the first foot of the user with respect to time over the course of the golf swing or information indicative of the forces exerted by the second foot of the user with respect to time over the course of the golf swing with (b) the standard golf swing foot force profile.

4. A system according to claim 1, wherein the first force sensing system of the first article of footwear determines forces exerted by the first foot of the user throughout the course of the golf swing and the second force sensing system of the second article of footwear determines forces exerted by the second foot of the user throughout the course of the golf swing.

5. A system according to claim 1, wherein the first force sensing system determines forces exerted by the first foot of the user at a plurality of areas on the first foot over the course of the golf swing and the second force sensing system determines forces exerted by the second foot of the user at a plurality of areas on the second foot over the course of the golf swing.

6. A system according to claim 1, further comprising:
    a club position sensor for determining a position of a golf club with respect to time over the course of the golf swing.

7. A system according to claim 6, wherein the output device is further configured to display information indicative of the position of the golf club with respect to time over the course of the golf swing.

8. A system according to claim 6, wherein the processing system is configured to compare: (a) information indicative of the position of the golf club with respect to time over the course of the golf swing with (b) a position of a golf club during a standard golf swing.

9. A system according to claimer 6, wherein the output device is further configured to simultaneously display: (a) information indicative of the position of the golf club with respect to time over the course of the golf swing and (b) a position of a golf club during a standard golf swing.

10. A system according to claim 1, further comprising:
    a body position sensor for determining a position of a portion of a user's body with respect to time over the course of the golf swing.

11. A system according to claim 10, wherein the output device is further configured to display information indicative of the position of the portion of the user's body with respect to time over the course of the golf swing.

12. A system according to claim 10, wherein the processing system is configured to compare: (a) information indicative of the position of the portion of the user's body with respect to time over the course of the golf swing with (b) a position of a corresponding portion of another user's body during a golf swing.

13. A system according to claim 10, wherein the output device is further configured to simultaneously display: (a) information indicative of the position of the portion of the user's body with respect to time over the course of the golf swing and (b) a position of a corresponding portion of another user's body during a golf swing.

14. A system according to claim 10, wherein the portion of the user's body is a hand.

15. A system according to claim 10, wherein the portion of the user's body is a shoulder.

16. A system according to claim 10, wherein at least a portion of the body position sensor is incorporated into a golf glove.

17. A system according to claim 10, wherein at least a portion of the body position sensor is incorporated into a shirt.

18. A golf swing evaluation system, comprising:
- a first article of footwear including a first force sensing system for determining forces exerted by a first foot of a user with respect to time over a course of a golf swing;
- a golf swing dynamics sensing system for determining golf swing dynamics information generated by the user with respect to time over the course of the golf swing;
- a memory system for storing data collected by the first force sensing system and the golf swing dynamics sensing system or data derived from the data collected by the first force sensing system and the golf swing dynamics sensing system;
- a processing system for determining, using the data collected by the first force sensing system and the golf swing dynamics sensing system or the data derived from the data collected by the first force sensing system and the golf swing dynamics sensing system, at least one of information indicative of a center of force of the user over the course of the golf swing and information indicative of a user weight shift over the course of the golf swing; and
- an output device configured to simultaneously display: (a) information indicative of the forces exerted by the first foot of the user with respect to time over the course of the golf swing and (b) a standard golf swing foot force profile.

19. A system according to claim 18, wherein the output device is further configured to display an indication of a time of ball contact during the golf swing with respect to the displayed information indicative of the forces exerted by the first foot of the user with respect to time over the course of the golf swing and with respect to the displayed information indicative of the golf swing dynamics with respect to time over the course of the golf swing.

20. A system according to claim 18, wherein the processing system is configured to compare: (a) information indicative of the forces exerted by the first foot of the user with respect to time over the course of the golf swing with (b) the standard golf swing foot force profile.

21. A system according to claim 18, wherein the first force sensing system determines forces exerted by the first foot of the user at a plurality of areas on the first foot over the course of the golf swing.

22. A system according to claim 18, wherein the golf swing dynamics sensing system includes a club position sensor for determining a position of at least a portion of a golf club with respect to time over the course of the golf swing.

23. A system according to claim 18, wherein the golf swing dynamics sensing system includes a body position sensor for determining a position of a portion of a user's body with respect to time over the course of the golf swing.

24. A system according to claim 23, wherein the portion of the user's body is a hand.

25. A system according to claim 23, wherein the portion of the user's body is a shoulder.

26. A system according to claim 23, wherein at least a portion of the body position sensor is incorporated into a golf glove.

27. A system according to claim 23, wherein at least a portion of the body position sensor is incorporated into a shirt.

28. A system according to claim 18, wherein the first force sensing system of the first article of footwear determines forces exerted by the first foot of the user throughout the course of the golf swing.

* * * * *